US012699488B2

(12) United States Patent (10) Patent No.: US 12,699,488 B2
He et al. (45) Date of Patent: Aug. 4, 2026

(54) TOUCH SENSOR LAYER, TOUCH SCREEN, AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fan He, Beijing (CN); Hongwei Ma, Beijing (CN); Xiangdan Dong, Beijing (CN)

(73) Assignees: CHENGDU BOE OPTOELECTRONICS TECHNOLOGY CO., LTD, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/058,100

(22) Filed: Feb. 20, 2025

(65) Prior Publication Data

US 2025/0190080 A1 Jun. 12, 2025

Related U.S. Application Data

(63) Continuation of application No. 18/650,906, filed on Apr. 30, 2024, now Pat. No. 12,265,683, which is a continuation of application No. 18/014,677, filed as application No. PCT/CN2021/127449 on Oct. 29, 2021, now Pat. No. 12,013,718.

(30) Foreign Application Priority Data

May 28, 2021 (CN) .......................... 202110595311.7

(51) Int. Cl.
*G06F 3/044* (2006.01)
*G06F 3/041* (2006.01)

(52) U.S. Cl.
CPC ........ *G06F 3/0443* (2019.05); *G06F 3/04164* (2019.05); *G06F 3/0446* (2019.05); *G06F 2203/04107* (2013.01); *G06F 2203/04112* (2013.01)

(58) Field of Classification Search
None
See application file for complete search history.

(56) References Cited

FOREIGN PATENT DOCUMENTS

CN 111665994 * 9/2020 ........... G06F 3/0412

* cited by examiner

*Primary Examiner* — Christopher J Kohlman
(74) *Attorney, Agent, or Firm* — Dority & Manning, P.A.

(57) ABSTRACT

A touch sensor layer has a touch region and a wiring region at a periphery of the touch region, and includes a plurality of first touch electrode blocks, a plurality of second touch electrode blocks, and at least one first touch auxiliary portion. The plurality of first touch electrode blocks and the plurality of second touch electrode blocks are located in the touch region and disposed in a same layer. Second touch electrode blocks and first touch electrode blocks are staggered in a first direction, and other second touch electrode blocks and other first touch electrode blocks are staggered in a second direction. A first touch auxiliary portion is disposed on a side, facing the wiring region, of at least one first touch electrode block in a group of first touch electrode blocks located at an outermost periphery and proximate to a same side of the touch region.

19 Claims, 33 Drawing Sheets

1000

130          100          110          120

100

| Touch sensor layer | 2 |
| --- | --- |
| LCD | 1 |
| BLU | 3 |

100

100

TOUCH SENSOR LAYER, TOUCH SCREEN, AND DISPLAY APPARATUS

CROSS-REFERENCE TO RELATED APPLICATIONS

This application is a continuation of U.S. patent application Ser. No. 18/650,906, filed on Apr. 30, 2024, which is a continuation of U.S. patent application Ser. No. 18/014,677, filed on Jan. 5, 2023, which is a national phase entry under 35 USC 371 of International Patent Application No. PCT/CN2021/127449, filed on Oct. 29, 2021, which claims priority to Chinese Patent Application No. 202110595311.7, filed on May 28, 2021, titled "TOUCH SENSOR LAYER, DISPLAY PANEL AND DISPLAY APPARATUS", which are incorporated herein by reference in their entirety.

TECHNICAL FIELD

The present disclosure relates to the field of display technologies, and in particular, to a touch sensor layer, a touch screen and a display apparatus.

BACKGROUND

With the development of display technology, the display apparatus with a touch function is very popular due to its simple and convenient operation, which brings users a good user experience. The touch display apparatus includes a touch sensor layer and a display panel, and the touch sensor layer is disposed on a light exit surface of the display panel to facilitate the touch operation.

However, the touch display apparatus still faces a problem of inaccurate touch. That is, there may be phenomena such as touch failure and wrong reporting position of the touch point. Therefore, how to provide a touch display apparatus with accurate touch has become a technical problem that those skilled in the art need to solve urgently.

SUMMARY

In an aspect, a touch sensor layer is provided. The touch sensor layer has a touch region and a wiring region, and includes a plurality of first touch electrode blocks, a plurality of second touch electrode blocks and at least one first touch auxiliary portion. The wiring region is located at a periphery of the touch region. The plurality of first touch electrode blocks are located in the touch region. The plurality of second touch electrode blocks are located in the touch region. The plurality of second touch electrode blocks and the plurality of first touch electrode blocks are disposed in a same layer, second touch electrode blocks and first touch electrode blocks are staggered in a first direction, and other second touch electrode blocks and other first touch electrode blocks are staggered in a second direction, and the first direction intersects the second direction. A first touch auxiliary portion is disposed on a side, facing the wiring region, of at least one first touch electrode block in a group of first touch electrode blocks located at an outermost periphery and proximate to a same side of the touch region.

In some embodiments, the touch region has a first side. The touch sensor layer further includes a plurality of first touch leads. The plurality of first touch leads are located in the wiring region, and an end of a first touch lead located on the first side of the touch region is a first end. The first touch auxiliary portion is disposed between a first touch electrode block adjacent thereto and a first end of a first touch lead adjacent thereto. The first touch auxiliary portion is coupled to the first touch electrode block adjacent thereto and the first end of the first touch lead adjacent thereto.

In some embodiments, a portion of the first touch lead on the first side of the touch region extends in a third direction. No first touch auxiliary portion is disposed on a side, facing the wiring region, of a first touch electrode block proximate to the first side of the touch region and located at an end in the third direction, and the first touch electrode block proximate to the first side of the touch region and located at the end in the third direction is directly coupled to a first touch lead.

In some embodiments, the at least one first touch auxiliary portion includes a plurality of first touch auxiliary portions, and the plurality of first touch auxiliary portions gradually increase in resistance in the third direction.

In some embodiments, the touch sensor layer further includes a plurality of second touch leads. The plurality of second touch leads are located in the wiring region, and at least one end of a line of second touch electrode blocks is coupled to a second touch lead.

In some embodiments, the touch sensor layer further includes at least one second touch auxiliary portion. A second touch auxiliary portion is disposed between a second touch electrode block adjacent thereto and a second touch lead adjacent thereto, and the second touch auxiliary portion is coupled to the second touch electrode block adjacent thereto and the second touch lead adjacent thereto.

In some embodiments, the touch region has a first side. The touch sensor layer further includes a plurality of first touch leads. The plurality of first touch leads are located in the wiring region, and a first end of a first touch lead located on the first side of the touch region is coupled to a second touch electrode block. The first touch auxiliary portion is disposed on a side, facing the wiring region, of a first touch electrode block in the at least one first touch electrode block proximate to the first end of the first touch lead. The first touch auxiliary portion and the first touch electrode block in the at least one first touch electrode block are insulated from each other.

In some embodiments, the first touch auxiliary portion and the first touch electrode block are each of a metal mesh structure.

In some embodiments, the first touch auxiliary portion is of a metal trace.

In some embodiments, the touch sensor layer further includes a first signal shielding line. The first signal shielding line is located at a periphery of the plurality of first touch leads, and the first touch auxiliary portion is coupled to the first signal shielding line.

In some embodiments, the touch sensor layer further includes a plurality of second touch leads. The plurality of second touch leads are located in the wiring region, and at least one end of a line of first touch electrode blocks is coupled to a second touch lead.

In some embodiments, the touch sensor layer further includes at least one second touch auxiliary portion. A second touch auxiliary portion is disposed on a side, facing the wiring region, of at least one second touch electrode blocks in a line of second touch electrode blocks proximate to an end of the second touch lead.

In some embodiments, the touch region further has a second side. The touch sensor layer further includes at least one third touch auxiliary portion. A third touch auxiliary portion is disposed on a side, facing the wiring region, of at least one second touch electrode block in a group of second touch electrode blocks proximate to the second side of the touch region. The second side of the touch region is opposite to the first side of the touch region.

In some embodiments, the at least one first touch auxiliary portion is located in the touch region.

In some embodiments, at least two of the plurality of first touch leads, the at least one first touch auxiliary portion and the plurality of first touch electrode blocks are disposed in a same layer and made of a same material.

In some embodiments, the touch region further has a third side. The first touch lead extends from the first side of the touch region to the third side of the touch region, and the first side of the touch region intersects the third side of the touch region.

In another aspect, a touch screen is provided. The touch screen includes a display panel and the touch sensor layer. The touch sensor layer is disposed on a light exit surface of the display panel.

In some embodiments, the display panel is an organic light-emitting diode display panel. The display panel includes an encapsulation layer, and both the plurality of first touch electrode blocks and the plurality of second touch electrode blocks of the touch sensor layer are disposed on a surface of the encapsulation layer.

In yet another aspect, a display apparatus is provided. The display apparatus includes a housing and the touch screen. The touch screen is disposed in the housing.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figures 1, 2A:
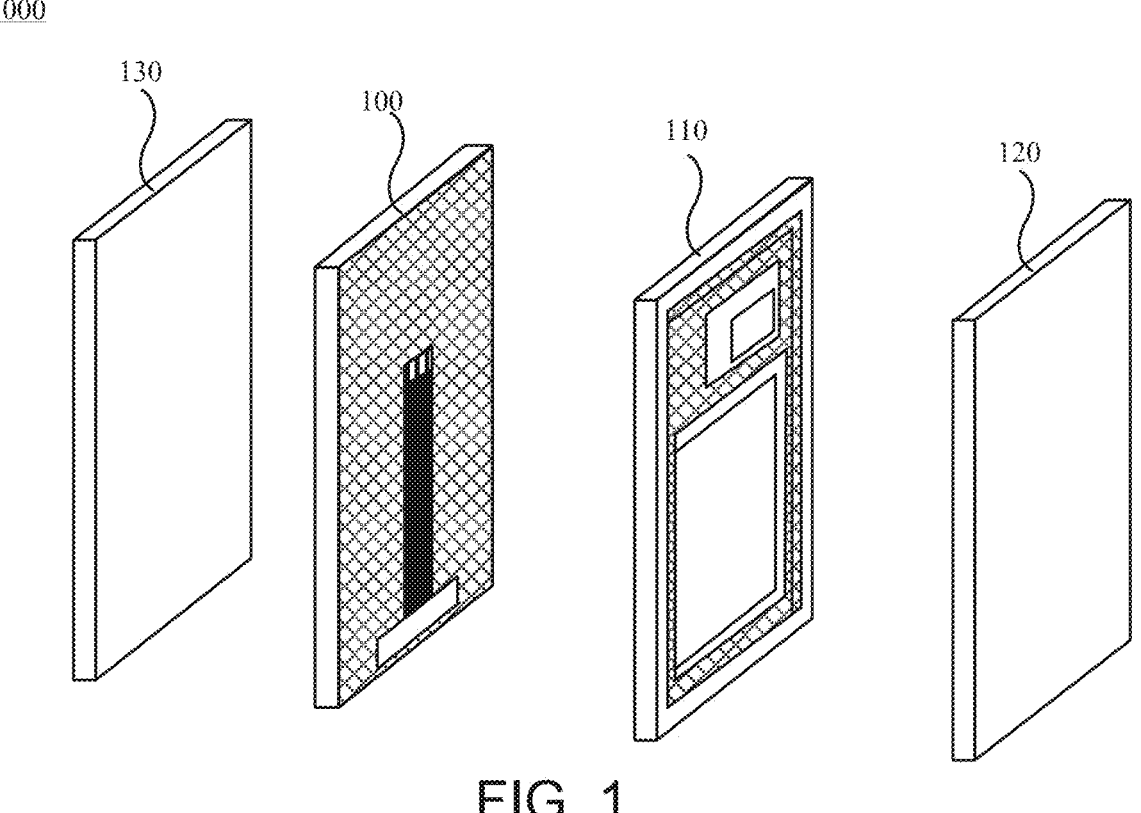
FIG. 1 is a structural diagram of a display apparatus, in accordance with some embodiments.
FIG. 2A is a structural diagram of a touch screen, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example"

or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, these specific features, structures, materials or characteristics may be included in any one or more embodiments or examples in any suitable manner (addition, deletion, replacement, or deformation).

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, unless otherwise specified, the term "a plurality of" or "the plurality of" means two or more.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "about", "substantially" or "approximately" includes a stated value and an average value within an acceptable range of deviation of a particular value. The acceptable range of deviation is determined by a person of ordinary skill in the art in view of the measurement in question and the errors associated with the measurement of a particular quantity (i.e., limitations of the measurement system).

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

The embodiments of the present disclosure provide a display apparatus, and the display apparatus involved in the embodiments of the present disclosure may be, for example, a tablet computer, a mobile phone, an e-reader, a remote control, a personal computer (PC), a laptop computer, a personal digital assistant (PDA), an on-board device, a network television (TV), a wearable device, or a TV set.

The embodiments of the present disclosure do not limit the specific form of the display apparatus. For convenience of description, the following description is made by considering an example where the display apparatus is the mobile phone.

In some embodiments provided in the present disclosure, as shown in FIG. 1, the display apparatus 1000 includes a touch screen 100, a middle frame 110, a housing 120 and a cover plate 130, and the touch screen 100 and the middle frame 110 are disposed in the housing 120.

The middle frame 110 is located between the touch screen 100 and the housing 120, and a surface of the middle frame 110 away from the touch screen 100 (i.e., a surface facing the housing 120) is used for installing a battery, a circuit board, camera(s), antennas and other internal components.

The cover plate 130 is located on a side of the touch screen 100 away from the middle frame 110. The cover plate 130 may be, for example, a cover glass (CG), and the cover glass may have a certain toughness.

The touch screen 100 has a light exit surface where display images can be seen and a back face opposite to the light exit surface. The middle frame 110 is disposed on the back face of the touch screen 100, and the cover plate 130 is disposed on the light exit surface of the touch screen 100.

Figure 2B:
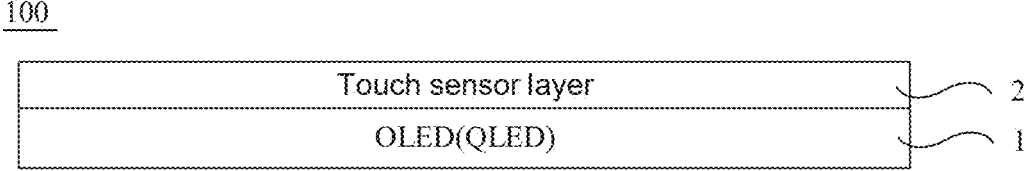
FIG. 2B is a structural diagram of another touch screen, in accordance with some embodiments.

As shown in FIGS. 2A and 2B, the touch screen 100 includes a display panel (DP) 1 and a touch sensor layer 2 disposed on a light exit surface of the display panel.

In some embodiments of the present disclosure, as shown in FIG. 2A, the display panel 1 may be a liquid crystal display (LCD) panel. In this case, the touch screen 100 further includes a backlight module (also referred to as a backlight unit (BLU)) 3 disposed on a back face of the liquid crystal display panel and used to provide light source for the liquid crystal display panel.

Alternatively, in some other embodiments of the present disclosure, as shown in FIG. 2B, the display panel 1 is an organic light-emitting diode (OLED) display panel or a quantum dot light-emitting diode (QLED) display panel. In this case, the OLED display panel or the QLED display panel may realize self-luminescence, so there is no need to provide the above backlight module 3 in the touch screen 100.

For convenience of description, the following will be described by considering an example where the display panel 1 is the OLED display panel.

The OLED display panel may be of a top-gate structure or a bottom-gate structure. In addition, the OLED display panel may be of a single-gate structure or a double-gate structure. The OLED display panel provided in the embodiments of the present disclosure is only schematic without any limitation.

Figure 3:
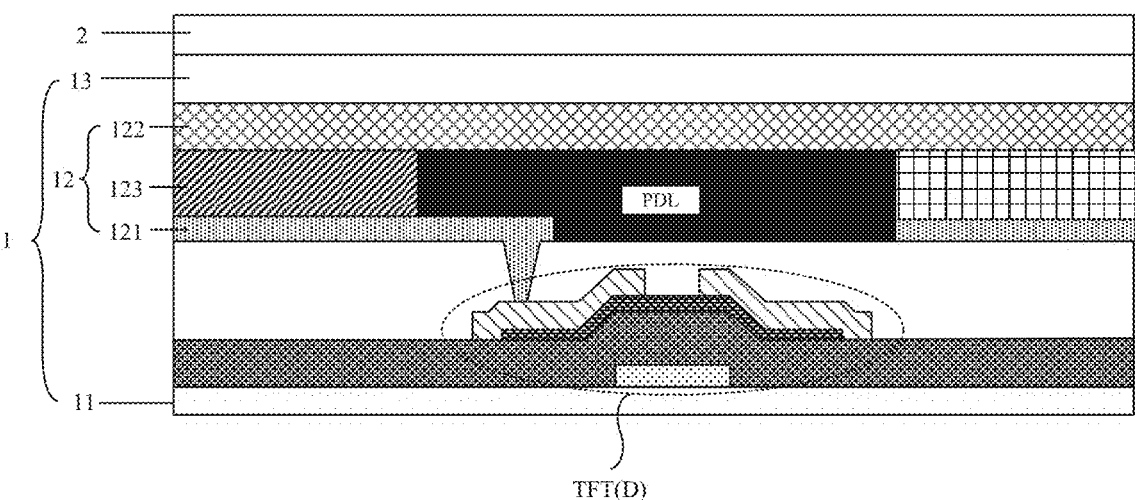
FIG. 3 is a sectional view of a touch screen, in accordance with some embodiments.

As shown in FIG. 3, the display panel 1 includes a substrate 11, pixel driving circuits D, light-emitting devices 12, and an encapsulation layer 13.

As for a pixel driving circuit D, for example, as shown in FIG. 3, the pixel driving circuit D is disposed on a side of substrate 11, and the pixel driving circuit D (also referred to as a pixel circuit) is generally composed of thin film transistors (TFT), capacitors and other electronic components. For example, the pixel driving circuit D may be a pixel circuit of a 2T1C structure including two thin film transistors (a switching TFT and a driving TFT) and a capacitor C. Of course, the pixel driving circuit D may be composed of more than two thin film transistors (a plurality of switching TFTs and one or more driving TFTs) and at least one capacitor.

The plurality of switching TFTs included in the pixel driving circuit D may be formed synchronously with the driving TFT(s). FIG. 3 only shows a driving TFT in the pixel driving circuit D.

As for a structure of a light-emitting device 12, for example, as shown in FIG. 3, the light-emitting device 12 is disposed on a side of the pixel driving circuit D away from the substrate 11. The light-emitting device 12 includes an anode 121, a cathode 122, and a light-emitting material layer 123 disposed between the anode 121 and the cathode 122. The light-emitting material layer 123 emits light under the drive of a driving current between the anode 121 and the cathode 122.

The pixel driving circuit D may be coupled to the anode 121 of the light-emitting device 12. The pixel driving circuit D is used to transmit a driving signal to the anode 121 of the light-emitting device 12, and the cathode 122 of the light-emitting device 12 receives a power supply signal, so that the driving current may be produced between the anode 121 and the cathode 122, so as to drive the light-emitting material layer 123 to emit light.

The light-emitting devices 12 may emit light of various colors. For example, the various colors include at least a first color, a second color, and a third color, and the first color, the second color, and the third color are three primary colors (e.g., red, green, and blue). That is, the display panel 1 includes red sub-pixels R for emitting red light, green sub-pixels G for emitting green light, and blue sub-pixels B for emitting blue light.

In addition, in order to avoid crosstalk of lights of primary colors emitted by adjacent light-emitting devices 12, as shown in FIG. 3, the display panel 1 further includes a pixel define layer PDL, and the pixel define layer PDL is disposed between adjacent light-emitting material layers 123.

As for the encapsulation layer 13, for example, as shown in FIG. 3, the encapsulation layer 13 is disposed on a side of the light-emitting device 12 away from the substrate 11, and the encapsulation layer 13 may be an encapsulation substrate or an encapsulation film. The encapsulation layer 13 is used to encapsulate the display panel 1, so as to prevent intrusion of moisture.

As for the touch sensor layer 2, in some embodiments provided in the present disclosure, as seen from the sectional view shown in FIG. 3, the touch sensor layer 2 is disposed on the light exit surface of the display panel 1, which can be said that the touch sensor layer 2 is disposed on a surface of the encapsulation layer 13.

The touch sensor layer 2 may be in direct contact with the encapsulation layer 13. Alternatively, there may be another layer (not shown in the figures) between the touch sensor layer 2 and the encapsulation layer 13, the another layer is, for example, a planarization layer. In this way, it is equivalent to the fact that the display panel 1 serves as a carrier plate of touch sensor layer 2, and there is no need to provide a separate carrier plate in the touch sensor layer 2, which may reduce the thickness of the touch screen 100.

In light of this, the structure of the touch sensor layer 2 provided in the embodiments of the present disclosure will be illustrated in detail with four examples below.

Example 1

Figure 4:
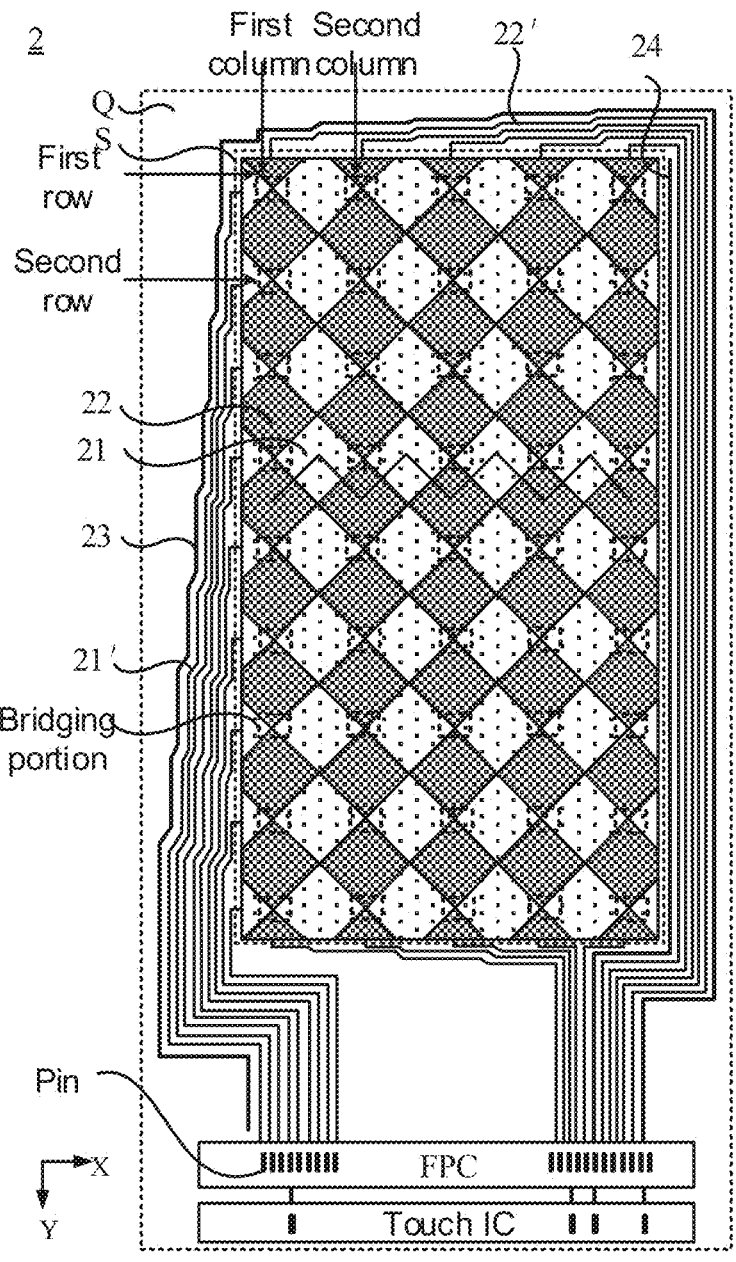
FIG. 4 is a structural diagram of a touch sensor layer, in accordance with some embodiments.

The embodiments of the present disclosure provide a touch sensor layer 2. As shown in FIG. 4, the touch sensor layer 2 includes a touch region S and a wiring region Q located at a periphery of the touch region S. The touch region S of the touch sensor layer 2 serves as a touch region of the display apparatus 1000 and overlaps a display region of the display apparatus 1000. The wiring region Q of the touch sensor layer 2 serves as a wiring region of the display apparatus 1000 and is located in a peripheral region of the display apparatus 1000.

In some embodiments provided in the present disclosure, as shown in FIG. 4, the touch sensor layer 2 includes a plurality of first touch electrode blocks 21, a plurality of second touch electrode blocks 22, a plurality of first touch leads 21', a plurality of second touch leads 22', a first signal shielding line 23, a second signal shielding line 24, a touch integrated circuit (touch IC) and a flexible printed circuit (FPC).

The plurality of first touch electrode blocks 21 and the plurality of second touch electrode blocks 22 are located in the touch region S of the touch sensor layer 2, the plurality of first touch leads 21', the plurality of second touch leads 22', the first signal shielding line 23, the second signal shielding line 24, the touch IC and the FPC are located in the wiring region Q of touch sensor layer 2.

As shown in FIG. 4, the plurality of first touch electrode blocks 21 and the plurality of second touch electrode blocks 22 are arranged in a same layer. First touch electrode blocks 21 and second touch electrode blocks 22 are staggered in a first direction Y, and other first touch electrode blocks 21 and other second touch electrode blocks 22 are staggered in a second direction X. The first direction Y intersects the second direction X.

The plurality of first touch electrode blocks 21 and the plurality of second touch electrode blocks 22 are disposed in the same layer. For example, the plurality of first touch electrode blocks 21 and the plurality of second touch electrode blocks 22 are formed simultaneously through a patterning process (e.g., including exposure, development, etching and other steps), and are disposed in the same layer and made of the same material.

The first touch electrode blocks 21 and the second touch electrode blocks 22 are staggered in the first direction Y, and the other first touch electrode blocks 21 and the other second touch electrode blocks 22 are staggered in the second direction X. It may be understood that, as shown in FIG. 4, in two adjacent lines, first touch electrode blocks 21 and second touch electrode blocks 22 are connected in series to be arranged in a broken line. Alternatively, it may be understood that, the periphery of the first touch electrode block 21 is surrounded by the second touch electrode blocks 22, and the periphery of the second touch electrode block 22 is surrounded by the first touch electrode blocks 21. Alternatively, it may be understood that, a connecting line of any adjacent first touch electrode block 21 and second touch electrode block 22 intersects both the first direction Y and the second direction X, and is not parallel to both the first direction Y and the second direction X. Alternatively, it may be understood that, adjacent first touch electrode blocks 21 are not separated by the second touch electrode block 22, and adjacent second touch electrode blocks 22 are not separated by the first touch electrode block 21.

The plurality of first touch electrode blocks 21 are divided into a plurality of rows of first touch electrode blocks 21 in the first direction Y, first touch electrode blocks 21 located in the same row are coupled to each other, and first touch electrode blocks in adjacent rows in the plurality of row of first touch electrode blocks are insulated from each other. For example, in the first direction Y, first touch electrode blocks 21 in a first row are coupled to each other, and the first touch electrode blocks 21 in the first row and first touch electrode blocks 21 in a second row are insulated from each other. First touch electrode blocks 21 in each row are arranged sequentially in the second direction X, and the first touch electrode blocks in each row may be, for example, used as a first channel for transmitting a first touch signal.

The plurality of second touch electrode blocks 22 are divided into a plurality of columns of second touch electrode blocks 22 in the second direction X, second touch electrode blocks 22 located in the same column are coupled to each other, and second touch electrode blocks 22 in adjacent columns in the plurality of columns of second touch electrode blocks 22 are insulated from each other. For example, in the second direction X, second touch electrode blocks 22 in a first column are coupled to each other, and the second touch electrode blocks 22 in the first column and second touch electrode blocks 22 in a second column are insulated from each other. Second touch electrode blocks 22 in each column are arranged sequentially in the first direction Y, and the second touch electrode blocks in each column may be, for example, used as a second channel for transmitting a second touch signal.

For example, one of the first channel and the second channel may be a channel of a receiving signal, the other thereof may be a channel of a triggering signal, and one of the first touch signal and the second touch signal is the triggering signal, and the other thereof is the receiving signal. For example, the first channel is used as the channel of the receiving signal, the second channel is used as the channel of the triggering signal, the first touch signal is the receiving signal, and the second touch signal is the triggering signal, or vice versa.

It can be understood that, although the first touch electrode blocks 21 and the second touch electrode blocks 22 are disposed in the same layer, the first touch electrode blocks 21 and the second touch electrode blocks 22 are insulated from each other. In some embodiments, the first touch electrode blocks 21 in the same row may be coupled to each other in a bridging jumper manner, and the second touch electrode blocks 22 in the same column may be coupled to each other in a bridging jumper manner, but the first touch electrode blocks 21 are insulated from the second touch electrode blocks 22.

For example, as shown in FIG. 4, the first touch electrode blocks 21 in the same row are directly coupled, the second touch electrode blocks 22 in the same column are coupled through bridge portions, and the bridge portions are disposed in a different layer with the first touch electrode blocks 21 and the second touch electrode blocks 22. In some embodiments, a conductive layer where the first touch electrode blocks 21 and the second touch electrode blocks 22 are located is closer to the display panel 1 than a conductive layer where the bridge portions are located.

In some other embodiments, the conductive layer where the first touch electrode blocks 21 and the second touch electrode blocks 22 are located is farther away from the display panel 1 than the conductive layer where the bridge portions are located. In this way, the conductive layer where the first touch electrode blocks 21 and the second touch electrode blocks 22 is farther away from the display panel 1. Therefore, the interference of signals of light-emitting control units in the display panel 1 with the first touch signal on the first touch electrode block 21 and the second touch signal on the second touch electrode block 22 may be reduced.

As for the structures of the first touch electrode block 21 and the second touch electrode block 22, in some embodiments, the first touch electrode block 21 and the second touch electrode block 22 are each of a solid block structure.

In some other embodiments, the first touch electrode block 21 and the second touch electrode block 22 are each of a mesh block structure.

For example, the first touch electrode block 21 and the second touch electrode block 22 may be formed through a flexible multi-layer on cell (FMLOC) process.

Figure 5:
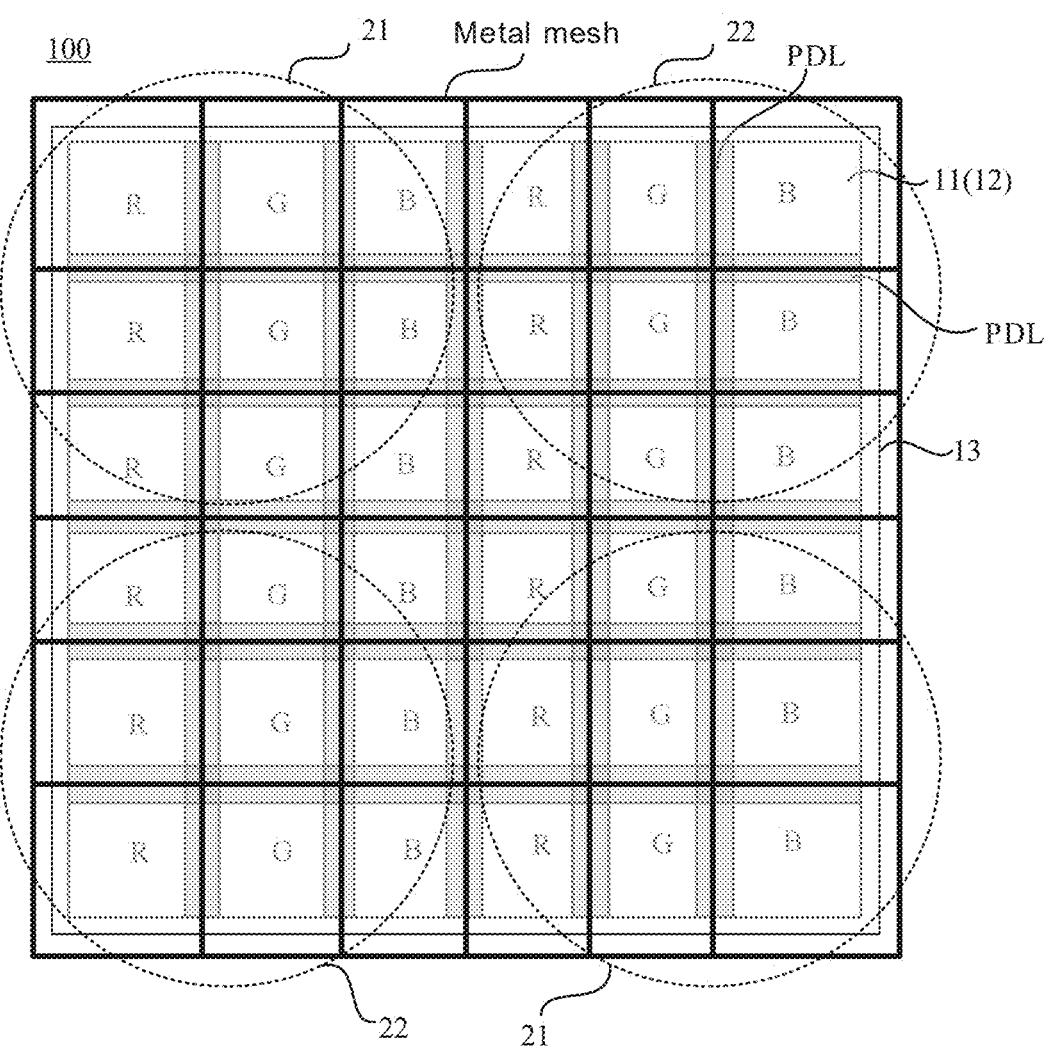
FIG. 5 is a top view of a touch screen, in accordance with some embodiments.

As shown in FIG. 5, metal mesh traces are formed between openings of pixel define layer PDL on a side of the encapsulation layer 13 away from the substrate 11, and the metal mesh traces constitute the first touch electrode blocks 21 and the second touch electrode blocks 22.

As for the first touch lead 21', in some embodiments provided in the present disclosure, as shown in FIG. 4, the first touch lead 21' extends from a left side to a lower side of the touch region S, one end of the first touch lead 21' is coupled to a row of first touch electrode blocks 21, and the other end of the first touch lead 21' is coupled to the touch IC. The first touch lead 21' is used for transmitting the first touch signal.

As for the second touch lead 22', in some embodiments provided in the present disclosure, as shown in FIG. 4, the second touch lead 22' extends from an upper side to the lower side through a right side of the touch region S, one end of the second touch lead 22' is coupled to a column of second touch electrode blocks 22, and the other end of the second touch lead 22' is coupled to the touch IC. The second touch lead 22' is used for transmitting the second touch signal.

In some embodiments, as shown in FIG. 4, both ends of the second touch electrode blocks 22 in the same column are each coupled to a second touch lead 22'. Therefore, some of the second touch leads 22' are located on the lower side of the touch region S, and located between the second touch electrode blocks 22 and the touch IC.

As for the first signal shielding line 23, in some embodiments provided in the present disclosure, as shown in FIG. 4, the first signal shielding line 23 is located at the periphery of the plurality of first touch leads 21' and the plurality of second touch leads 22', and arranged around an outer contour of the plurality of first touch leads 21' and the plurality of second touch leads 22'. One end of the first signal shielding line 23 is coupled to the touch IC, and the other end thereof is floating. The touch IC may transmit a shielding signal to the first signal shielding line 23, and the shielding signal may reduce the interference of external noise with the first touch signal on the first touch lead 21' and the second touch signal on the second touch lead 22'.

As for the second signal shielding line 24, in some embodiments provided in the present disclosure, as shown in FIG. 4, the second signal shielding line 24 is located on the right side of the touch region S, and disposed between the touch region S and a second touch lead 22' closest to the touch region S. An extending direction of the second signal shielding line 24 is parallel to the first direction Y. One end of the second signal shielding line 24 is coupled to the touch IC, and the other end of the second signal shielding line 24 is floating.

A shielding signal transmitted by the second signal shielding line 24 may be the same as the shielding signal transmitted by the first signal shielding line 23. The shielding signal on the second signal shielding line 24 may prevent crosstalk between the second touch signal on the second touch lead 22' and the first touch signal on the first touch electrode block 21 proximate to the second touch lead 22'.

The FPC is used to connect the plurality of first touch leads 21', the plurality of second touch leads 22', the first signal shielding line 23 and the second signal shielding line 24 to the touch IC. The FPC is provided with a plurality of pins therein, and the plurality of first touch leads 21' and the plurality of second touch leads 22' are coupled to multiple pins. Pins coupled to the plurality of first touch leads 21' are coupled to an output end, coupled to the touch IC, of the FPC. That is, the plurality of first touch leads 21' are integrated into a single first touch lead 21' in the FPC to be coupled to the touch IC. Pins coupled to the plurality of second touch leads 22' are coupled to another output end, coupled to the touch IC, of the FPC. That is, the plurality of second touch leads 22' are integrated into a single second touch lead 22' in the FPC to be coupled to the touch IC.

The touch IC is used to send and receive touch signals. For example, the touch IC may send the second touch signal to the second touch lead 22'. For example, the touch IC may receive the first touch signal on the first touch lead 21'. The touch IC is also provided with a plurality of pins therein, the first signal shielding line 23 and the second signal shielding line 24 are coupled to different pins, and the touch IC sends the same shielding signal to the first signal shielding line 23 and the second signal shielding line 24.

As for the touch principle of the touch sensor layer 2, the second touch electrode block 22 and the first touch electrode block 21 may constitute a capacitor, and the plurality of first touch electrode blocks 21 and the plurality of second touch electrode blocks 22 may constitute a plurality of capacitors (e.g., C1, C2, C3 . . . ). Each capacitor has a different position in the touch sensor layer 2. It may also be said that, in a coordinate system constituted by the first direction Y and the second direction X, the capacitors are located at different points. The touch IC sends a second touch signal (e.g., a triggering signal) to the second touch lead 22', and the second touch signal is transmitted to the second touch electrode blocks 22 through the second touch lead 22'. In this case, all the capacitors at different positions will each have an initial capacitance value. Since the human body itself is a conductor, when a finger touches a certain position of the touch screen 100, the capacitance value of the capacitor at this position may change. According to the variation of the capacitance value, the first touch electrode block 21 at this position will receive a corresponding first touch signal (e.g., a receiving signal). The first touch signal on the first touch electrode block 21 at this position is transmitted to the touch IC through the first touch lead 21'. A capacitance value of a capacitor at a non-touch position remains unchanged. Therefore, the touch point may be determined by determining the capacitance value of each capacitor, so as to realize the touch function.

Based on the touch sensor layer 2 provided in the current Example, the structures of the plurality of first touch electrode blocks 21 located in the touch region S are the same or approximately the same, and the structures of the plurality of second touch electrode blocks 22 are the same or approximately the same. Therefore, the capacitance value of each capacitor has little difference, so that the load (the load being a product of a capacitance value and a resistance value) of each capacitor has little difference. In this way, the loss of the touch signal on each capacitor has little difference. For a plurality of second touch signals (e.g., the triggering signals) with the same intensity, after passing through capacitors at different positions, the intensities of the first touch signals (e.g., the receiving signal) respectively received by the plurality of first touch electrode blocks 21 at different positions have little difference.

However, as shown in FIG. 4, each row of first touch electrode blocks has a different distance to the FPC. For example, in a direction toward the FPC, distances from all the rows of first touch electrode blocks to the FPC gradually decrease. Therefore, in the direction toward the FPC, lengths of first touch leads 21' respectively coupled to all the rows of first touch electrode blocks gradually decrease. The smaller the length of the first touch lead 21', the smaller the resistance of the first touch lead 21'. Therefore, in the direction toward the FPC, the resistances of the first touch leads 21' respectively coupled to all the rows of first touch electrode blocks gradually decrease. The smaller the resistance of the first touch lead 21', the smaller the load of the first touch lead 21'. Therefore, in the direction toward the FPC, the loads of the first touch leads 21' respectively coupled to all the rows of first touch electrode blocks gradually decrease.

For example, a length of a first touch lead 21' coupled to the second row of first touch electrode blocks is less than a length of a first touch lead 21' coupled to the first row of first touch electrode blocks. Then, a resistance of the first touch lead 21' coupled to the second row of first touch electrode blocks is less than a resistance of the first touch lead 21' coupled to the first row of first touch electrode blocks. Therefore, a load of the first touch lead 21' coupled to the second row of first touch electrode blocks is less than a load of the first touch lead 21' coupled to the first row of first touch electrode blocks.

The load of each first touch lead 21' will cause a loss of the first touch signal transmitted by the first touch lead 21'. The smaller the load of the first touch lead 21', the smaller the loss of the first touch signal. It can be seen from the above description that, in the direction toward the FPC, the loads of the first touch leads 21' respectively coupled to all the rows of first touch electrode blocks gradually decrease. That is, in the direction toward the FPC, the loss of the first touch signals respectively on the first touch leads 21' gradually decreases. It can be seen from the above that the loss of the touch signal on each capacitor has little difference. For the plurality of second touch signals (e.g., the triggering signals) with the same intensity, after passing through the capacitors at different positions, the intensities of the first touch signals (e.g., the receiving signals) respectively received by the plurality of first touch electrode blocks 21 at different positions have little difference. Then, for the first touch signals with little difference in intensity, after the first touch signals are transmitted to the touch IC respectively through different first touch leads 21' (the loads of the first touch leads 21' being different), the intensities of the first touch signals received by the touch IC are different. The touch IC determines the capacitance value of the capacitor according to the intensity of the first touch signal, thereby determining the touch point. For capacitors in the non-touch region (the capacitance values of the capacitors being the same or approximately the same), since the loads of the first touch leads 21' are different, the capacitance values recognized by the touch IC are different. Therefore, since the loads of the first touch leads 21' are different, the uniformity of capacitance values of the capacitors in the touch screen 100 is poor. In theory, the capacitance value of the capacitor at the touch point changes, while the capacitance value of the capacitor at the non-touch point does not change, and thus the touch point may be accurately determined. However, since the loads of the first touch leads 21' is different, the capacitance values of the capacitors will have different degrees of loss. As a result, after processing the received signals, the touch IC will recognize that capacitance values of capacitors have changed, which results in that the touch point cannot be accurately determined by determining the capacitance value on each capacitor, and the touch position is prone to be reported incorrectly. In addition, in a case where the load of a certain first touch lead 21' is too large, a signal on the capacitor coupled to the first touch line 21' will have a large loss when transmitted by the first touch line 21'. As a result, the intensity of the signal received by the touch IC is small or the signal cannot be received, thereby affecting the touch accuracy.

Similarly, as shown in FIG. 4, each column of second touch electrode blocks has a different distance to a side of touch region S (e.g., the right side).

For example, an end of each column of second touch electrode blocks proximate to the lower side of the touch region S is coupled to a corresponding second touch lead 22', and the lengths of all the second touch leads 22' are not identical. Therefore, the resistances of the second touch leads 22' are not identical, and the loads of the second touch leads 22' are not identical. Then, the losses of the second touch signals on the second touch leads 22' are not identical. For example, a second touch lead 22' coupled to a column of second touch electrodes farthest away from the pins couple to the second touch lead 22' have the longest length, the largest load, and the largest loss of the second touch signal thereon.

For example, an end of each column of second touch electrode blocks proximate to the upper side of the touch region S is coupled to a corresponding second touch lead 22', and the lengths of all the second touch leads 22' are also different. Therefore, each second touch lead 22' has a different resistance, and each second touch lead 22' has a different load. Then, the losses of the second touch signals on the second touch leads 22' are also different. In addition, in a direction from one side where the pins couple to the first touch leads are located to the other side where the pins couple to the second touch lead 22' are located, lengths of the second touch leads 22' coupled to ends, at the upper side, of all the columns of second touch electrode blocks gradually decrease, and thus loads of the second touch leads 22' coupled to the ends, at the upper end, of all the columns of second touch electrode blocks gradually decrease. Therefore, losses of second touch signals on the second touch leads 22' coupled to the ends, at the upper side, of all the columns of second touch electrode blocks gradually decrease.

Based on this, after the touch IC sends the second touch signals (e.g., the triggering signals) with the same intensity, second touch signals received by the second touch electrode blocks are different after being transmitted by different second touch leads 22' (e.g., transmitted to the second touch electrode blocks). It can be seen from the above description that the loss of the touch signal on each capacitor has little difference. Therefore, the different loads of the second touch leads 22' will make the initial capacitance values of the capacitors different. Then, the first touch electrode block 21 of each capacitor receives a corresponding first touch signal (e.g., the receiving signal) with a different intensity. The first touch signal (e.g., the receiving signal) is transmitted to the touch IC through the first touch lead 21', and thus the touch IC also receives the first touch signal with a different intensity.

The touch IC determines the capacitance value of the capacitor according to the intensity of the first touch signal, thereby determining the touch point. In theory, the capacitance value of the capacitor at the touch point changes, while the capacitance value of the capacitor at the non-touch point does not change, so that the touch point may be accurately determined. However, since each second touch lead 22' has a different load, each capacitor has a different initial capacitance value. In this case, even if no touch occurs, if the capacitor with the largest capacitance value is considered as the reference, the capacitance values of the other capacitors are equivalent to being changed (no touch action actually occurs). Therefore, the touch IC will recognize that capacitance values of capacitors have changed, which results in that the touch point cannot be accurately determined by determining the capacitance value on each capacitor, and the touch position is prone to be reported incorrectly. In addition, in a case where the load of a certain second touch lead 22' is too large, an initial capacitance value of a capacitor coupled to the second touch lead 22' is too small, and thus the intensity of the first touch signal received by the first touch electrode block 21 of the capacitor is too small. The first touch signal is transmitted to the touch IC through the first touch lead 21' (the loss will occur on the first touch lead 21'), which may cause the intensity of the first touch signal received by the touch IC to be small, or the signal not to be received, thereby affecting the touch accuracy.

Figure 6:
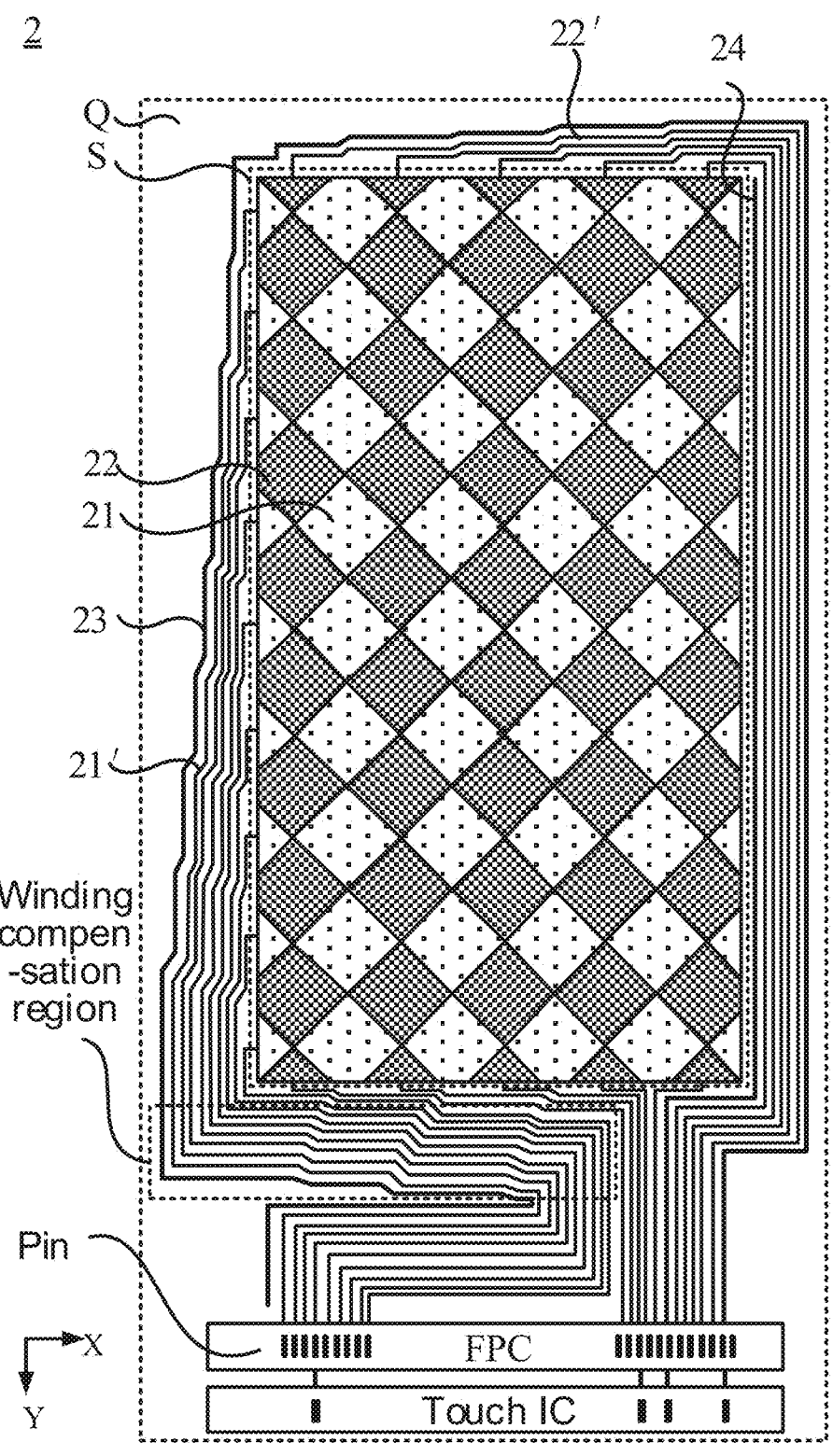
FIG. 6 is a structural diagram of another touch sensor layer, in accordance with some embodiments.

In order to solve the above problems, the embodiments of the present disclosure further provide a touch sensor layer 2. The length of the touch lead increases (different touch leads increase by different lengths) at the lower side (i.e., the side where the FPC is located) of the touch region S of the touch sensor layer 2, so as to compensate for the resistance of the touch lead. As a result, each touch lead has little difference in resistance. For example, as shown in FIG. 6, at the lower side of the touch region S of the touch sensor layer 2, a winding resistance compensation is performed for each first touch lead 21' (as shown in a winding compensation region of FIG. 6), so that each first touch lead 21' has little difference in resistance. Therefore, the difference in the intensity of each first touch signal may be reduced, and the uniformity of the touch signals of the touch screen 100 may be improved.

However, this will cause a large area of a region of the touch sensor layer 2 at the side where the FPC is located. As a result, the display apparatus 1000 has a wide lower bezel, which cannot meet the market demand for the display apparatus 1000 with a narrow bezel.

Example 2

Figure 7A:
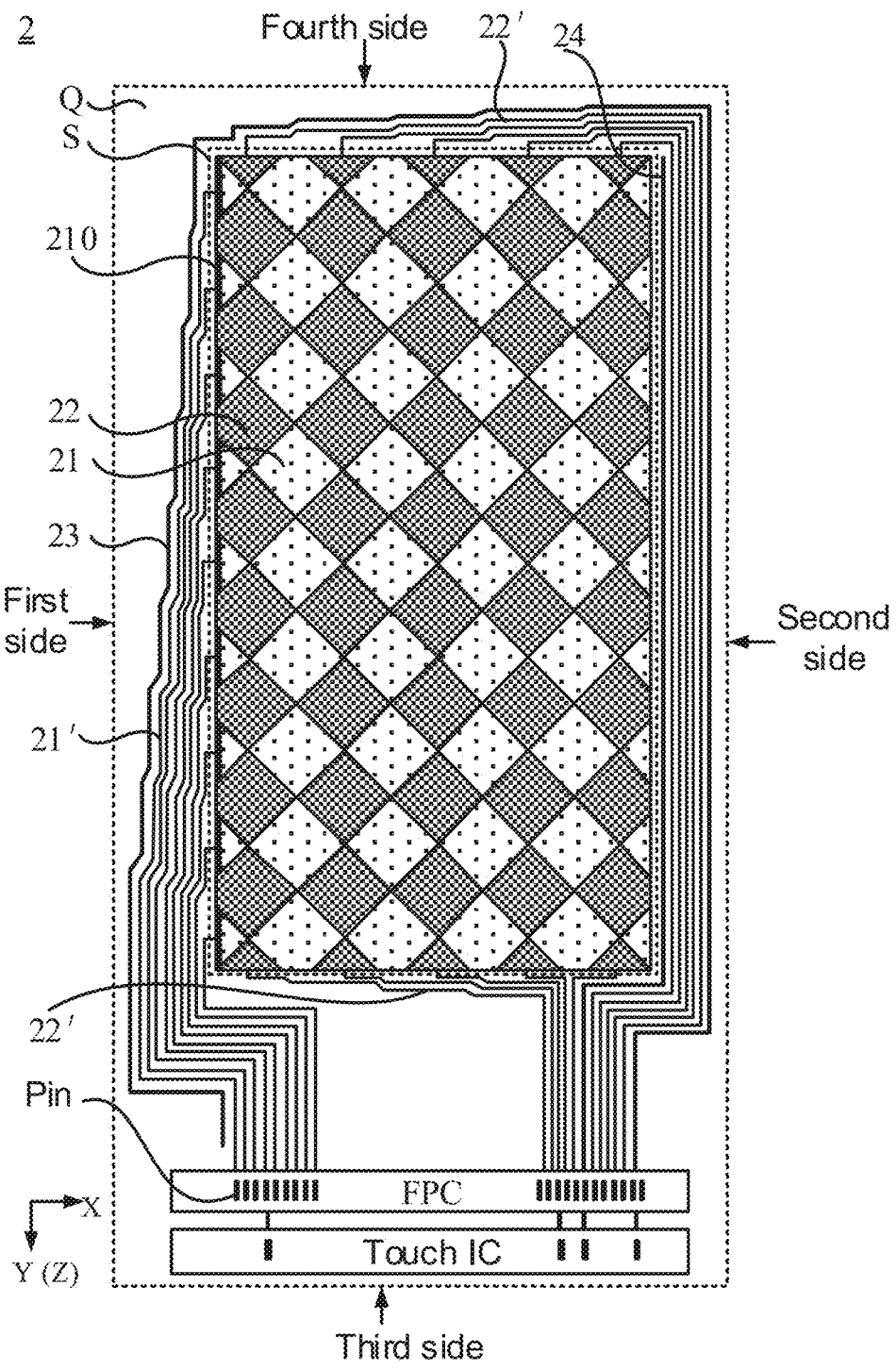
FIG. 7A is a structural diagram of yet another touch sensor layer, in accordance with some embodiments.

In order to solve the above problems, the embodiments of the present disclosure further provide a touch sensor layer 2. As shown in FIG. 7A, the touch sensor layer 2 includes first touch auxiliary portion 210(s), a plurality of first touch electrode blocks 21, a plurality of second touch electrode blocks 22, a plurality of first touch leads 21', a plurality of second touch leads 22', a first signal shielding line 23, a touch IC and an FPC.

The FPC, the touch IC, and the first signal shielding line 23 provided in the current Example may be the same as those in Example 1, reference may be made to the relevant description in Example 1, and details will not be repeated here.

In the current Example, the structures of the first touch electrode block 21 and the second touch electrode block 22 may be the same as those in Example 1, reference may be made to the relevant description in Example 1, and details will not be repeated here.

For convenience of description, the embodiments of the present disclosure will be described by considering an example where the touch region S is of a rectangular shape. Based on this, the wiring region Q is divided into portions located on four sides of the touch region S. For example, the four sides of the touch region S are a first side and a second side that are opposite, and a third side and a fourth side that are opposite and intersect the first side and the second side.

As shown in FIG. 7A, the touch sensor layer 2 includes at least one first touch auxiliary portion 210. FIG. 7A shows an example where the touch sensor layer 2 includes a plurality of first touch auxiliary portions 210.

In a group of first touch electrode blocks located at the outermost periphery and proximate to a same side of the touch region S, first touch auxiliary portions 210 are provided on a side of at least part of the first touch electrode blocks 21 facing the wiring region Q. The first touch auxiliary portion 210 is used to improve the touch signal on the touch sensor layer 2.

It can be understood that, in the example where the touch region S is of the rectangular shape, the first touch electrode blocks 21 are arranged in an array in the touch region S. The group of first touch electrode blocks located at the outermost periphery and proximate to the same side of touch region S may be a group of first touch electrode blocks facing the left side in the outermost circle of the touch region S (as shown in FIG. 7A). Alternatively, the group of first touch electrode blocks at the outermost periphery and proximate to the same side of the touch region S may be a group of first touch electrode blocks facing the right side in the outermost circle of the touch region S. Alternatively, the group of first touch electrode blocks at the outermost periphery and proximate to the same side of the touch region S may be a group of first touch electrode blocks facing the upper side in the outermost circle of the touch region S. Alternatively, the group of first touch electrode blocks at the outermost periphery and proximate to the same side of the touch region S may be a group of first touch electrode blocks facing the lower side in the outermost circle of the touch region S.

The first touch auxiliary portions 210 are provided beside a group of first touch electrode blocks, no matter which side of the touch region S the group of first touch electrode blocks are proximate to, the first touch electrode blocks 21 in the group are insulated from one other.

In some embodiments, as shown in FIG. 7A, the first touch auxiliary portion 210 is coupled to a first touch electrode block 21 adjacent thereto and a first touch lead 21', and is used to compensate for the resistance of the first touch lead 21', so as to improve the touch signal on the touch sensor layer 2.

That is, the first touch auxiliary portion 210 is located between the first touch lead 21' and the first touch electrode block 21. Alternatively, it can be understood that, the first touch auxiliary portions 210 are provided on a side, facing the wiring region Q, of the group of first touch electrode blocks located at the outermost periphery and proximate to a side where the first touch lead 21' is provided of the touch region S.

In the following, the position of the first touch auxiliary portion 210 and the arrangement manners of the first touch leads 21' and the second touch leads 22' are illustrated.

In some embodiments, the touch region S is of the rectangular shape.

Optionally, as shown in FIG. 7A, the first side and the second side of the touch region S are sides where long edges of the touch region S are located (e.g., the left side and the right side), and the third side and the fourth side of the touch region S are sides where short edges of the touch region S are located (e.g., the upper side and the lower side).

Alternatively, the first side and the second side of the touch region S are the sides where the short edges of the touch region S are located, and the third side and the fourth side of the touch region S are the sides where the long edges of the touch region S are located.

In the first possible embodiment provided by the embodiments of the present disclosure, as shown in FIG. 7A, the first side and the second side of the touch region S are the sides where the long edges of the touch region S are located, and the third side and the fourth side of the touch region S are the sides where the short edges of the touch region S are located.

A row of the first touch electrode blocks are only coupled to the first touch lead 21' located on the first side of the touch region S.

It may be understood that, the first touch electrode blocks located in the same row are sequentially arranged in the second direction X, there are a few number of first touch electrode blocks 21 included in the row of first touch electrode blocks, and the first touch signal is transmitted through the row of first touch electrode blocks 21 coupled to the first touch lead 21'. As the transmission distance increases, the first touch signal will gradually attenuate. However, in a case where the number of the first touch electrode blocks 21 is small, the row of first touch electrode blocks are coupled to the first touch lead 21' only at a single side, which may be sufficient to ensure that a first touch electrode block 21 that is farthest away from the first touch lead 21' in the row of the first touch electrode blocks receives the first touch signal.

In some embodiments, first touch electrode blocks 21, provided with first touch auxiliary portions 210 on the side thereof facing the wiring region Q, are arranged sequentially in the first direction Y.

It can also be understood that, the first touch electrode blocks 21, provided with the first touch auxiliary portions 210 on the same side thereof facing the wiring region Q, are disposed proximate to the first side of the touch region S. In this case, the group of first touch electrode blocks at the outermost periphery and proximate to the same side of the touch region S are the group of first touch electrode blocks facing the first side in the outermost circle of the touch region S.

In some embodiments provided in the present disclosure, as shown in FIG. 7A, first touch auxiliary portions 210 are disposed respectively on the side, facing the wiring region Q, of all the first touch electrode blocks 21 in the group of first touch electrode blocks located at the outermost periphery and proximate to the first side of the touch region S.

Figure 7B:
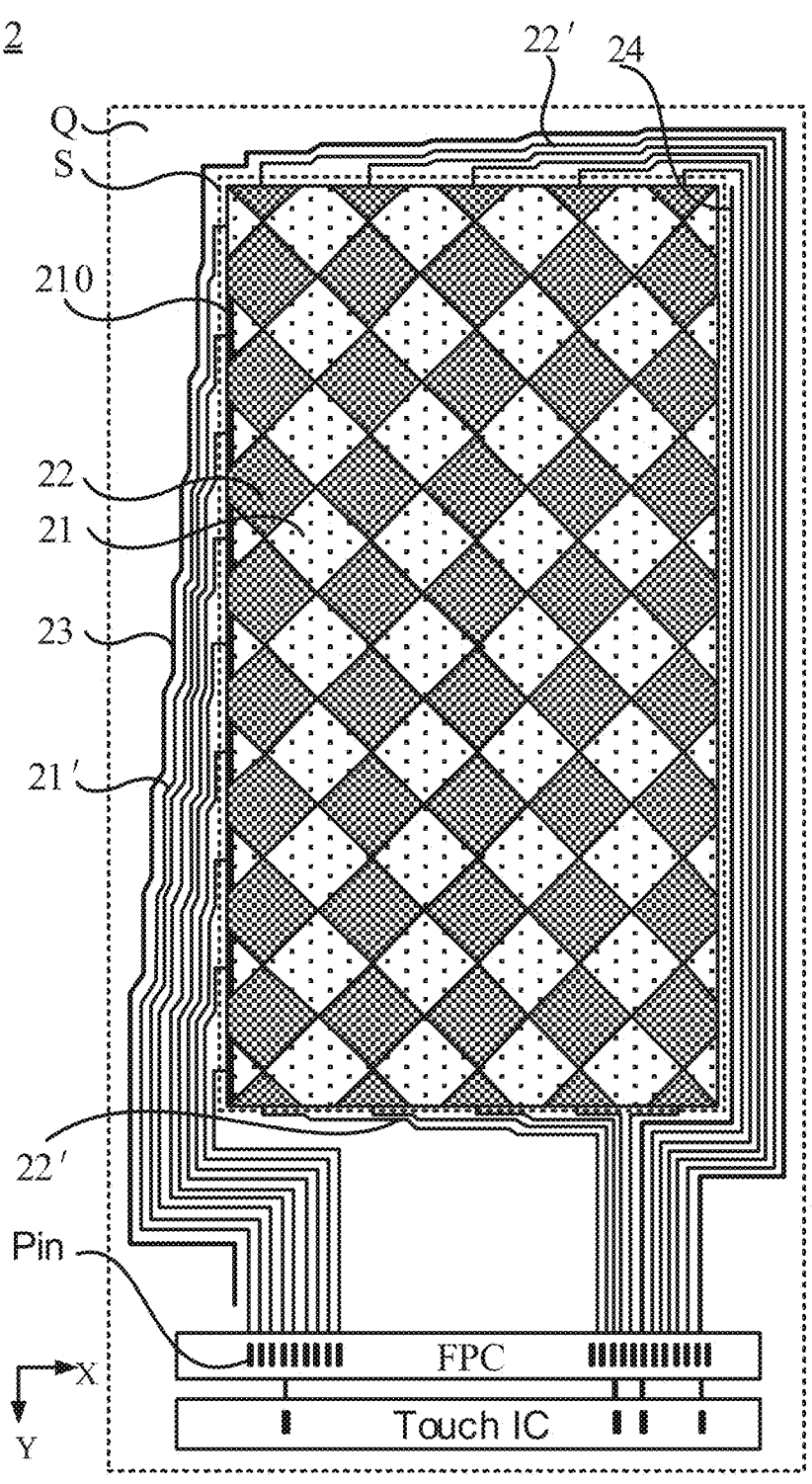
FIG. 7B is a structural diagram of yet another touch sensor layer, in accordance with some embodiments.

In some other embodiments provided in the present disclosure, as shown in FIG. 7B, first touch auxiliary portions 210 are disposed respectively on the side, facing the wiring region Q, of part of the first touch electrode blocks 21 in the group of first touch electrode blocks located at the outermost periphery and proximate to the first side of the touch region S.

For example, as shown in FIG. 7A, a portion of the first touch lead 21' located on the first side of the touch region S extends in a third direction Z. The third direction is parallel to the first direction Y, and the third direction is toward the FPC.

In the group of first touch electrode blocks located at the outermost periphery and proximate to the first side of touch region S, there is no first touch auxiliary portion 210 disposed on the side, facing the wiring region Q, of a first touch electrode block 21 that is farthest away from the FPC, and the first touch electrode block 21 is directly coupled to the first touch lead 21'.

That is, in the first touch electrode blocks 21 arranged sequentially in the first direction Y, the first touch electrode block 21 farthest away from the FPC is not provided with the first touch auxiliary portion 210 on the side thereof facing the wiring region Q, and the other first touch electrode blocks 21 are each provided with a first touch auxiliary portion 210 on the side thereof facing the wiring region Q.

Since the first touch auxiliary portion 210 itself has a resistance, the first touch lead 21' is coupled to the first touch electrode block 21 through the first touch auxiliary portion 210, which is equivalent to increasing the load of the first touch lead 21'. It can be seen from the description in Example 1 that, since the first touch lead 21' coupled to the first touch electrode block 21 farthest away from the FPC has the longest length and the largest resistance, there is no need to perform the resistance compensation. Therefore, in the embodiments of the present disclosure, no first touch auxiliary portion 210 is disposed on the side, facing the wiring region Q, of the first touch electrode block 21 farthest away from the FPC, which is equivalent to considering the first touch lead 21' coupled to the first touch electrode block 21 farthest away from the FPC as the reference to perform the resistance compensation for the other first touch lead 21'. As a result, each first touch lead 21' has an equal or approximately equal resistance, that is, the first touch signal on each first touch lead 21' has equal or approximately equal loss. In this way, the capacitance value of each capacitor at the non-touch position obtained by the touch IC has little difference, so the uniformity of the capacitance values of the touch screen 100 may be relatively good. That is, the capacitance value of the capacitor at the touched position will change, and the capacitance value of the capacitor at the non-touch position will remain unchanged or approximately unchanged. Therefore, the touch point may be relatively accurately determined by determining the capacitance value of each capacitor.

Alternatively, for example, in the first touch electrode blocks 21 arranged sequentially in the first direction Y, some first touch electrode blocks 21 relatively far away from the FPC are each not provided with the first touch auxiliary portion 210 on the side thereof facing the wiring region Q, and the other first touch electrode blocks 21 are each provided with the first touch auxiliary portion 210 on the side thereof facing the wiring region Q.

As for the first touch leads 21', the plurality of first touch leads 21' are as a group. One end of the first touch lead 21' located on the first side of the touch region S is a first end, and the other end of the first touch lead 21' located on the third side of the touch region S is a second end.

The first touch auxiliary portion 210 is disposed between the first touch electrode block 21 and the first end of the first touch lead 21', and the first touch auxiliary portion 210 is coupled to the first touch electrode block 21 adjacent to the first touch auxiliary portion 210 and the first end of the first touch lead 21'.

That is, the first touch auxiliary portion 210 is disposed between the first touch electrode block 21 and the first touch lead 21', and the first end of the first touch lead 21' is coupled to the first touch electrode block 21 through the first touch auxiliary portion 210. In a case where the first touch auxiliary portion 210 is not provided between the first end of the first touch lead 21' and the first touch electrode block 21, the first end of the first touch lead 21' is directly coupled to the first touch electrode block 21.

The second end of the first touch lead 21' is coupled to the FPC (i.e., the FPC is located on the third side of the touch region S).

As for the second touch leads 22', the plurality of second touch leads 22' are divided into two groups, a first group of second touch leads 22' extend from the fourth side to the third side through the second side of the touch region S, and a second group of second touch leads 22' are located on the third side of the touch region S.

That is, both ends of each column of the second touch electrode blocks are each coupled to a second touch lead 22' in one of the two groups.

It may be understood that the second touch electrode blocks located in the same column are sequentially arranged in the first direction Y, there are a large number of second touch electrode blocks 22 included in the column of second touch electrode blocks, and the second touch signal is transmitted, starting from the first second touch electrode block coupled to the second touch lead 22', sequentially through the column of second touch electrodes in a direction away from the second touch lead 22'. As the transmission distance increases, the second touch signal will gradually attenuate. Based on this, in a case where the number of the second touch electrode blocks 22 is large, both ends of the same column of second touch electrode blocks are respectively coupled to different second touch leads 22', which may ensure that a second touch electrode block 22 farthest away from the second touch lead 22' in the column of second touch electrode blocks receives the second touch signal.

One end of the second touch lead 22' in the first group located on the fourth side of the touch region S is a first end, and the other end of the second touch lead 22' in the first group located on the third side of the touch region S is a second end. Both a first end and a second end of the second touch lead 22' in the second group are located on the third side of the touch region S. The first end of the second touch lead 22' is coupled to the column of second touch electrode blocks proximate to the first end of the second touch lead 22', and the second end of the second touch lead 22' is coupled to the touch IC.

It can be seen from the above description that one of the first touch electrode block 21 and the second touch electrode block 22 is the triggering electrode block Tx, and the other thereof is the receiving electrode block Rx. One of the first touch lead 21' and the second touch lead 22' is a triggering signal lead Tx', and the other thereof is a receiving signal lead Rx'. Therefore, the wiring manner shown in FIG. 7A may be called 2T1R or 1T2R.

In this way, the wiring manner of the touch leads may be either 2T1R or 1T2R. The diversified wiring manner may be suitable for touch screens 100 with different aspect ratios.

Figure 7C:
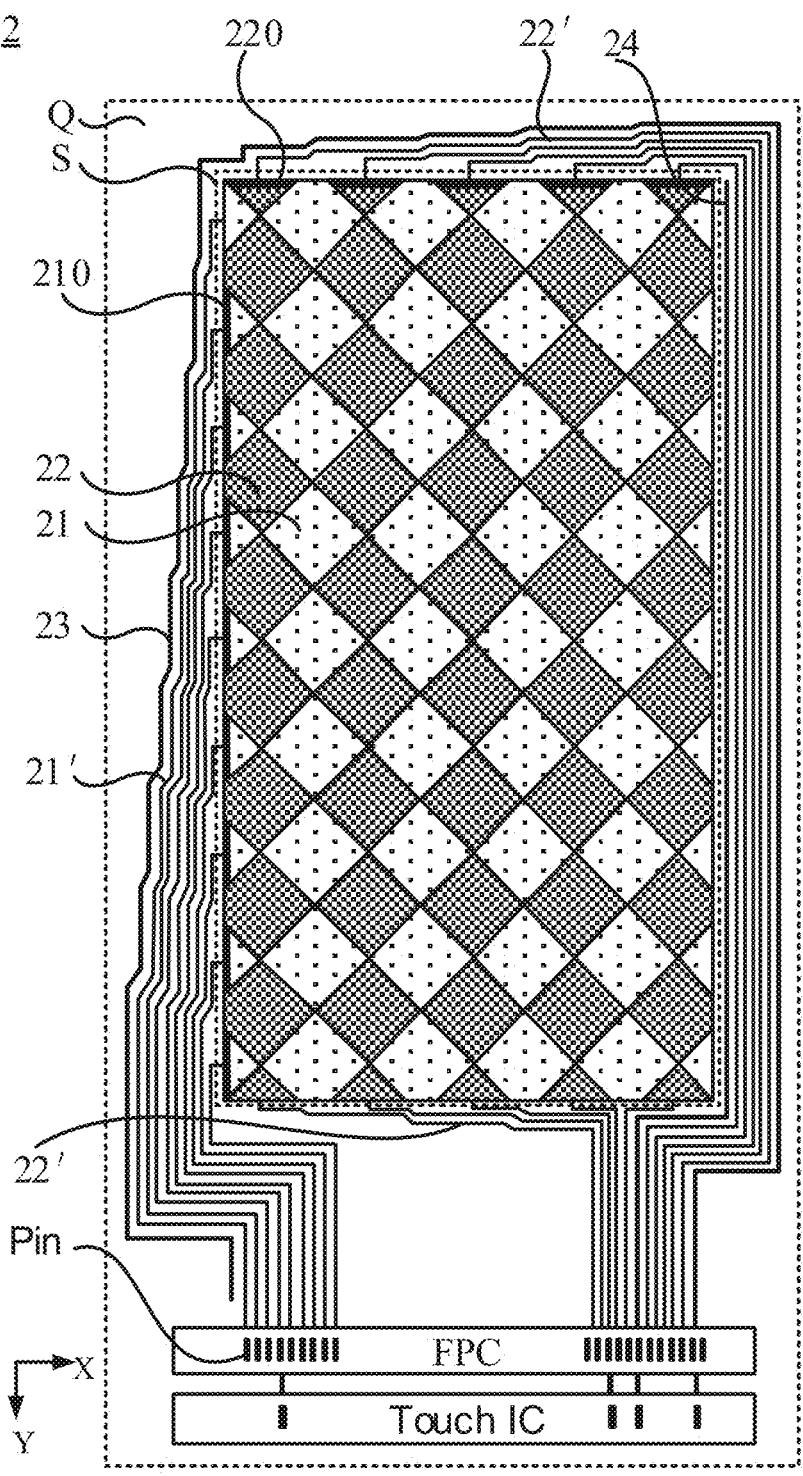
FIG. 7C is a structural diagram of yet another touch sensor layer, in accordance with some embodiments.

In some embodiments, as shown in FIG. 7C, the touch sensor layer 2 further includes at least one second touch auxiliary portion 220. FIG. 7C shows an example where the touch sensor layer 2 includes a plurality of second touch auxiliary portions 220.

The second touch auxiliary portion 220 is disposed between the second touch electrode block 22 and the second touch lead 22', and the second touch auxiliary portion 220 is coupled to the second touch electrode block 22 and the second touch lead 22'.

In a possible embodiment, as shown in FIG. 7C, second touch electrode blocks 22, provided with second touch auxiliary portions 220 on the side thereof facing the wiring region Q, are arranged sequentially in the second direction X.

It can also be understood that, the second touch electrode blocks 22, provided with the second touch auxiliary portions 220 on the side facing the wiring region Q, are disposed proximate to the fourth side of the touch region S.

In some embodiments provided in the present disclosure, as shown in FIG. 7C, second touch auxiliary portions 220 are disposed respectively on the side, facing the wiring region Q, of all of second touch electrode blocks 22 coupled to a group of second touch leads 22'.

Figure 7D:
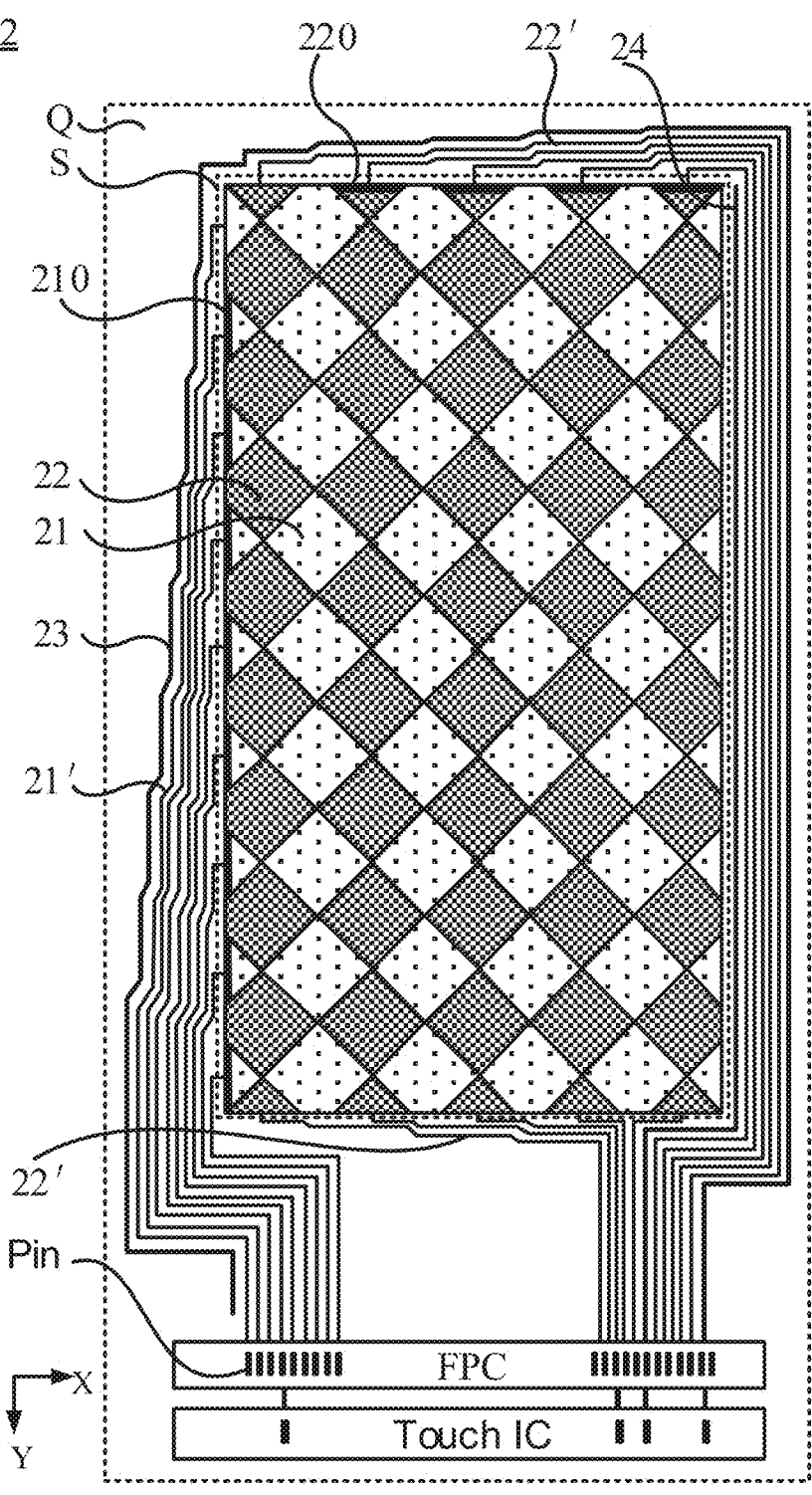
FIG. 7D is a structural diagram of yet another touch sensor layer, in accordance with some embodiments.

In some other embodiments provided in the present disclosure, as shown in FIG. 7D, second touch auxiliary portions 220 are disposed respectively on the side, facing the wiring region Q, of part of the second touch electrode blocks 22 coupled to the group of second touch leads 22'.

For example, in the second touch electrode blocks 22 coupled to the group of second touch leads 22', there is no second touch auxiliary portion 220 disposed on the side, facing the wiring region Q, of a second touch electrode block 22 proximate to the first side of the touch region S.

Since the second touch auxiliary portion 220 itself has a resistance, the second touch lead 22' is coupled to the second touch electrode block 22 through the second touch auxiliary portion 220, which is equivalent to increasing the load of the second touch lead 22'. It can be seen from the description in Example 1 that, the second touch leads 22' coupled to the second touch electrode block 22 closest to the first side of the touch region S has the relatively longest length, so that the second touch lead 22' has the largest resistance, and thus there is no need to perform the resistance compensation. Therefore, in the embodiments of the present disclosure, no second touch auxiliary portion 220 is disposed on the side, facing the wiring region Q, of the second touch electrode block 22 closest to the first side of the touch region S, which is equivalent to considering the second touch lead 22' coupled to the second touch electrode block 22 closest to the first side of the touch region S as the reference to perform the resistance compensation for the other second touch leads 22'. As a result, each second touch lead 22' may have an equal or approximately equal resistance. Therefore, the second touch signal on each second touch lead 22' has equal or approximately equal loss. In this way, the actual capacitance value of each capacitor at the non-touch position has little difference, so the uniformity of the capacitance values of the touch screen 100 may be relatively good. The capacitance value of the capacitor at the touched position will change, and the capacitance value of the capacitor at the non-touch position will remain unchanged or approximately unchanged. Therefore, the touch point may be relatively accurately determined by determining the capacitance value of each capacitor.

Figure 7E:
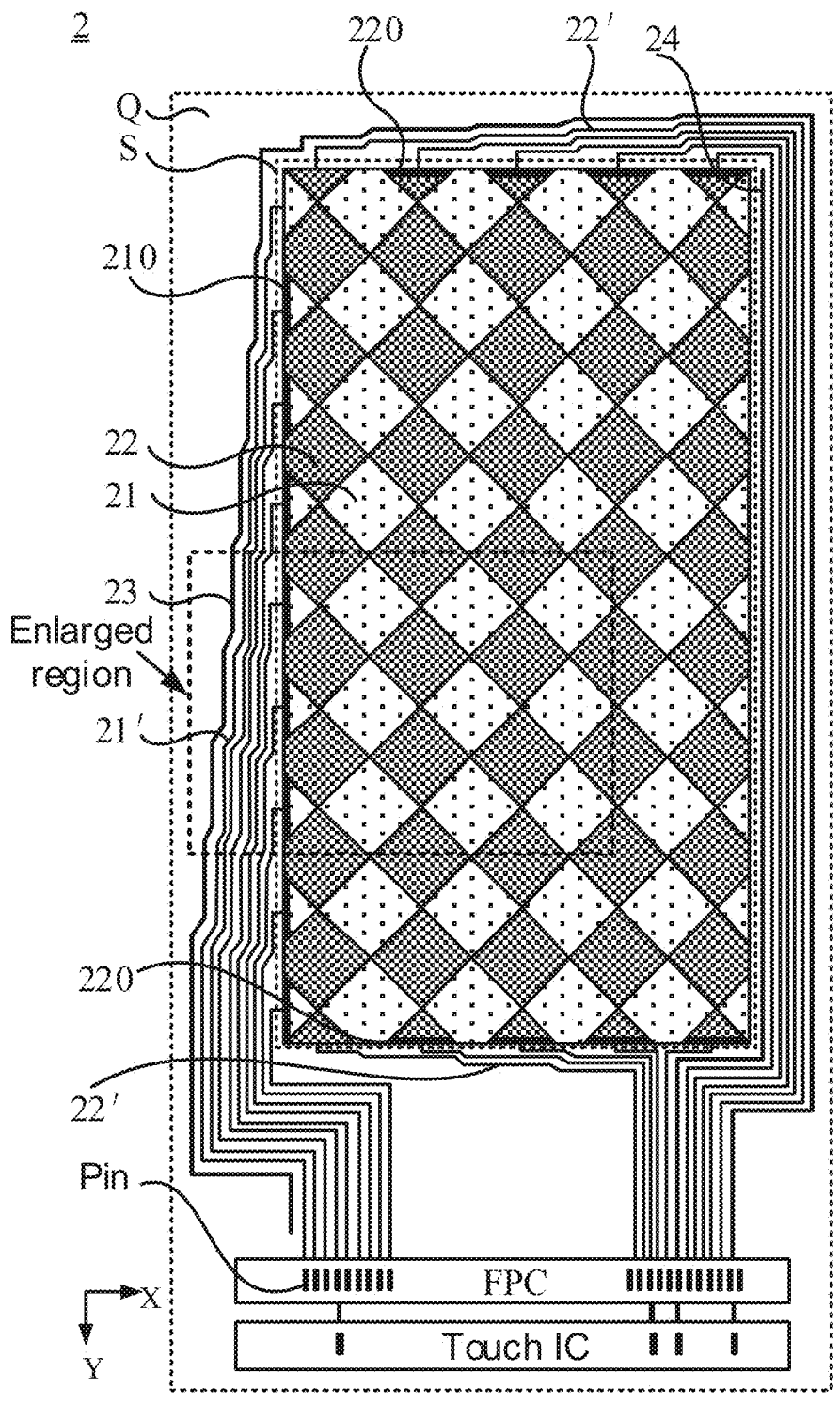
FIG. 7E is a structural diagram of yet another touch sensor layer, in accordance with some embodiments.

In another possible embodiment, as shown in FIG. 7E, second touch electrode blocks 22, provided with second touch auxiliary portions 220 on the side thereof facing the wiring region Q, are divided into two groups, and second touch electrode blocks 22 in each group are sequentially arranged in the second direction X.

It can also be understood that one group of second touch electrode blocks 22 are disposed proximate to the third side of the touch region S, and second touch auxiliary portions 220 are disposed respectively on the side, facing the third side of the touch region S, of at least part of the second touch electrode blocks 22 in the group of second touch electrode blocks 22. The other group of second touch electrode blocks 22 are disposed proximate to the fourth side of the touch region S, and second touch auxiliary portions 220 are disposed respectively on the side, facing the fourth side of the touch region S, of at least part of the second touch electrode blocks 22 in the other group of second touch electrode blocks 22.

For the positional relationship between the second touch electrode blocks 22 and the second touch auxiliary portions 220 in each group, reference may be made to the above case that the second touch electrode blocks 22 provided with the second touch auxiliary portions 220 on the side thereof facing the wiring region Q are only divided into one group, and details will not be repeated here.

In some embodiments, the touch sensor layer 2 further includes a second signal shielding line 24. As shown in FIGS. 7A to 7E, the second signal shielding line 24 is located on the second side of the touch region S, and is disposed between the touch region S and the second touch lead 22' closest to the touch region S. The extending direction of the second signal shielding line 24 is parallel to the first direction Y. One end of the second signal shielding line 24 is coupled to the touch IC, and the other end of the second signal shielding line 24 is floating.

The shielding signal transmitted by the second signal shielding line 24 and the shielding signal transmitted by the first signal shielding line 23 may be the same. The shielding signal on the second signal shielding line 24 may prevent crosstalk between the second touch signal on the second touch lead 22' and the first touch signal on the first touch electrode block 21 proximate to the second touch lead 22'.

Figure 8A:
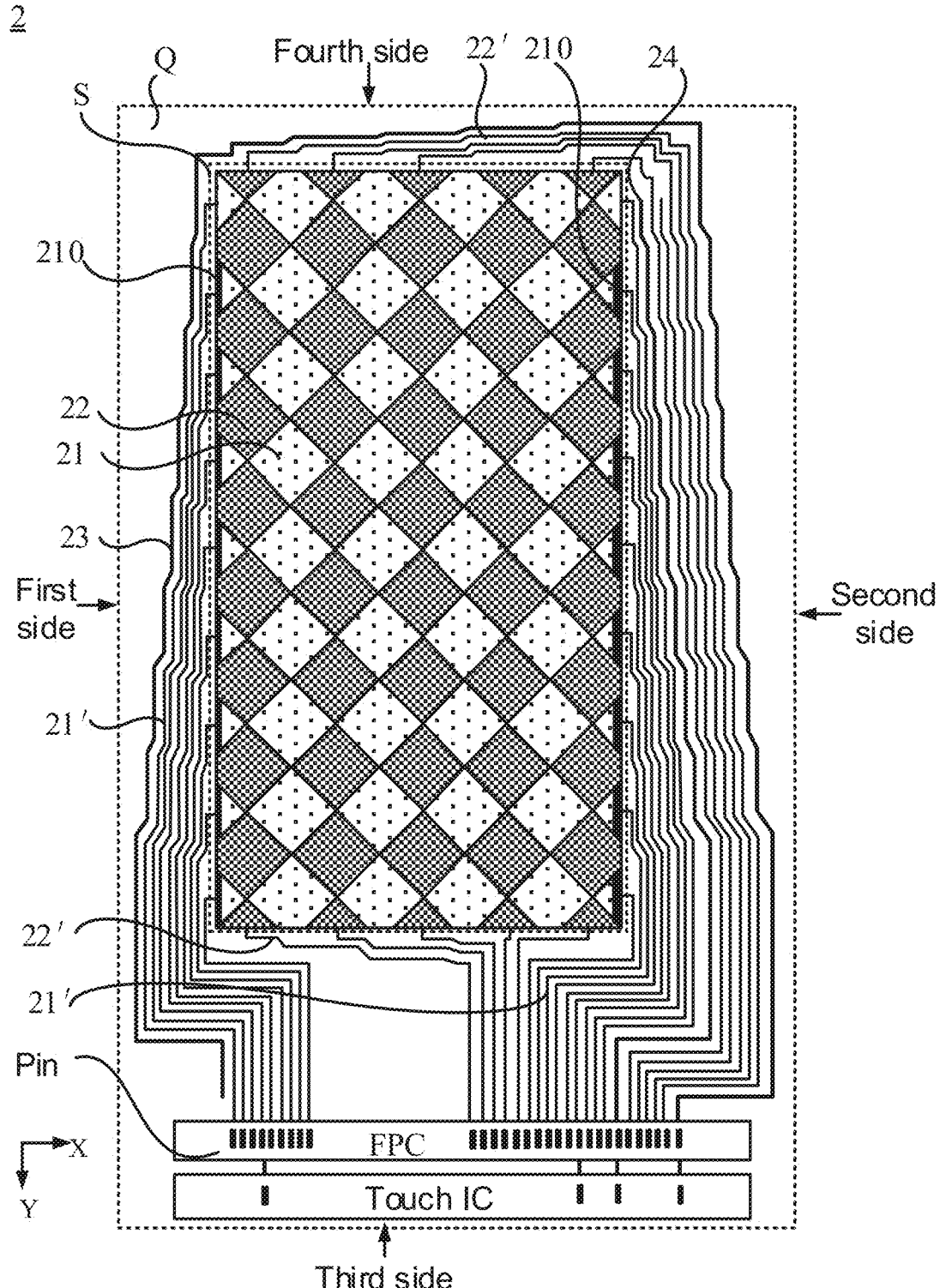
FIG. 8A is a structural diagram of yet another touch sensor layer, in accordance with some embodiments.

In the second possible embodiment provided by the embodiments of the present disclosure, as shown in FIG. 8A, the first side and the second side of the touch region S are the sides where the long edges of the touch region S are located, and the third side and the fourth side of the touch region S are the sides where the short edges of the touch region S are located.

Alternatively, the first side and the second side of the touch region S are the sides where the short edges of the touch region S are located, and the third side and the fourth side of the touch region S are the sides where the long edges of the touch region S are located. The following description is made only by considering an example where the first side and the second side of the touch region S are the sides where the long edges of the touch region S are located.

Both ends of a row of first touch electrode blocks are respectively coupled to different first touch leads 21'.

The first touch auxiliary portion 210 is disposed between the first touch electrode block 21 and the first end of the first touch lead 21'.

It may be that, in some embodiments, as shown in FIG. 8A, first touch auxiliary portions 210 are disposed respectively between a group of first touch electrode blocks located at the outermost periphery and proximate to the first side of the touch region S and a group of first touch leads 21', and other first touch auxiliary portions 210 are disposed respectively between another group of first touch electrode blocks located at the outermost periphery and proximate to the second side of the touch region S and another group of first touch leads 21'.

It may also be that, in some other embodiments, the first touch auxiliary portions 210 are disposed respectively between the group of first touch electrode blocks located at the outermost periphery and proximate to the first side of the touch region S and the group of first touch leads 21', and the another group of first touch electrode blocks located at the outermost periphery and proximate to the second side of the touch region S are directly coupled to the another group of first touch leads 21'.

The first touch electrode blocks 21 in each group are sequentially arranged in the first direction Y.

It can also be understood that, one group of first touch electrode blocks 21 are disposed proximate to the first side of the touch region S, and first touch auxiliary portions 210 are disposed respectively on the side, facing the first side of the touch region S, of at least part of the first touch electrode blocks 21 in the group of first touch electrode blocks 21. The other group of first touch electrode blocks 21 are disposed proximate to the second side of the touch region S, and first touch auxiliary portions 210 are disposed respectively on the side, facing the second side of the touch region S, of at least part of the first touch electrode blocks 21 in the other group of first touch electrode blocks 21.

For the positional relationship between the first touch electrode blocks 21 and the first touch auxiliary portions 210 in each group, reference may be made to the above case where the first touch electrode blocks 21 provided with the first touch auxiliary portion 210 on the side thereof facing the wiring region Q are only divided into one group, and details will not be repeated here.

As for the first touch leads 21', the plurality of first touch leads 21' are divided into two groups. A first group of first touch leads 21' extend from the first side to the third side of the touch region S, and a second group of first touch leads 21' extend from the second side to the third side of the touch region S.

That is, both ends of each row of the first touch electrode blocks are each coupled to a first touch lead 21' in one of the two groups.

One end of the first touch lead 21' in the first group located on the first side of the touch region S is the first end, and the other end of the first touch lead 21' in the first group located on the third side of the touch region S is the second end. One end of the first touch lead 21' in the second group located on the second side of the touch region S is the first end, and the other end of the first touch lead 21' in the second group located on the third side of the touch region S is the second end. The first end of the first touch lead 21' is coupled to a row of first touch electrode blocks proximate to the first end of the first touch lead 21', and the second end of the first touch lead 21' is coupled to the touch IC.

As for the second touch lead 22', in some embodiments provided in the present disclosure, as shown in FIG. 8A, the plurality of second touch leads 22' are divided into two groups, the first group of second touch leads 22' extend from the fourth side to the third side through the second side of the touch region S, and the second group of second touch leads 22' are located on the third side of the touch region S.

That is, both ends of each column of the second touch electrode blocks are each coupled to a second touch lead 22' in one of the two groups. Reference may be made to the description of the second touch lead 22' in FIG. 7A, and details will not be repeated here.

Therefore, the wiring manner shown in FIG. 8A may be called 2T2R, and this wiring manner may ensure that in a line of touch electrode blocks coupled to a touch lead, a touch signal received by a touch electrode block farther away from the touch lead and a touch signal received by a touch electrode block closer to the touch lead has little difference, so as to ensure the touch accuracy of the touch screens 100 with relatively large sizes.

Figure 8B:
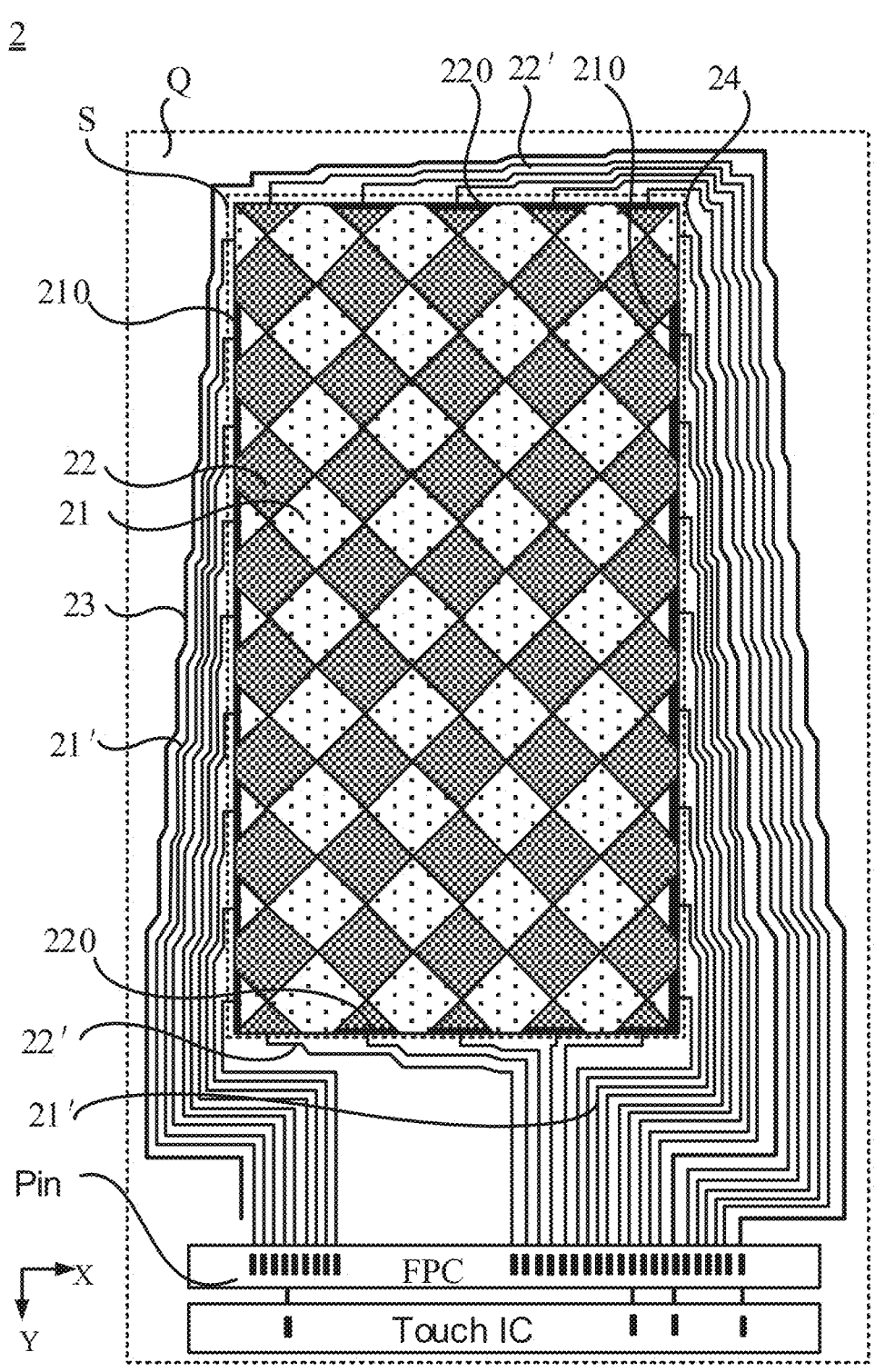
FIG. 8B is a structural diagram of yet another touch sensor layer, in accordance with some embodiments.

In some embodiments, as shown in FIG. 8B, the touch sensor layer 2 further includes at least one second touch auxiliary portion 220. FIG. 8B shows an example where the touch sensor layer 2 includes the plurality of second touch auxiliary portions 220.

The arrangement manner of the second touch auxiliary portions 220 may be the same as that in the above first possible embodiment, and reference may be made to the description of the second touch auxiliary portions 220 in the first possible embodiment.

In some embodiments, as shown in FIGS. 8A and 8B, the touch sensor layer 2 further includes the second signal shielding line 24. The second signal shielding line 24 is located on the second side of the touch region S, and is disposed between the first touch lead 21' farthest away from the first side of the touch region S and the second touch lead 22' closest to the touch region S. The extending direction of the second signal shielding line 24 is parallel to the first direction Y. One end of the second signal shielding line 24 is coupled to the touch IC, and the other end of the second signal shielding line 24 is floating. The shield signal on the second signal shielding line 24 may prevent crosstalk between the second touch signal on the second touch lead 22' and the first touch signal on the first touch lead 21' proximate to the second touch lead 22'.

Figure 9A:
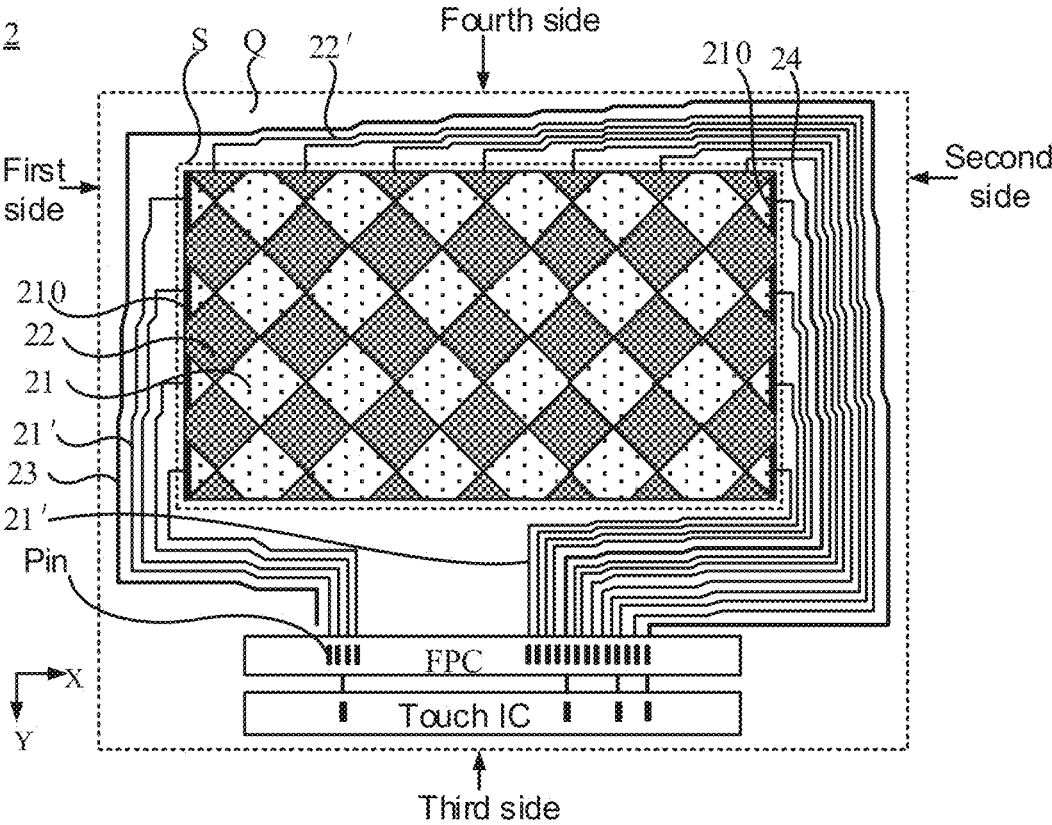
FIG. 9A is a structural diagram of yet another touch sensor layer, in accordance with some embodiments.

In the third possible embodiment provided by the embodiments of the present disclosure, as shown in FIG. 9A, the first side and the second side of the touch region S are the sides where the short edges of the touch region S are located (e.g., the left side and the right side of the touch region S), and the third side and the fourth side of the touch region S are the sides where the long edges of the touch region S are located (e.g., the upper side and the lower side).

The first touch auxiliary portion 210 is disposed between the first touch electrode block 21 and the first end of the first touch lead 21'.

It may be that, in some embodiments, as shown in FIG. 9A, first touch auxiliary portions 210 are disposed respectively between a group of first touch electrode blocks located at the outermost periphery and proximate to the first side of the touch region S and a group of first touch leads 21', and other first touch auxiliary portions 210 are disposed respectively between another group of first touch electrode blocks located at the outermost periphery and proximate to the second side of the touch region S and another group of first touch leads 21'.

It may also be that, in some other embodiments, the first touch auxiliary portions 210 are disposed respectively between the group of first touch electrode blocks located at the outermost periphery and proximate to the first side of the touch region S and the group of first touch leads 21', the another group of first touch electrode blocks located at the outermost periphery and proximate to the second side of the touch region S are directly coupled to the another group of first touch leads 21'.

The first touch electrode blocks 21 in each group are sequentially arranged in the first direction Y.

It can also be understood that, one group of first touch electrode blocks 21 are disposed proximate to the first side of the touch region S, and first touch auxiliary portions 210 are disposed respectively on the side, facing the first side of the touch region S, of at least part of the first touch electrode blocks 21 in the group of first touch electrode blocks 21. The other group of first touch electrode blocks 21 are disposed proximate to the second side of the touch region S, and first touch auxiliary portions 210 are disposed respectively on the side, facing the second side of the touch region S, of at least part of the first touch electrode blocks 21 in the other group of first touch electrode blocks 21.

As for the first touch leads 21', the plurality of first touch leads 21' are divided into two groups. A first group of first touch leads 21' extend from the first side to the third side of the touch region S, and a second group of first touch leads 21' extend from the second side to the third side of the touch region S.

That is, both ends of each row of the first touch electrode blocks are each coupled to a first touch lead 21' in one of the two groups.

As for the second touch lead 22', the plurality of second touch leads 22' are as a group, and the second touch leads 22' extend from the fourth side to the third side through the second side of the touch region S.

That is, one end of the second touch electrode block in each column is coupled to the second touch lead 22'.

Therefore, this wiring manner shown in FIG. 9A may also be called 2T1R or 1T2R. In this way, the wiring manner of the touch leads may be either 2T1R or 1T2R. The diversified wiring manner may be suitable for touch screens 100 with different aspect ratios.

Figure 9B:
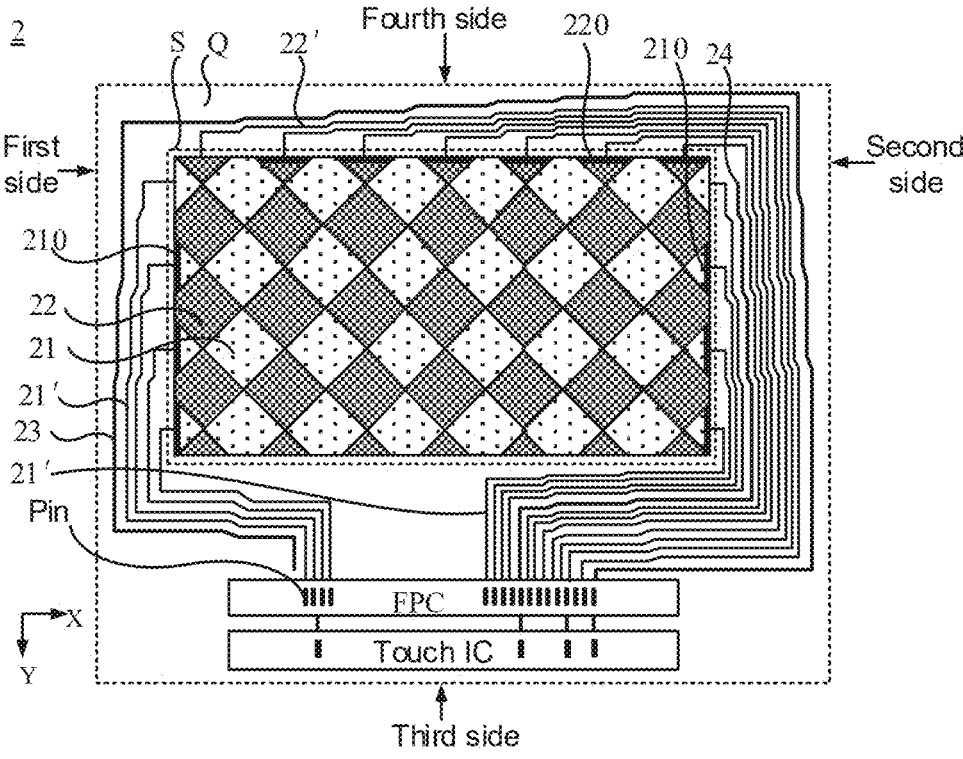
FIG. 9B is a structural diagram of yet another touch sensor layer, in accordance with some embodiments.

In some embodiments, as shown in FIG. 9B, the touch sensor layer 2 further includes at least one second touch auxiliary portion 220. FIG. 9B shows an example where the touch sensor layer 2 includes the plurality of second touch auxiliary portions 220.

In some embodiments, second touch electrode blocks 22, provided with second touch auxiliary portions 220 on the side thereof facing the wiring region Q, are arranged sequentially in the second direction X.

It can also be understood that, the second touch electrode blocks 22, provided with the second touch auxiliary portions 220 on the side facing the wiring region Q, are disposed proximate to the third side or the fourth side of the touch region S.

The arrangement manner of the second touch auxiliary portions 220 may be the same as the case that the second touch auxiliary portions 220 are disposed on a single side in the first possible embodiment, and reference may be made to the description of the second touch auxiliary portions 220 in the first possible embodiment.

In some embodiments, as shown in FIGS. 9A and 9B, the touch sensor layer 2 further includes the second signal shielding line 24. The second signal shielding line 24 is located on the second side of the touch region S, and is disposed between the first touch lead 21' farthest away from the first side of the touch region S and the second touch lead 22' closest to the touch region S. The extending direction of the second signal shielding line 24 is parallel to the first direction Y. One end of the second signal shielding line 24 is coupled to the touch IC, and the other end of the second signal shielding line 24 is floating.

The shielding signal transmitted by the second signal shielding line 24 and the shielding signal transmitted by the first signal shielding line 23 may be the same. The shielding signal on the second signal shielding line 24 may prevent crosstalk between the first touch signal on the first touch lead 21' and the second touch signal on the second touch lead 22' proximate to the first touch lead 21'.

As shown in FIGS. 7A to 9B, in a case where the touch region S is of the rectangular shape, the wiring manner of the first touch leads 21' and the second touch leads 22' include 2T1R, 1T2R or 2T2R. The diversified wiring manner may be suitable for touch screens 100 with different aspect ratios and different sizes.

As for the arrangement position of the first touch auxiliary portion 210, in some embodiments of the present disclosure, the first touch auxiliary portion 210 is located in the wiring region Q.

In some other embodiments of the present disclosure, a portion of the first touch auxiliary portion 210 is located in the wiring region Q, and the other portion of the first touch auxiliary portion 210 is located in the touch region S.

In this way, the requirement for the accuracy of arrangement position of the first touch auxiliary portion 210 is low, so that the requirement for the process precision of forming the first touch auxiliary portion 210 may be reduced.

In some other embodiments of the present disclosure, the first touch auxiliary portion 210 is located in the touch region S.

It can be seen from the above description that the touch region S overlaps the display region of the display apparatus 1000, and the wiring region Q is located in the peripheral region of the display apparatus 1000. In this way, it is possible to avoid the relatively wide bezel of the display apparatus 1000 caused by the increase of the peripheral region of the display apparatus 1000 due to the increase of the wiring region Q in a case where the first touch auxiliary portions 210 are disposed in the wiring region Q at the periphery of the touch region S.

No matter which region the first touch auxiliary portions 210 are disposed in, the first touch auxiliary portions 210 may be of the same structure.

Figure 10:
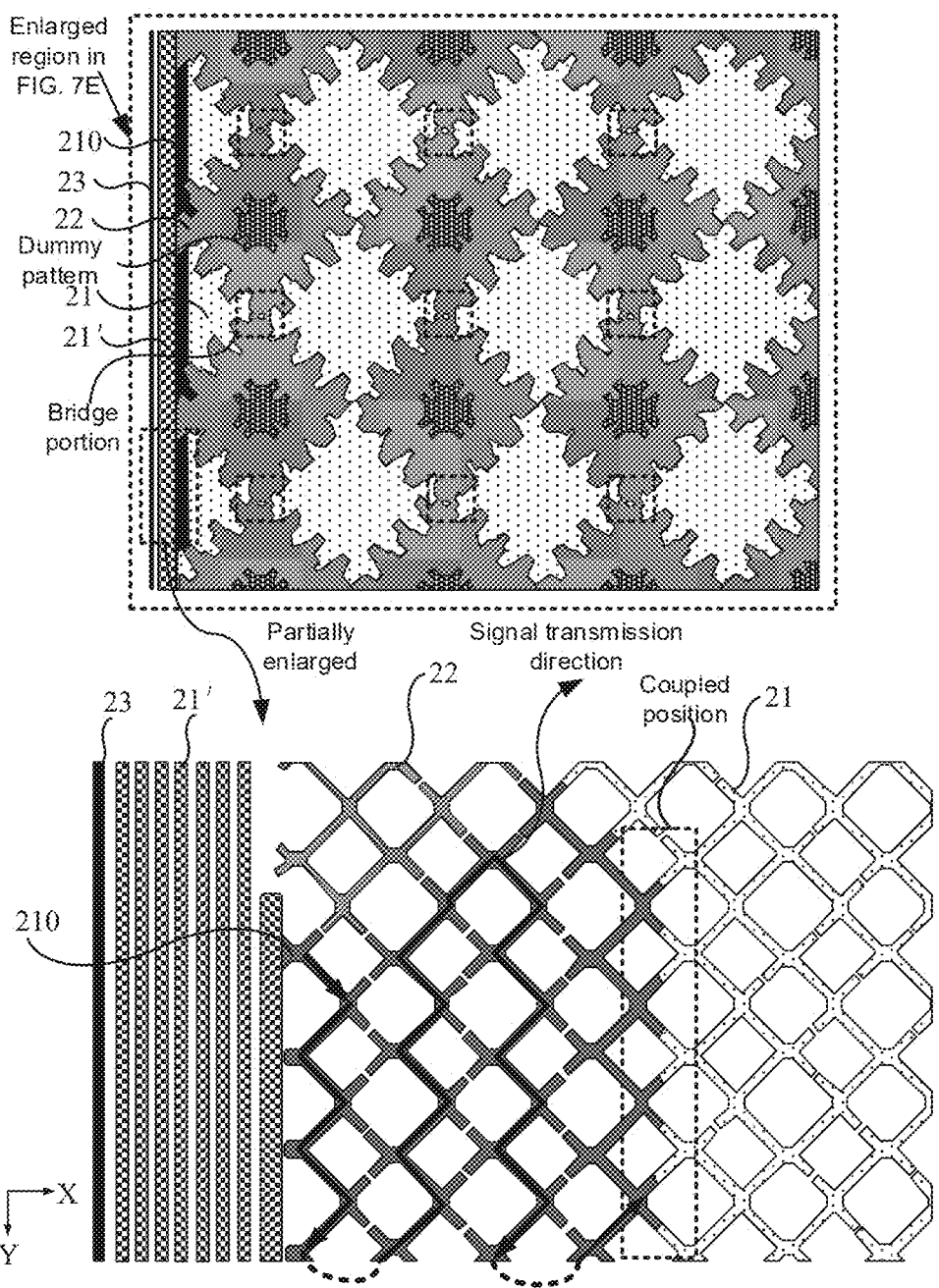
FIG. 10 is an enlarged structural diagram of a portion of a touch sensor layer, in accordance with some embodiments.

As for the structure of the first touch auxiliary portion 210, in some embodiments, as shown in FIG. 10, the first touch auxiliary portion 210 and the first touch electrode block 21 are both of metal mesh structures.

It will be noted that, FIG. 10 shows an example where the first touch electrode block 21 is the receiving electrode block Rx, and the second touch electrode block 22 is the triggering electrode block Tx. A dummy pattern is disposed in the middle of the triggering electrode block Tx to balance the load of the triggering electrode block Tx.

As shown in FIG. 10, in a case where the first touch auxiliary portion 210 is located in the touch region S, the first touch electrode block 21 may be processed to make part of the structure originally belonging to the first touch electrode block 21 used as the first touch auxiliary portion 210. The first touch auxiliary portion 210 and the first touch electrode block 21 may be disposed in the same layer, formed simultaneously and made of the same material, which may simplify the process steps. In addition, the first touch auxiliary portion 210 is of the metal mesh structure, which may avoid a problem of non-uniform display of the edge region and the middle region of the display apparatus 1000 in a case where the first touch auxiliary portion 210 is of a block structure, and is beneficial to improving the display effect of the display apparatus 1000.

For example, the metal mesh used as the first touch electrode block 21 has a structure connected in all directions. That is, the signal travels in all the directions along the mesh. The metal mesh, formed after the mesh is performed a breaking processing, used as the first touch auxiliary portion 210 has a mesh structure of a single-line signal conduction structure. That is, the signal travels along a single path.

In this way, one side of the metal mesh of the first touch auxiliary portion 210 is coupled to the first end of the first touch lead 21', and the other side of the metal mesh of the first touch auxiliary portion 210 is coupled to the first touch electrode block 21 proximate to the first end of the first touch lead 21'. The first touch lead 21', the first touch auxiliary portion 210 and the first touch electrode block 21 are communicated with one another to transmit the first touch signal.

For example, the first touch signal on the first touch lead 21' may be transmitted to the first touch auxiliary portion 210, and the first touch signal on the first touch auxiliary portion 210 may be transmitted in a detouring direction of the metal mesh of the first touch auxiliary portion 210 to the first touch electrode block 21 finally. Alternatively, the first touch signal on the first touch electrode block 21 may be transmitted to the first touch auxiliary portion 210, and the first touch signal on the first touch auxiliary portion 210 may be transmitted in the detouring direction of the metal mesh of the first touch auxiliary portion 210 to the first touch lead 21' finally.

In some embodiments, the first touch auxiliary portion 210 and the first touch electrode block 21 may be disposed in the same layer and formed simultaneously, so as to simplify the manufacturing process.

It will be noted that the first touch auxiliary portion 210 compensates for the resistance of each first touch lead 21' through its own resistance. An area of the metal mesh of the first touch auxiliary portion 210 is directly related to the resistance of the first touch auxiliary portion 210. Therefore, the area of the first touch auxiliary portion 210 is determined depending on the resistance value to be compensated. The greater the resistance value to be compensated, the larger the area of the first touch auxiliary portion 210.

As for the structure of the first touch auxiliary portion 210, in some other embodiments provided in the present disclosure, the first touch auxiliary portion 210 is of a metal block structure or a non-mesh-like winding structure, etc.

It can be seen from the above description that each first touch lead 21' has a different resistance. Therefore, each first touch lead 21' has a different resistance value to be compensated.

Figure 11:
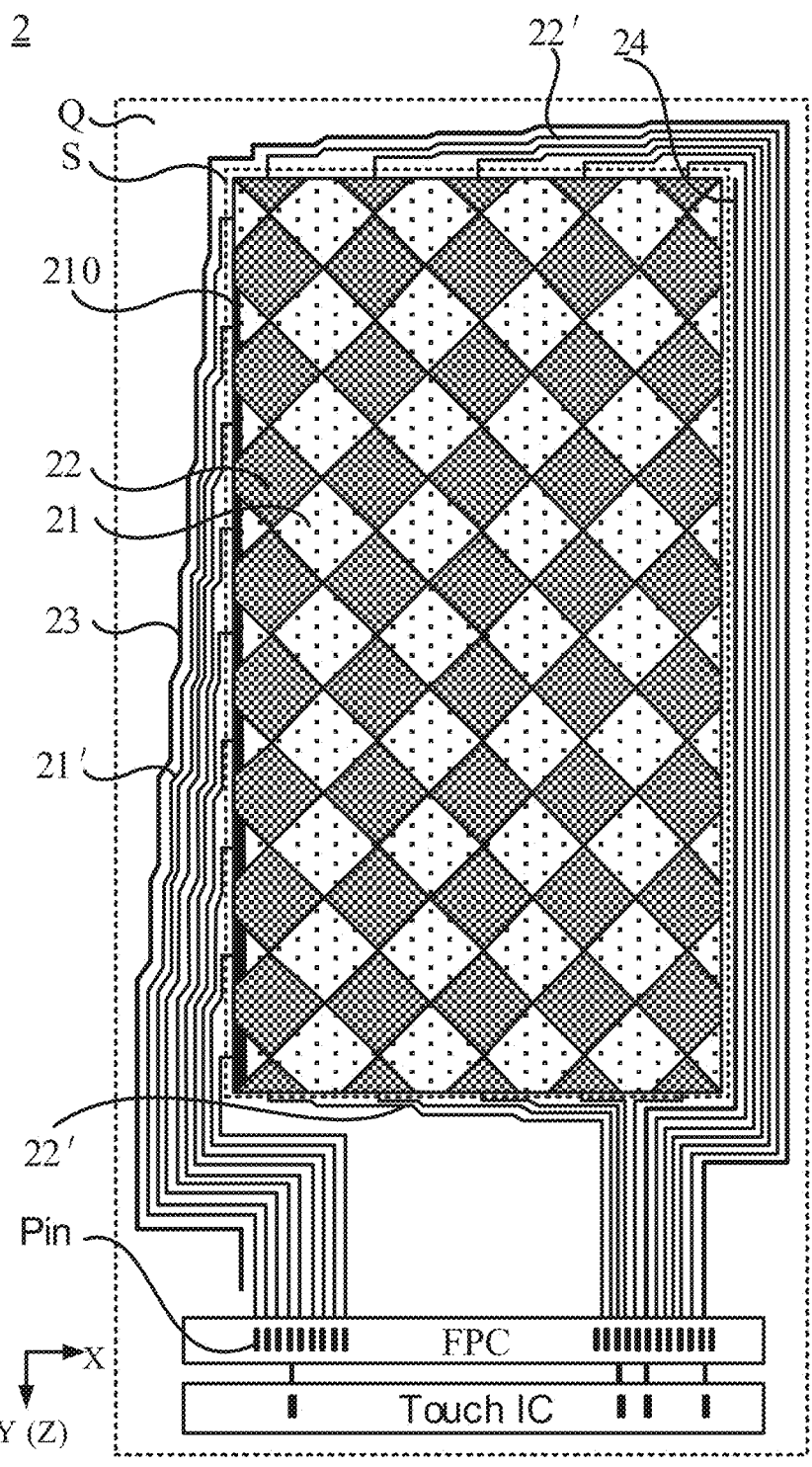
FIG. 11 is a structural diagram of yet another touch sensor layer, in accordance with some embodiments.

In some embodiments provided in the present disclosure, as shown in FIG. 11, in the extending direction of the first touch lead 21' on the first side of the touch region (e.g., the above third direction, the third direction being parallel to the first direction Y and proximate to the FPC in the structure shown in FIG. 11), the resistances of the first touch auxiliary portions 210 gradually increase.

The resistances of the first touch auxiliary portions 210 gradually increase, which may be understood that, in the third direction, a resistance of a latter first touch auxiliary portion 210 is greater than a resistance of a former first touch auxiliary portion 210.

It can be seen from Example 1 that, in the third direction, the resistances of the first touch leads 21' gradually decrease, and the line losses of the first touch leads 21' gradually decrease. Therefore, the first touch auxiliary portions 210 are set as that the resistances of the first touch auxiliary portions 210 gradually increase in the third direction, so that it may be realized a the first touch lead 21' with a large resistance is couple to a first touch auxiliary portion 210 with a small resistance, and a first touch lead 21' with a small resistance is couple to a first touch auxiliary portion 210 with a large resistance. As a result, a group of the first touch lead 21' and the first touch auxiliary portion 210 that are coupled to each row of first touch electrodes 21 has an equal or approximately equal resistance. That is, the group of the first touch lead 21' and the first touch auxiliary portion 210 that are coupled to each row of first touch electrodes 21 has an equal or approximately equal load. In this way, it is beneficial to improving the touch uniformity of the touch screen 100, and finally reducing the possibility of the touch inaccuracy of the touch screen 100. In addition, the first touch auxiliary portion 210 located in the touch region S is added to compensate for the resistance of each first touch lead 21', so as to avoid the wide bezel of the display apparatus 1000 caused by increasing the length of each first touch lead 21' to compensate for the resistance of each first touch lead 21', thereby meeting the demand for the narrow bezel of the display apparatus 1000 by the market.

In some embodiments provided in the present disclosure, at least two of the first touch lead 21', the first touch auxiliary portion 210 and the first touch electrode block 21 are disposed in the same layer and made of the same material.

That is, any two of the first touch lead 21', the first touch auxiliary portion 210 and the first touch electrode block 21 may be disposed in the same layer and made of the same material. Alternatively, the first touch lead 21', the first touch auxiliary portion 210 and the first touch electrode block 21 may be disposed in the same layer and made of the same material.

It may also be understood that the at least two of the first touch leads 21', the first touch auxiliary portion 210 and the first touch electrode block 21 may be formed simultaneously through a patterning process (e.g., including exposure, development, etching, and other steps) and disposed in the same layer and made of the same material. In this way, the process steps of forming the first touch leads 21', the first touch auxiliary portion 210 and the first touch electrode block 21 may be simplified. In addition, the first touch auxiliary portion 210 and the first touch electrode block 21 may be disposed in the same layer and made of the same material, so that the moiré phenomenon (i.e., various fringes appear on the display image of the display apparatus 1000) that easily occurs in a case where the first touch auxiliary portion 210 and the first touch electrode block 21 are located in different layers may be avoided, which is beneficial to improving the display effect of the display apparatus 1000.

The region where the second touch auxiliary portion 220 is located may be the same as the region where the first touch auxiliary portion 210 is located.

In some embodiments provided in the present disclosure, the second touch auxiliary portion 220 is located in the wiring region Q.

In some other embodiments provided in the present disclosure, a portion of the second touch auxiliary portion 220 is located in the wiring region Q, and the other portion of the second touch auxiliary portion 220 is located in the touch region S. In this way, the requirement for the accuracy of the arrangement position of the second touch auxiliary portion 220 is relatively low, so that the requirement for the process precision of forming the second touch auxiliary portion 220 may be reduced.

In yet some other embodiments provided in the present disclosure, the second touch auxiliary portion 220 is located in the touch region S.

It can be seen from the above description that the touch region S overlaps the display region of the display apparatus 1000, and the wiring region Q is located in the peripheral region of the display apparatus 1000. In this way, it is possible to avoid the relatively wide bezel of the display apparatus 1000 caused by the increase of the peripheral region of the display apparatus 1000 due to the increase of the wiring region Q in a case where the second touch auxiliary portions 220 are disposed in the wiring region Q at the periphery of the touch region S.

No matter which region the second touch auxiliary portions 220 are disposed in, the second touch auxiliary portions 220 may be of the same structure.

The structure of the second touch auxiliary portion 220 may be the same as that of the first touch auxiliary portion 210 described above, and reference may be made to the above description of the first touch auxiliary portion 210.

In some embodiments provided in the present disclosure, the second touch auxiliary portion 220 is of a metal mesh structure. The second touch electrode block 22 is processed to make part of the structure originally belonging to the second touch electrode block 22 used as the second touch auxiliary portion 220. The second touch auxiliary portion 220 and the first touch electrode block 21 may be disposed in the same layer, formed simultaneously, and made of the same material, which may simplify the process steps. In addition, the second touch auxiliary portion 220 is of the metal mesh structure, which may avoid a problem of non-uniform display of the edge region and the middle region of the display apparatus 1000 in a case where the second touch auxiliary portion 220 is of a block structure, and is beneficial to improving the display effect of the display apparatus 1000.

In some other embodiments provided in the present disclosure, the second touch auxiliary portion 220 is a metal block or of a non-mesh-like winding structure, etc.

In some embodiments, the first touch auxiliary portion 210 and the second touch auxiliary portion 220 are disposed in the same layer and formed simultaneously. In this way, the process steps of forming the first touch auxiliary portion 210 and the second touch auxiliary portion 220 may be simplified.

In some other embodiments, the touch region S is of a square shape.

Figure 12A:
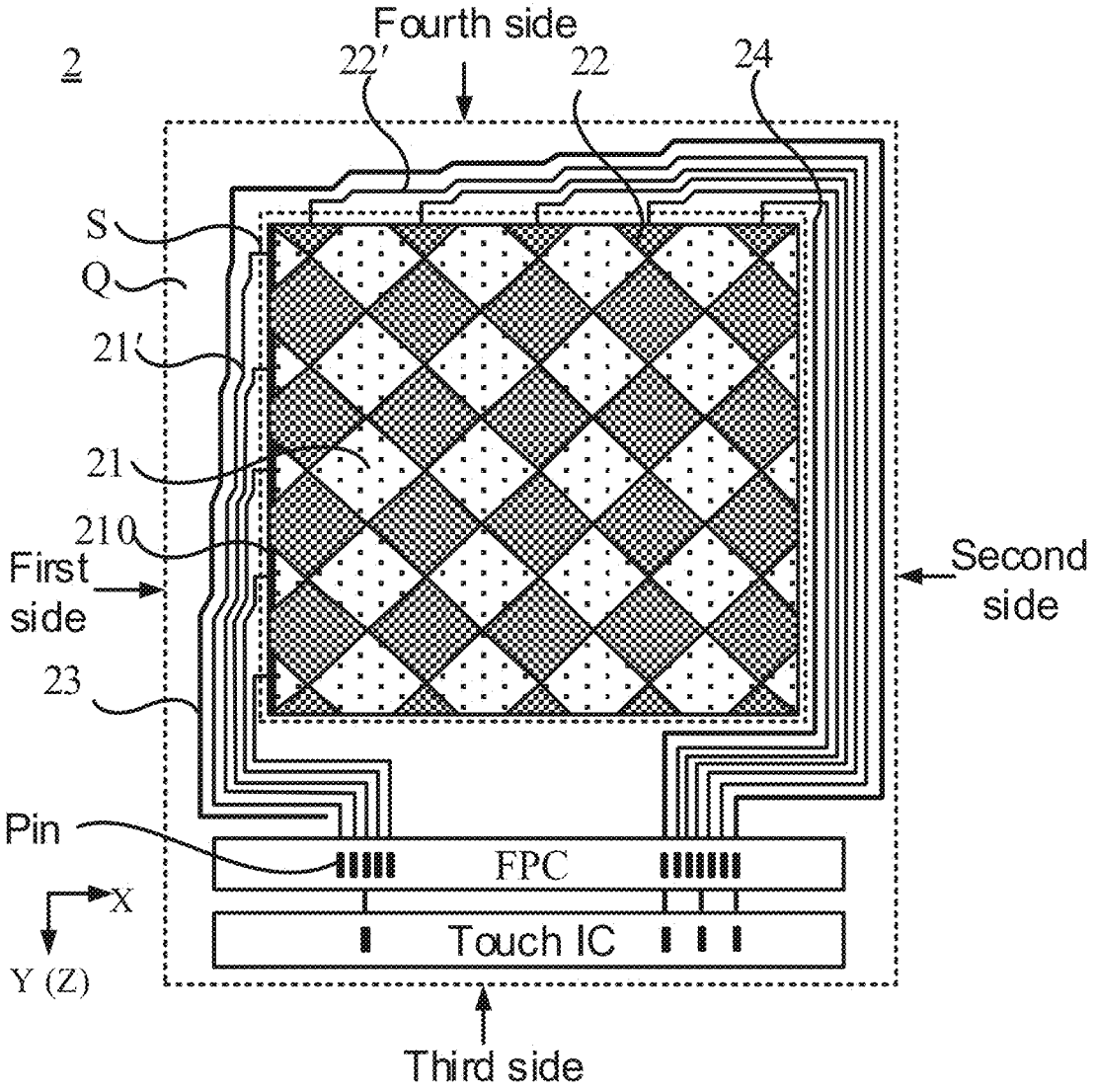
FIG. 12A is a structural diagram of yet another touch sensor layer, in accordance with some embodiments.

As shown in FIG. 12A, the first side and the second side of the touch region S are disposed opposite to each other, and the third side and the fourth side of the touch region S are disposed opposite to each other. The FPC and the touch IC are disposed on the third side of the touch region S.

In the first possible embodiment provided by the embodiment of the present disclosure, as shown in FIG. 12A, a row of first touch electrode blocks is only coupled to the first touch lead 21' located on the first side of the touch region S, and a column of second touch electrode blocks is only coupled to the second touch lead 22' located on the fourth side of the touch region S. The wiring manner shown in FIG. 12A is called 1T1R. In a case where the size of the touch screen 100 is small, the wiring manner of 1T1R can meet the requirement. Therefore, a complicated wiring manner is not required, and the wiring structure is simplified.

In some embodiments, the first touch electrode blocks 21 provided with the first touch auxiliary portions 210 on the side thereof facing the wiring region Q are arranged sequentially in the first direction Y.

In some embodiments provided in the present disclosure, as shown in FIG. 12A, the first touch auxiliary portions 210 are disposed respectively on the side, facing the wiring region Q, of all the first touch electrode blocks 21 in the group of first touch electrode blocks located at the outermost periphery and proximate to the first side of the touch region S.

Figure 12B:
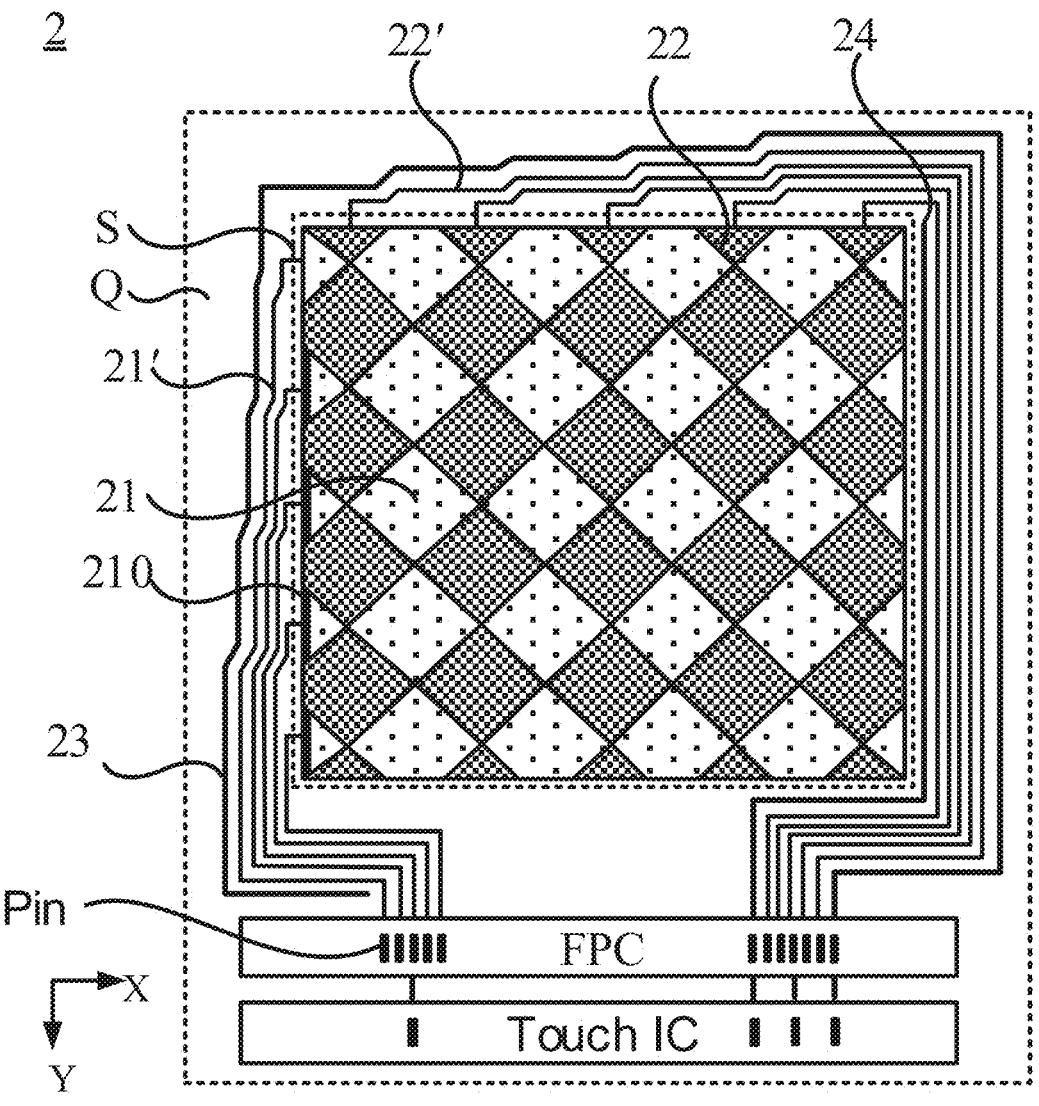
FIG. 12B is a structural diagram of yet another touch sensor layer, in accordance with some embodiments.

In some other embodiments provided in the present disclosure, as shown in FIG. 12B, the first touch auxiliary portions 210 are disposed respectively on the side, facing the wiring region Q, of part of the first touch electrode blocks 21 in the group of first touch electrode blocks located at the outermost periphery and proximate to the first side of the touch region S.

For example, as shown in FIG. 12A, the first touch leads 21' extend in the third direction on the first side of the touch region S. The third direction is parallel to the first direction Y, and the third direction is toward the FPC.

In the first touch electrode blocks 21 coupled to the first touch leads 21', a first touch electrode block 21 proximate to the fourth side of the touch region S is not provided with a first touch auxiliary portion 210 on the side thereof facing the wiring region Q, and the first touch electrode block 21 is directly coupled to the first touch lead 21'.

Since the first touch auxiliary portion 210 itself has a resistance, the first touch lead 21' is coupled to the first touch electrode block 21 through the first touch auxiliary portion 210, which is equivalent to increasing the load of the first touch lead 21'. It can be seen from the description in Example 1 that, since the first touch lead 21' coupled to the first touch electrode block 21 farthest away from the FPC has the longest length and the largest resistance, there is no need to perform the resistance compensation. Therefore, in the embodiments of the present disclosure, no first touch auxiliary portion 210 is disposed on the side, facing the wiring region Q, of the first touch electrode block 21 farthest away from the FPC, which is equivalent to considering the first touch lead 21' coupled to the first touch electrode block 21 farthest away from the FPC as the reference to perform the resistance compensation for the other first touch lead 21'. As a result, each first touch lead 21' has an equal or approximately equal resistance, that is, the first touch signal on each first touch lead 21' has equal or approximately equal loss. In this way, the capacitance value of each capacitor at the non-touch position obtained by the touch IC has little difference, so the uniformity of the capacitance values of the touch screen 100 may be relatively good. That is, the capacitance value of the capacitor at the touched position will change, and the capacitance value of the capacitor at the non-touch position will remain unchanged or approximately unchanged. Therefore, the touch point may be relatively accurately determined by determining the capacitance value of each capacitor.

Alternatively, for example, in the first touch electrode blocks 21 arranged sequentially in the first direction Y, some first touch electrode blocks 21 relatively far away from the FPC are each not provided with the first touch auxiliary portion 210 on the side thereof facing the wiring region Q, and the other first touch electrode blocks 21 are each provided with the first touch auxiliary portion 210 on the side thereof facing the wiring region Q.

As for the first touch leads 21', the plurality of first touch leads 21' are as a group. One end of the first touch lead 21' located on the first side of the touch region S is the first end, and the other end of the first touch lead 21' located on the third side of the touch region S is the second end.

The first touch auxiliary portion 210 is disposed between the first touch electrode block 21 and the first end of the first touch lead 21', and the first touch auxiliary portion 210 is coupled to the first touch electrode block 21 adjacent to the first touch auxiliary portion 210 and the first end of the first touch lead 21'. The second end of the first touch lead 21' is coupled to the FPC (i.e., the FPC is located on the third side of the touch region S).

Figure 12C:
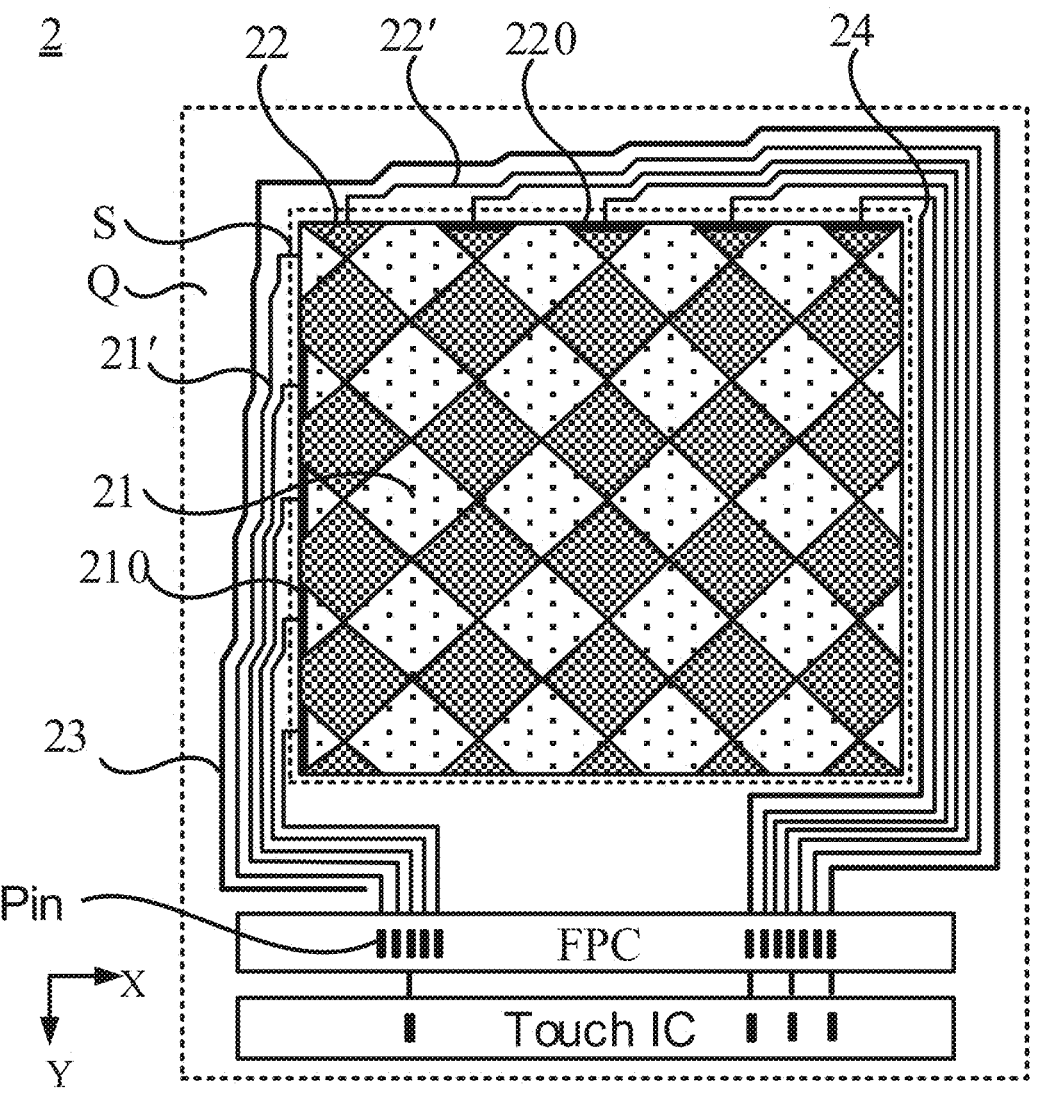
FIG. 12C is a structural diagram of yet another touch sensor layer, in accordance with some embodiments.

In some embodiments, as shown in FIG. 12C, the touch sensor layer 2 further includes at least one second touch auxiliary portion 220. FIG. 12C shows an example where the touch sensor layer 2 includes the plurality of second touch auxiliary portions 220.

The second touch auxiliary portion 220 is disposed between the second touch electrode block 22 and the second touch lead 22', and the second touch auxiliary portion 220 is coupled to the second touch electrode block 22 and the second touch lead 22'.

The second touch electrode blocks 22, provided with the second touch auxiliary portions 220 on the side thereof facing the wiring region Q, are arranged sequentially in the second direction X.

As for the arrangement manner of the second touch auxiliary portions 220, in some embodiments, the second touch auxiliary portions 220 are disposed respectively on the side, facing the wiring region Q, of all the second touch electrode blocks 22 in the group of second touch electrode blocks located at the outermost periphery and proximate to the fourth side of the touch region S.

In some other embodiments, the second touch auxiliary portions 220 are disposed respectively on the side, facing the wiring region Q, of part of the second touch electrode blocks 22 in the group of second touch electrode blocks located at the outermost periphery and proximate to the fourth side of the touch region S.

As for the second touch leads 22', the plurality of second touch leads 22' are as a group, and the second touch leads 22' extend from the fourth side to the third side through the second side of the touch region S.

In some embodiments, as shown in FIGS. 12A to 12C, the touch sensor layer 2 further includes the second signal shielding line 24. The second signal shielding line 24 is located on the second side of the touch region S, and is disposed between the touch region S and the second touch lead 22' closest to the touch region S. The extending direction of the second signal shielding line 24 is parallel to the first direction Y. One end of the second signal shielding line 24 is coupled to the touch IC, and the other end of the second signal shielding line 24 is floating.

Figure 13A:
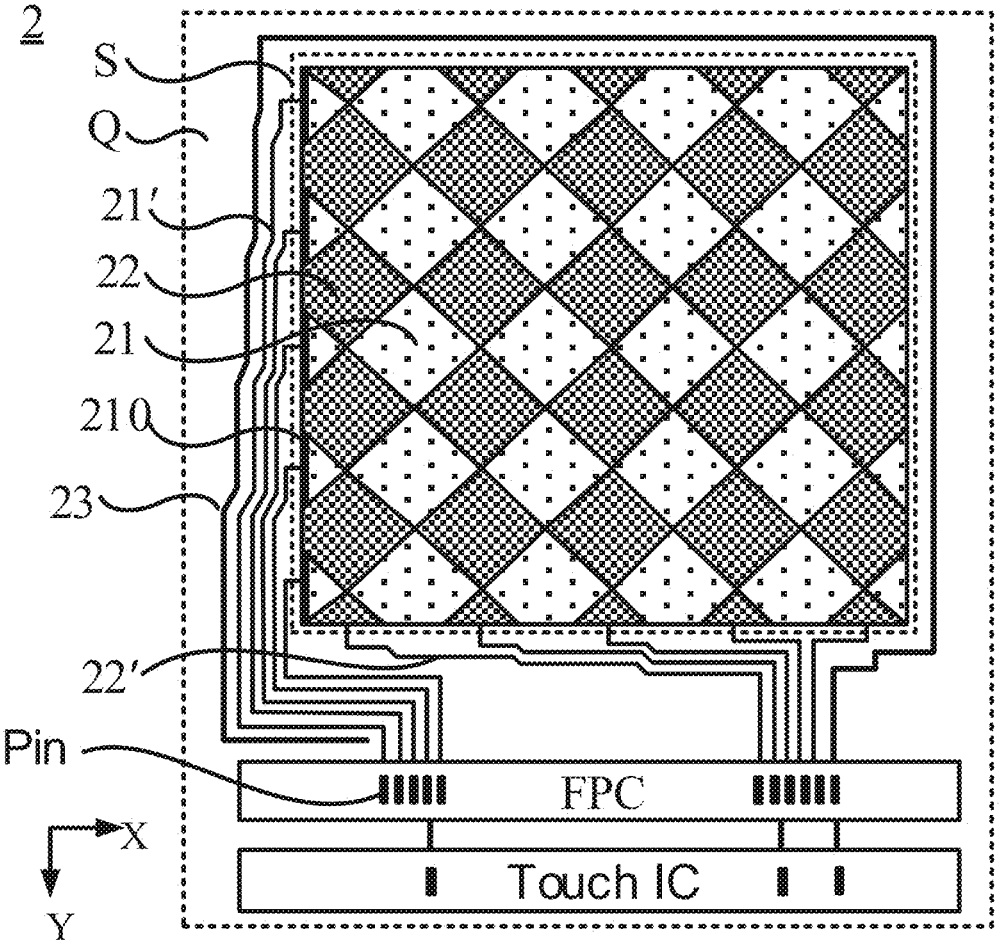
FIG. 13A is a structural diagram of yet another touch sensor layer, in accordance with some embodiments.

In the second possible embodiment provided by the embodiments of the present disclosure, as shown in FIG. 13A, a row of first touch electrode blocks is only coupled to the first touch lead 21' located on the first side of the touch region S, and a column of second touch electrode blocks is only coupled to the second touch lead 22' located on the fourth side of the touch region S. The wiring manner shown in FIG. 13A is also called 1T1R. In a case where the size of the touch screen 100 is small, the wiring manner of 1T1R can meet the requirements. Therefore, a complicated wiring manner is not required, and the wiring structure is simplified.

The structures and positions of the first touch auxiliary portion 210 and the first touch leads 21' are the same as those in the first possible embodiment, and reference may be made to the description above with respect to FIG. 12A.

As for the second touch leads 22', the plurality of the second touch leads 22' are as a group, and the second touch leads 22' are located on the third side of the touch region S.

Figure 13B:
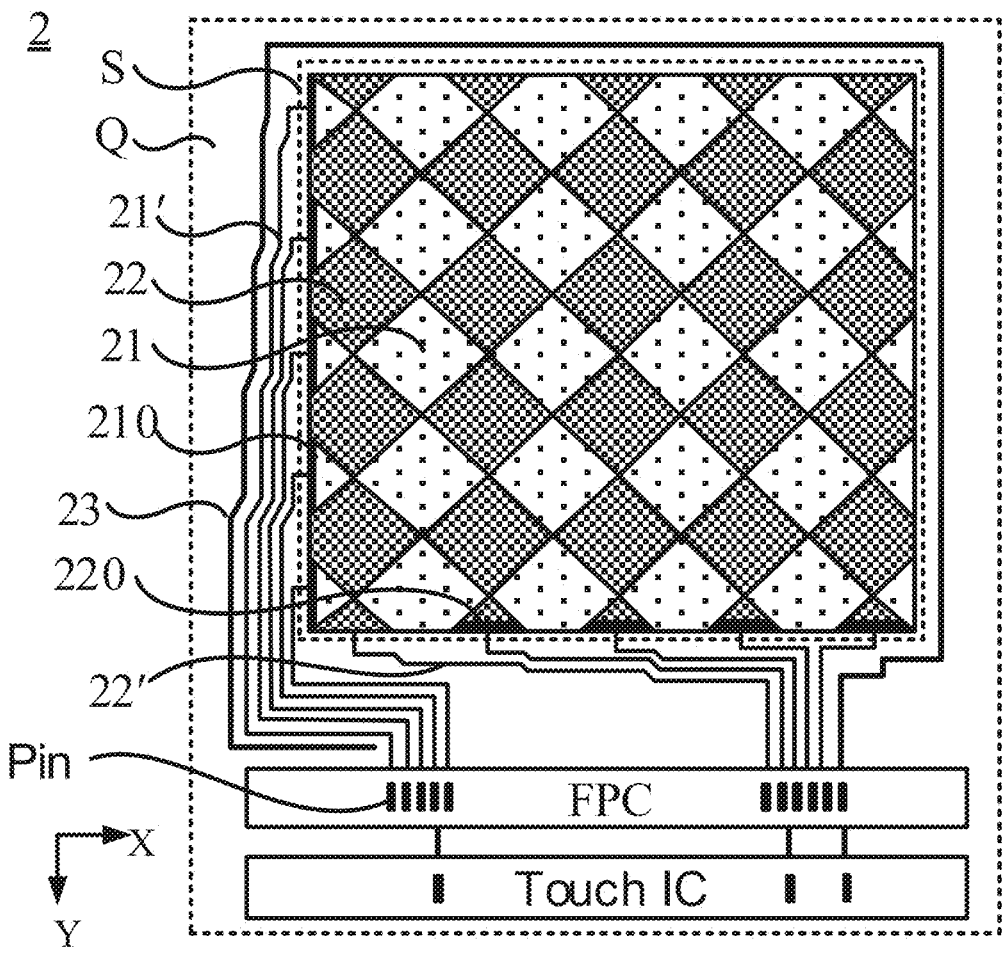
FIG. 13B is a structural diagram of yet another touch sensor layer, in accordance with some embodiments.

In some embodiments, as shown in FIG. 13B, the touch sensor layer 2 further includes at least one second touch auxiliary portion 220. The second touch auxiliary portion 220 is disposed between the second touch electrode block 22 and the second touch lead 22', and the second touch auxiliary portion 220 is coupled to the second touch electrode block 22 and the second touch lead 22'. FIG. 13B shows an example where the touch sensor layer 2 includes the plurality of second touch auxiliary portions 220.

The second touch electrode blocks 22, provided with the second touch auxiliary portion 220 on the side thereof facing the wiring region Q, are arranged sequentially in the second direction X.

The second touch auxiliary portions 220 are disposed respectively on the side, facing the wiring region Q, of all the second touch electrode blocks 22 or part of the second touch electrode blocks 22 in the group of second touch electrode blocks located at the outermost periphery and proximate to the fourth side of the touch region S.

Figure 14:
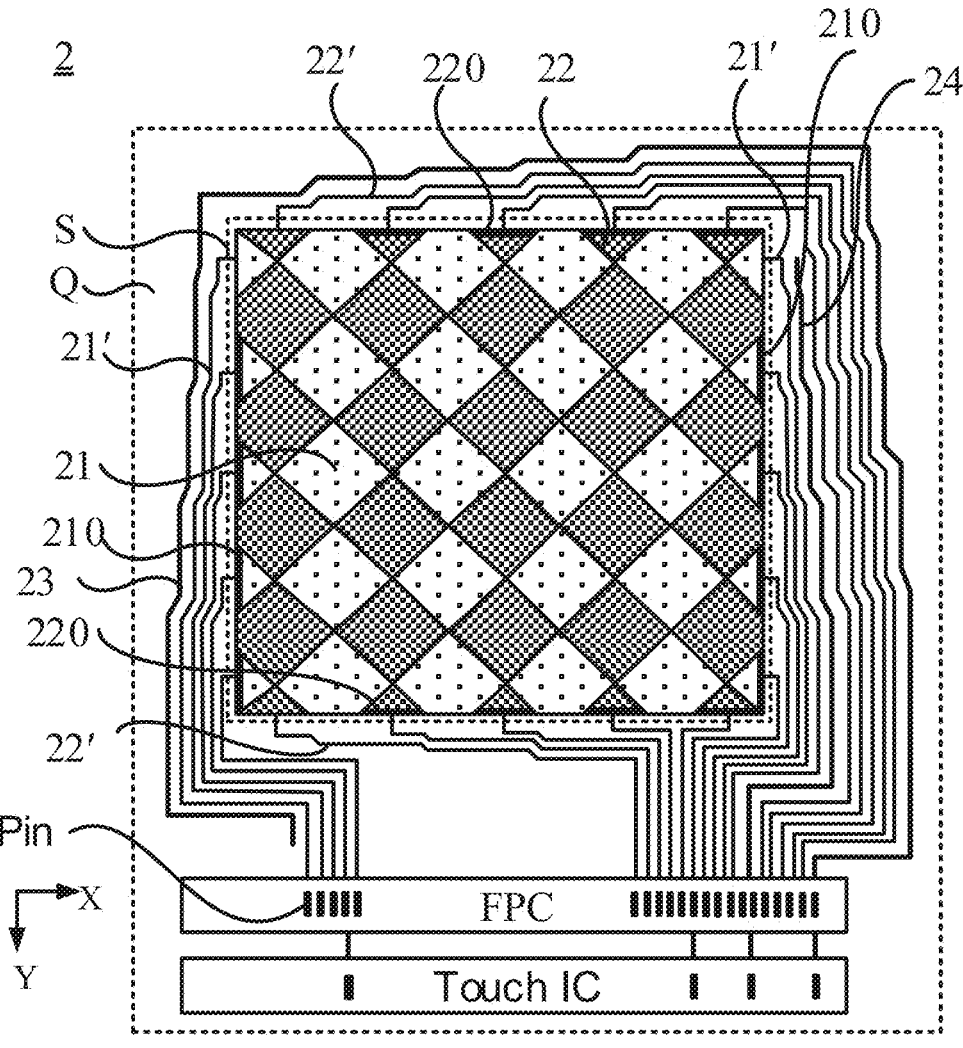
FIG. 14 is a structural diagram of yet another touch sensor layer, in accordance with some embodiments.

In the third possible embodiment provided by the embodiments of the present disclosure, as shown in FIG. 14, both ends of a row of first touch electrode blocks are respectively coupled to different first touch leads 21', and both ends of a column of second touch electrode blocks are respectively coupled to different second touch leads 22'.

That is, the structure in FIG. 14 is the same as the structure of 2T2R shown in FIGS. 8A and 8B, and the difference therebetween is that the touch region S has a different shape.

Reference may be made to the above relevant description, and details will not be repeated here.

As shown in FIGS. 12A to 14, in a case where the touch region S is of the square shape, the wiring manner of the first touch leads 21' and the second touch leads 22' include 1T1R or 2T2R, and the diversified wiring manner may be suitable for touch screens 100 with different sizes.

In summary, the first touch auxiliary portion 210 itself has a resistance, which may compensate for the resistance of the first touch lead 21', so that the load of each first touch lead 21' has little difference. Therefore, the first touch signal on each first touch lead 21' has equal or approximately equal loss. Then, the first touch signal transmitted by each first channel has the same or approximately the same intensity, and thus the first touch signal may be improved. Similarly, the second touch auxiliary portion 220 itself has a resistance, which may compensate for the resistance of the second touch lead 22', so that the load of each second touch lead 22' has little difference. Therefore, the second touch signal on each second touch lead 22' has equal or approximately equal loss. Then, the second touch signal transmitted by each second channel has the same or approximately the same intensity, and thus the second touch signal may be improved. In this way, the touch uniformity of the touch sensor layer 2 may be improved, and the touch accuracy may be improved. In addition, the touch auxiliary portion is used to compensate for the resistance of the touch lead, which may avoid the wide bezel of the display apparatus 1000 caused by increasing the length of the touch lead to compensate for the resistance thereof.

Example 3

Embodiments of the present disclosure further provide a touch sensor layer 2, and the touch sensor layer 2 includes a touch region S and a wiring region Q located at the periphery of the touch region S. The touch sensor layer 2 includes a plurality of first touch electrode blocks 21, a plurality of second touch electrode blocks 22, a plurality of first touch leads 21', a plurality of second touch leads 22', a first signal shielding line 23, a second signal shielding line 24, a touch IC and an FPC.

The plurality of first touch electrode blocks 21 and the plurality of second touch electrode blocks 22 are located in the touch region S of the touch sensor layer 2, and the plurality of first touch leads 21', the plurality of second touch leads 22', the first signal shielding line 23, the second signal shielding line 24, the touch IC and the FPC are located in the wiring region Q of the touch sensor layer 2.

The FPC and the touch IC in the current Example are the same as the FPC and the touch IC in Example 1, reference may be made to the relevant description in Example 1, and details will not be repeated here.

Figure 15:
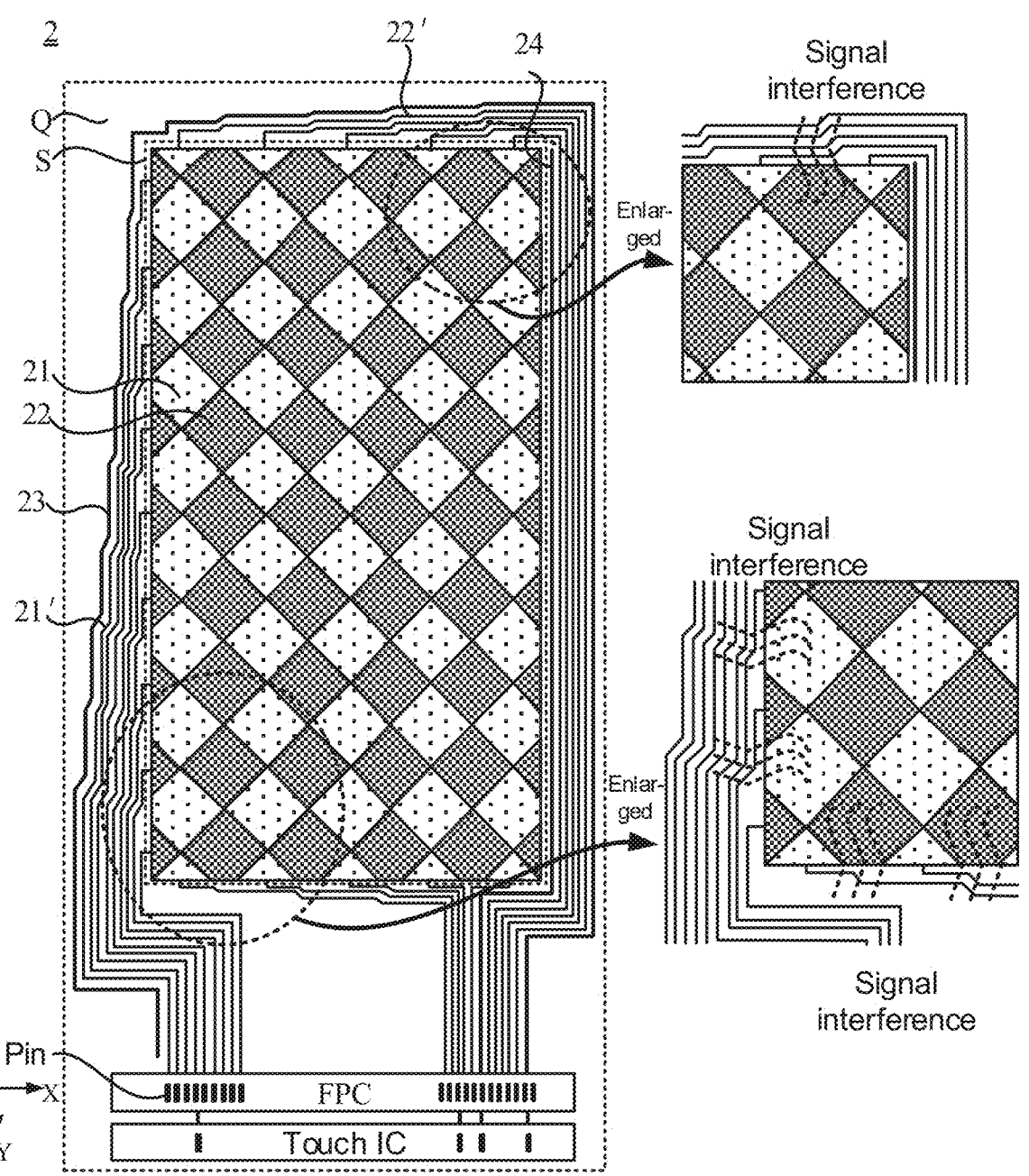
FIG. 15 is a structural diagram of yet another touch sensor layer, in accordance with some embodiments.

As shown in FIG. 15, the plurality of first touch electrode blocks 21 and the plurality of second touch electrode blocks 22 are arranged in a same layer. First touch electrode blocks 21 and second touch electrode blocks 22 are staggered in a first direction Y, and other first touch electrode blocks 21 and other second touch electrode blocks 22 are staggered in a second direction X. The first direction Y intersects the second direction X.

The plurality of first touch electrode blocks 21 are divided into a plurality of columns of first touch electrode blocks 21 in the second direction X, first touch electrode blocks 21 located in the same column are coupled to each other, and first touch electrode blocks in adjacent columns in the plurality of columns of first touch electrode blocks are insulated from each other. First touch electrode blocks 21 in each column are sequentially arranged in the first direction Y, the first touch electrode blocks in each column may be, for example, used as a first channel, and the first channel is used for transmitting the first touch signal.

The plurality of second touch electrode blocks 22 are divided into a plurality of rows of second touch electrode blocks 22 in the first direction Y, second touch electrode blocks 22 located in the same row are coupled to each other, and second touch electrode blocks 22 in adjacent rows in the plurality of rows of second touch electrode blocks 22 are insulated from each other. Second touch electrode blocks 22 in each row are sequentially arranged in the second direction X, the second touch electrode blocks in each row may be, for example, used as a second channel, and the second channel is used for transmitting the second touch signal.

One of the first touch signal and the second touch signal is a triggering signal, and the other thereof is a receiving signal. One of the first touch electrode block 21 and the second touch electrode block 22 is a triggering electrode block Tx, and the other thereof is a receiving electrode block Rx.

As for the structures of the first touch electrode block 21 and the second touch electrode block 22, reference may be made to the relevant description in Example 1, and details will not be repeated here.

As for the first touch lead 21', in some embodiments provided in the present disclosure, as shown in FIG. 15, the first touch lead 21' extends from the left side to the lower side of the touch region S, one end of the first touch lead 21' is coupled to a row of second touch electrode blocks 22, and the other end of the first touch lead 21' is coupled to the touch IC. The first touch lead 21' is used for transmitting the second touch signal.

As for the second touch lead 22', in some embodiments provided in the present disclosure, as shown in FIG. 15, the second touch lead 22' extends from the upper side to the lower side through the right side of the touch region S, one end of the second touch lead 22' is coupled to a column of first touch electrode blocks 21, and the other end of the second touch lead 22' is coupled to the touch IC. The second touch lead 22' is used for transmitting the first touch signal.

For example, as shown in FIG. 15, the first signal shielding line 23 is located at the periphery of the plurality of first touch leads 21' and the plurality of second touch leads 22'. One end of the first signal shielding line 23 is coupled to the touch IC, and the other end thereof is floating. The touch IC is used to send a shielding signal to the first signal shielding line 23, and the shielding signal may reduce the interference of external noise with both the touch signal on the first touch lead 21' and the touch signal on the second touch lead 22'.

As for the second signal shielding line 24, in some embodiments provided in the present disclosure, as shown in FIG. 15, the second signal shielding line 24 is located on the right side of the touch region S, and disposed between the touch region S and a second touch lead 22' closest to the touch region S. An extending direction of the second signal shielding line 24 is parallel to the first direction Y. One end of the second signal shielding line 24 is coupled to the touch IC, and the other end of the second signal shielding line 24 is floating.

The shielding signal transmitted by the second signal shielding line 24 and the shielding signal transmitted by the first signal shielding line 23 may be the same. The shielding signal on the second signal shielding line 24 may prevent crosstalk between the first touch signal on the second touch lead 22' and the second touch signal on the second touch electrode block 22 proximate to the second touch lead 22'.

At present, the display apparatus 1000 with the narrow bezel is favored by users due to its large screen-to-body ratio and good visualization effect. For the display apparatus 1000 with the narrow bezel, an area of the peripheral region located at the periphery of the display region of the display apparatus 1000 is relatively small. The wiring region Q of the touch sensor layer 2 is located in the peripheral region of the display apparatus 1000, so an area of the wiring region Q is relatively small. For example, as shown in FIG. 15, the plurality of first touch leads 21' are located in the wiring region Q on the left side of the touch region S, the plurality of second touch leads 22' are located in the wiring region Q on the upper side of the touch region S, and the plurality of second touch leads 22' are located in the wiring region Q on the lower side of the touch region S.

Example 4

Figure 16A:
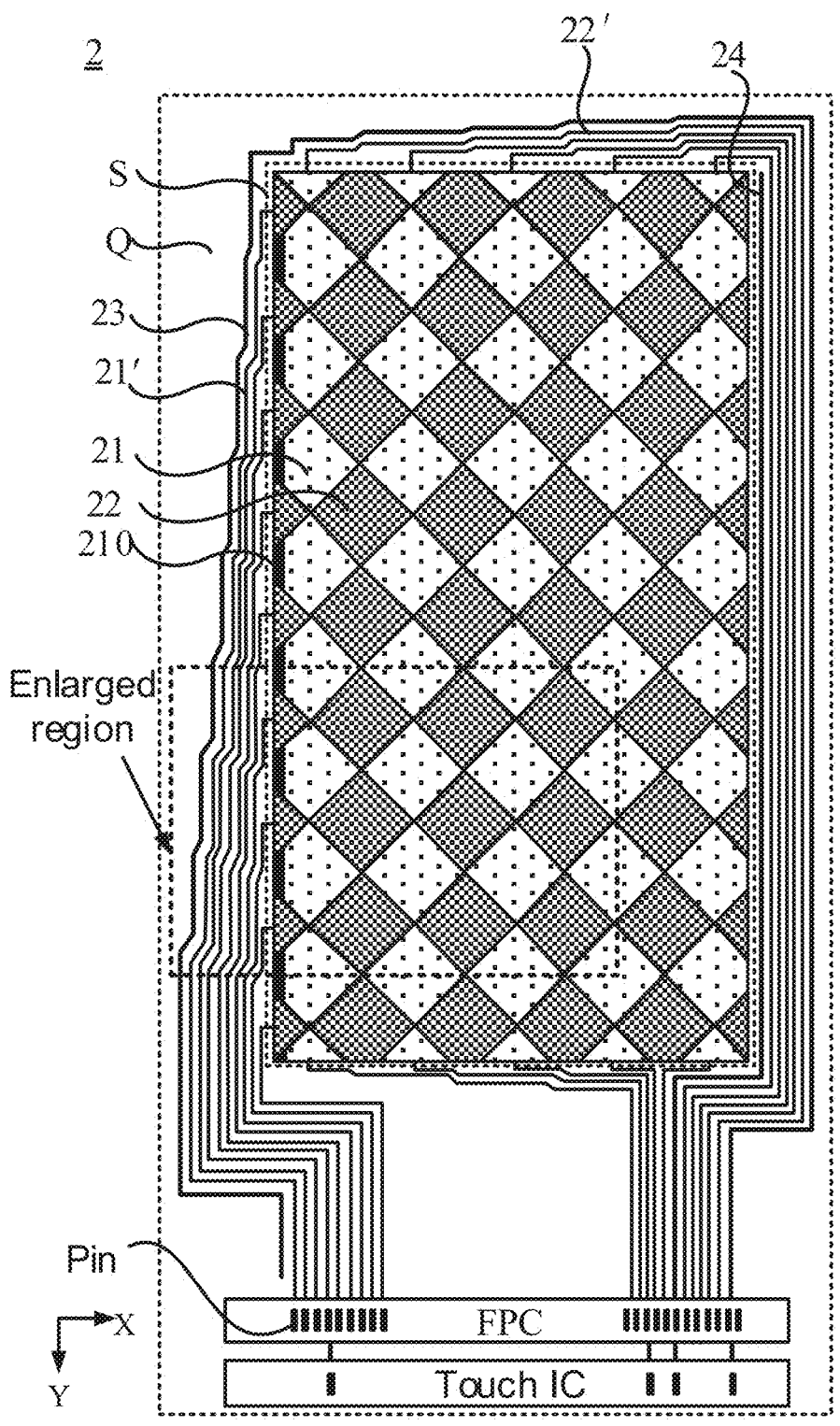
FIG. 16A is a structural diagram of yet another touch sensor layer, in accordance with some embodiments.

The embodiments of the present disclosure further provide a touch sensor layer 2. As shown in FIG. 16A, the touch sensor layer 2 includes a touch region S and a wiring region Q located at the periphery of the touch region S.

As for the structure of the touch sensor layer 2, the touch sensor layer 2 includes first touch auxiliary portion(s) 210, a plurality of first touch electrode blocks 21, a plurality of second touch electrode blocks 22, a plurality of first touch leads 21', a plurality of second touch leads 22', a first signal shielding line 23, a touch IC and an FPC.

The FPC, the touch IC and the first signal shielding line 23 that are provided in the current Example may be the same as those in Example 1, reference may be made to the relevant description in Example 1, and details will not be repeated here.

In the current Example, the structures of the first touch electrode blocks 21 and the second touch electrode blocks 22 may be the same as those in Example 3, reference may be made to the relevant description in Example 3, and details will not be repeated here.

For convenience of description, the embodiments of the present disclosure will be described by considering an example where the touch region S is of the rectangular shape. Based on this, the wiring region Q is divided into portions located on four sides of the touch region S. For example, the four sides of the touch region S are a first side and a second side that are opposite, and a third side and a fourth side that are opposite and intersect the first side and the second side.

As shown in FIG. 16A, the touch sensor layer 2 includes at least one first touch auxiliary portion 210. In FIG. 16A, for example, the touch sensor layer 2 includes a plurality of first touch auxiliary portions 210.

In a group of first touch electrode blocks located at the outermost periphery and proximate to a same side of the touch region S, first touch auxiliary portions 210 are provided on a side of at least part of the first touch electrode blocks 21 facing the wiring region Q. The first touch auxiliary portion 210 is used to improve the touch signal on the touch sensor layer 2.

It can be understood that, in the example where the touch region S is of the rectangular shape, the first touch electrode blocks 21 are arranged in an array in the touch region S. The group of first touch electrodes located at the outermost periphery and proximate to the same side of the touch region S may be a group of first touch electrodes facing the left side in the outermost circle of the touch region S (as shown in FIG. 16A). Alternatively, the group of first touch electrode blocks at the outermost periphery and proximate to the same side of the touch region S may be a group of first touch electrode blocks facing the right side in the outermost circle of the touch region S. Alternatively, the group of first touch electrode blocks at the outermost periphery and proximate to the same side of the touch region S may be a group of first touch electrode blocks facing the upper side in the outermost circle of the touch region S. Alternatively, the group of first touch electrode blocks at the outermost periphery and proximate to the same side of the touch region S may be a group of first touch electrode blocks facing the lower side in the outermost circle of the touch region S.

The first touch auxiliary portions 210 are provided beside a group of first touch electrode blocks, no matter which side of the touch region S the group of first touch electrode blocks are proximate to, the first touch electrode blocks 21 in the group are coupled to one another in a line, and are coupled to the same first touch signal line 21'.

In some embodiments, as shown in FIG. 16A, a first touch lead 21' is coupled to a row of second touch electrode blocks, and a second touch lead 22' is coupled to a column of first touch electrode blocks.

The first touch auxiliary portion 210 is disposed on the side, facing the wiring region Q, of the first touch electrode block 21 proximate to an end of the first touch lead 21'. The first touch auxiliary portion 210 and the first touch electrode block 21 are insulated from each other, and the first touch auxiliary portion 210 is used to reduce the interference of the second touch signal on the first touch lead 21' with the first touch signal on the first touch electrode block 21, so as to improve the touch signal on the touch sensor layer 2.

That is, as shown in FIG. 16A, in the current Example, the first touch lead 21' is coupled to the second touch electrode block 22, and the second touch lead 22' is coupled to the first touch electrode block 21. The first touch auxiliary portion 210 is disposed on the side, facing the first touch leads 21', of a group of first touch electrode blocks proximate to a side where the first touch leads 21' are located, and the first touch auxiliary portion 210 and the first touch electrode block 21 are insulated from each other.

In the following, the arrangement position of the first touch auxiliary portion 210 and the arrangement manners of the first touch leads 21' and the second touch leads 22' are illustrated.

In some embodiments, the touch region S is of a rectangular shape.

In the first possible embodiment provided by the embodiments of the present disclosure, as shown in FIG. 16A, the first side and the second side of the touch region S are sides where long edges of the touch region S are located, and the third side and the fourth side of the touch region S are sides where short edges of the touch region S are located.

A row of second touch electrode blocks is only coupled to a first touch lead 21' located on the first side of the touch region S. Both ends of a column of first touch electrode blocks are respectively coupled to second touch leads located on the third side and the fourth side of the touch region S. That is, it is the wiring manner of 2T1R or 1T2R illustrated in the first possible embodiment in Example 2, reference may be made to the above relevant description, and details will not be repeated here.

As for the arrangement manner of the first touch auxiliary portions 210, in some embodiments provided in the present disclosure, as shown in FIG. 16A, first touch auxiliary portions 210 are disposed respectively on the side, facing the wiring region Q, of all the first touch electrode blocks 21 in the group of first touch electrode blocks located at the outermost periphery and proximate the first side of the touch region S.

Figure 16B:
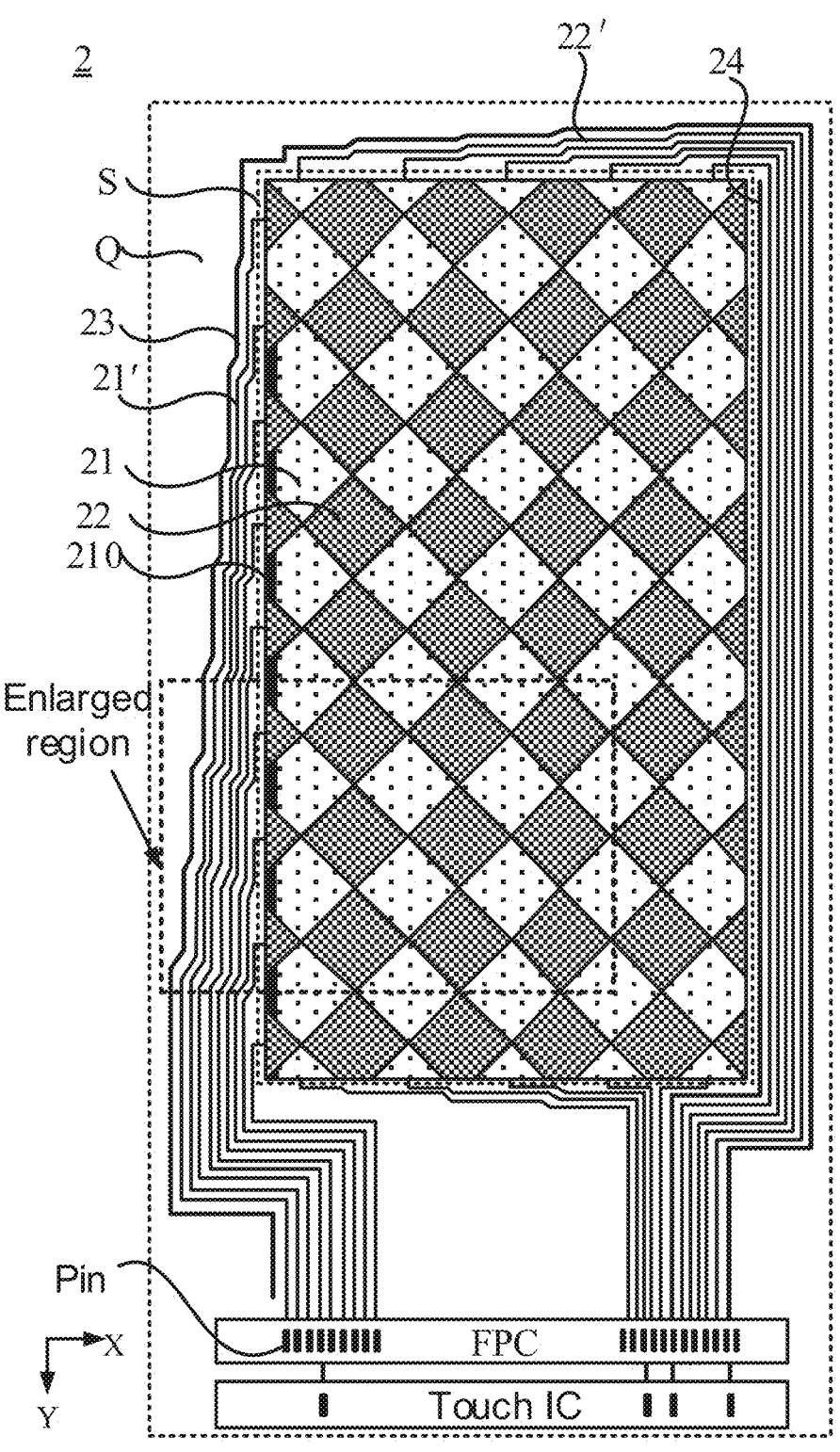
FIG. 16B is a structural diagram of yet another touch sensor layer, in accordance with some embodiments.

In some other embodiments provided in the present disclosure, as shown in FIG. 16B, first touch auxiliary portions 210 are disposed respectively on the side, facing the wiring region Q, of part of the first touch electrode blocks 21 in the group of first touch electrode blocks located at the outermost periphery and proximate to the first side of the touch region S.

Figure 17A:
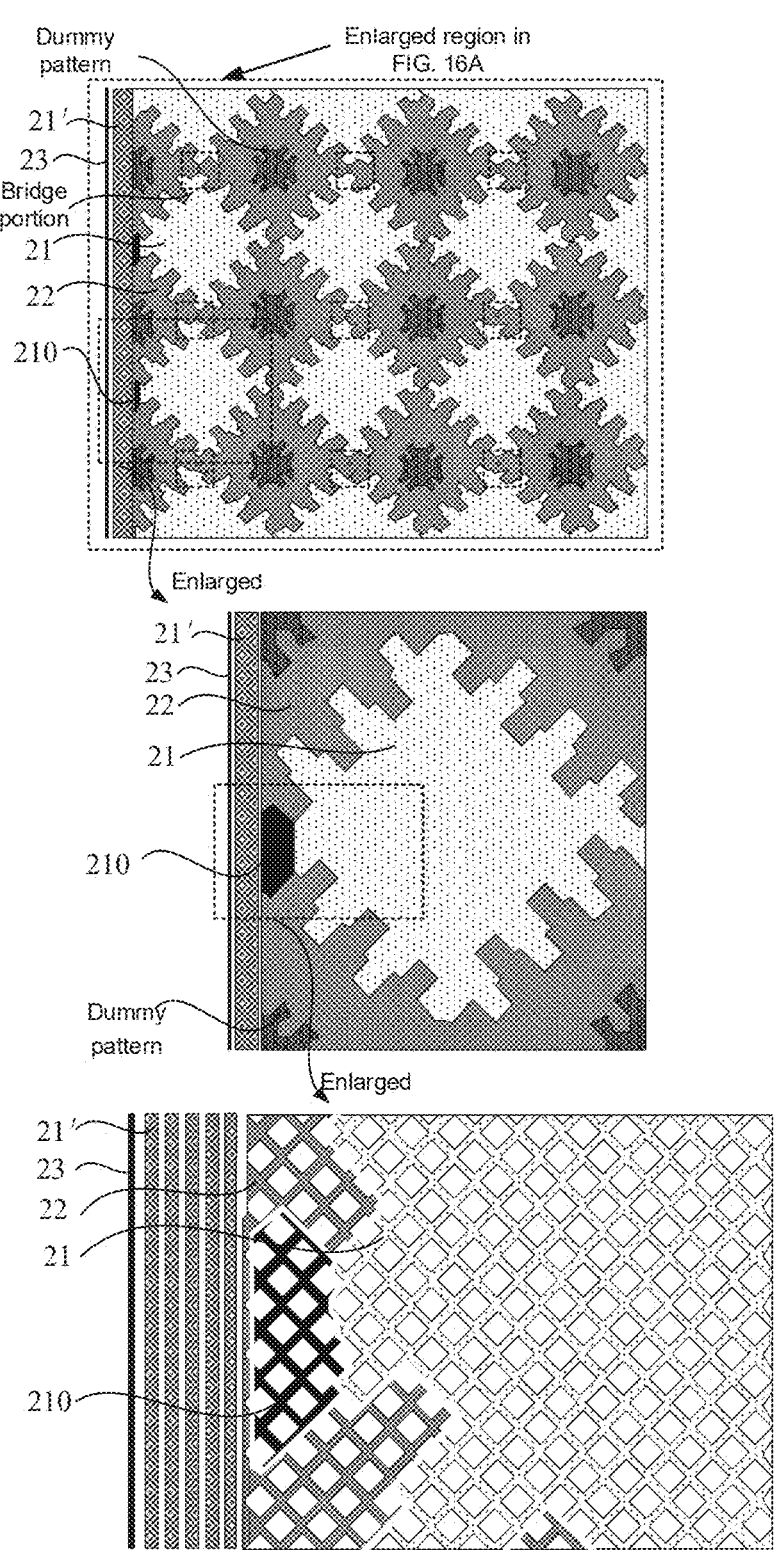
FIG. 17A is an enlarged structural diagram of another portion of a touch sensor layer, in accordance with some embodiments.

As for the structure of the first touch auxiliary portion 210, in some examples of the present disclosure, as shown in FIG. 17A, the first touch auxiliary portion 210 and the first touch electrode block 21 are both of metal mesh structures.

It will be noted that, FIG. 17A shows an example where the first touch electrode block 21 is the receiving electrode block Rx, and the second touch electrode block 22 is the triggering electrode block Tx. A dummy pattern is disposed in the middle of the triggering electrode block Tx to balance the load of the triggering electrode block Tx.

As shown in FIG. 17A, the first touch electrode block 21 is processed to make part of the structure originally belonging to the first touch electrode block 21 used as the first touch auxiliary portion 210. The first touch auxiliary portion 210 and the first touch electrode block 21 may be disposed in the same layer, formed simultaneously, and made of the same material, which may simplify the process steps. In addition, the first touch auxiliary portion 210 is of the metal mesh structure, which may avoid a problem of non-uniform display of the edge region and the middle region of the display apparatus 1000 in a case where the first touch auxiliary portion 210 is of a block structure, and is beneficial to improving the display effect of the display apparatus 1000.

In this case, the first touch auxiliary portion 210 is located in the touch region S. It can be seen from the above description that the touch region S overlaps the display region of the display apparatus 1000, and the wiring region Q is located in the peripheral region of the display apparatus 1000. In this way, it is possible to avoid the relatively wide bezel of the display apparatus 1000 caused by the increase of the peripheral region of the display apparatus 1000 due to the increase of the wiring region Q n a case where the first touch auxiliary portion 210 is disposed in the wiring region Q at the periphery of the touch region S.

For example, as shown in FIG. 17A, there is a gap between the first touch auxiliary portion 210 and the first touch electrode block 21. That is, the first touch auxiliary portion 210 and the first touch electrode block 21 are insulated from each other. No signal is transmitted by the first touch auxiliary portion 210, and thus the second touch signal on the first touch lead 21' proximate the first touch auxiliary portion 210 and the first touch signal on the first touch electrode block 21 proximate to the first touch auxiliary portion 210 are not interfered.

In this way, the arrangement of the first touch auxiliary portion 210 is equivalent to increasing the distance between the first touch lead 21' and the first touch electrode block 21 proximate to the end of the first touch lead 21'. The greater the distance between the first touch lead 21' and the first touch electrode block 21 proximate to the end of the first touch lead 21', the more beneficial it is to reducing the interference and improving the quality of the first touch signal on the first touch electrode block 21.

Therefore, the arrangement of the first touch auxiliary portion 210 may reduce the interference of the second touch signal on the first touch lead 21' with the first touch signal on the first touch electrode block 21, thereby improving the quality of the first touch signal on the first touch electrode block 21, and playing a role of improving the first touch signal, and finally reducing the possibility that the touch position is reported incorrectly or the touch is unable to be felt in the touch screen 100.

Figure 17B:
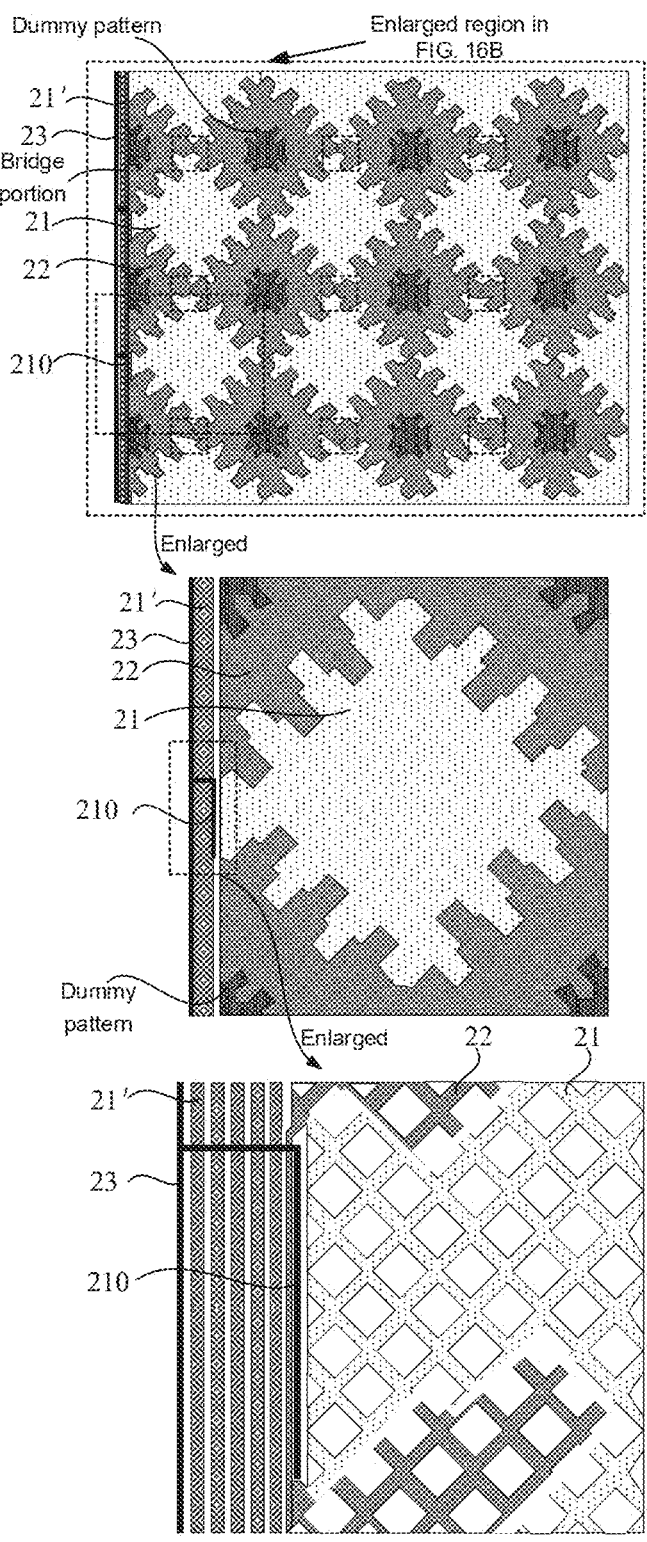
FIG. 17B is an enlarged structural diagram of yet another portion of a touch sensor layer, in accordance with some embodiments.

In some other embodiments of the present disclosure, as shown in FIG. 17B, the first touch auxiliary portion 210 is of a metal trace.

Similarly, the metal trace does not transmit any signal, and thus the second touch signal on the first touch lead 21' proximate to the first touch auxiliary portion 210 and the first touch signal on the first touch electrode block 21 proximate to the first touch auxiliary portion 210 are not interfered. In this way, the arrangement of the first touch auxiliary portion 210 is equivalent to increasing the distance between the first touch lead 21' and the first touch electrode block 21 proximate to the end of the first touch lead 21'.

In some embodiments, the first touch auxiliary portion 210 is coupled to the first signal shielding line 23.

For example, the first touch auxiliary portion 210 is coupled to the first signal shielding line 23. For example, the first touch auxiliary portion 210 and the first signal shielding line 23 are coupled through a bridge portion in a bridging jumper manner.

In this way, the first touch auxiliary portion 210 is led out directly from the first signal shielding line 23. A shielded signal is transmitted by the first touch auxiliary portion 210, and the shielded signal is the same as the shielded signal on the first signal shielding line 23. The shielded signal may prevent crosstalk between the second touch signal on the first touch lead 21' and the first touch signal on the first touch electrode block 21 proximate to the end of the first touch lead 21', which may improve the quality of the first touch signal on the first touch electrode block 21, and play a role of improving the first touch signal, and finally reduce the possibility that the touch position is reported incorrectly or the touch is unable to be felt in the touch screen 100. In addition, the shielded signal transmitted by the first touch auxiliary portion 210 may directly avoid crosstalk between the second touch signal on the first touch lead 21' and the first touch signal on the first touch electrode block 21, thereby preventing interference of the two signals. This way of improving the first touch signal is equivalent to fundamentally solving the interference of the second touch signal with the first touch signal.

In some embodiments of the present disclosure, at least two of the first touch lead 21', the first touch auxiliary portion 210, and the first touch electrode block 21 are disposed in the same layer and made of the same material.

It can also be understood that the at least two of the first touch leads 21', the first touch auxiliary portion 210 and the first touch electrode block 21 may be formed simultaneously through a patterning process (e.g., including exposure, development, etching, and other steps) and disposed in the same layer and made of the same material. In this way, the process steps of forming the first touch leads 21', the first touch auxiliary portion 210 and the first touch electrode block 21 may be simplified. In addition, the first touch auxiliary portion 210 and the first touch electrode block 21 may be disposed in the same layer and made of the same material, so that the moiré phenomenon (i.e., various fringes appear on the display image of the display apparatus 1000) that easily occurs in a case where the first touch auxiliary portion 210 and the first touch electrode block 21 are located in different layers may be avoided, which is beneficial to improving the display effect of the display apparatus 1000.

Figure 18:
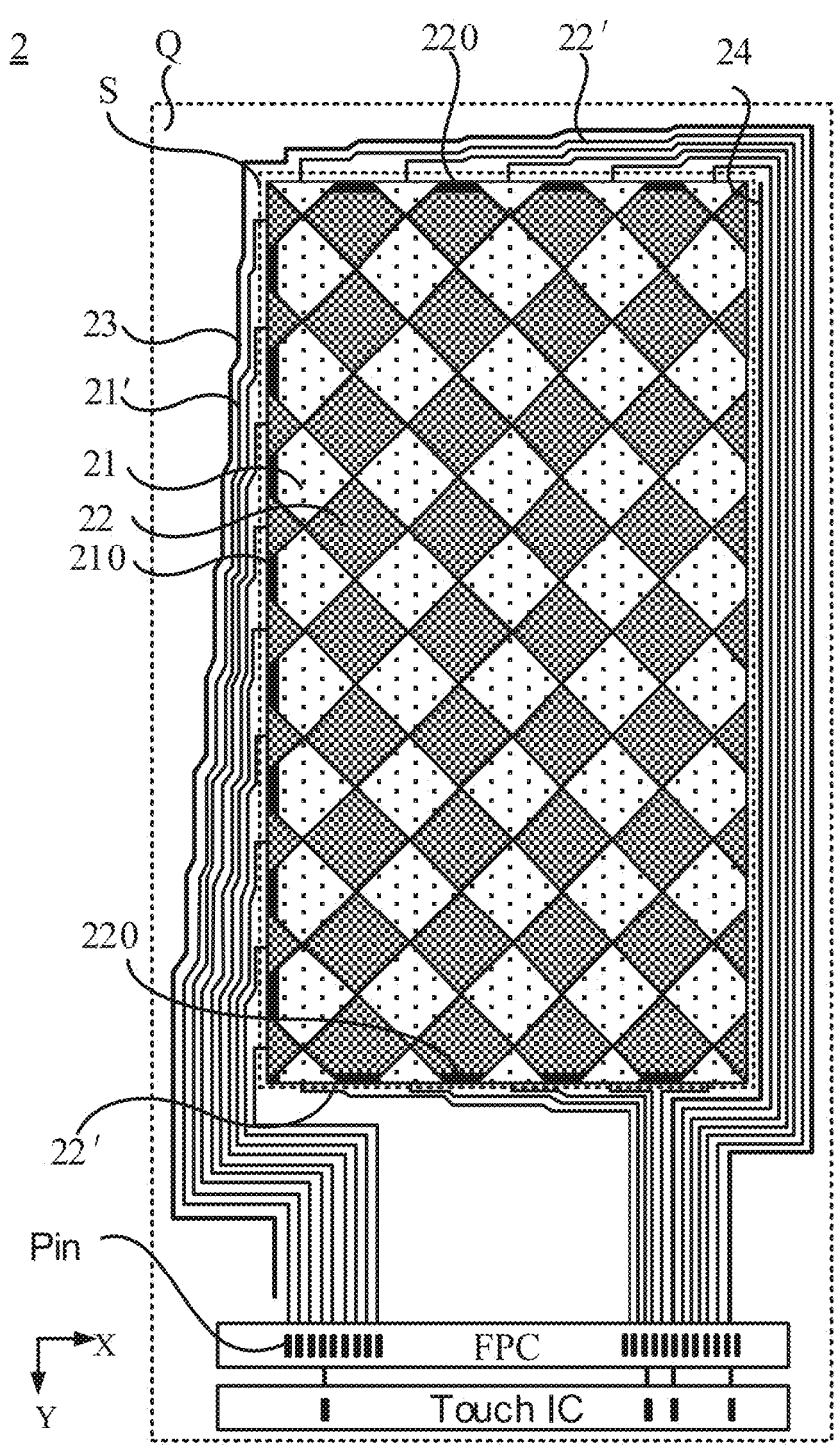
FIG. 18 is a structural diagram of yet another touch sensor layer, in accordance with some embodiments.

In some embodiments, as shown in FIG. 18, the touch sensor layer 2 further includes at least one second touch auxiliary portion 220. FIG. 18 shows an example where the touch sensor layer 2 includes a plurality of second touch auxiliary portions 220.

The second touch auxiliary portions 220 are disposed on the side, facing the wiring region Q, of at least part of the second touch electrode blocks 22 in the column of second touch electrode blocks 22 proximate to the end of the second touch lead 22'. The second touch auxiliary portion 220 and the second touch electrode block 22 are insulated from each other. The second touch auxiliary portion 220 may reduce the interference of the first touch signal on the second touch lead 22' with the second touch signal on the second touch electrode block 22, so as to improve the second touch signal on the touch sensor layer 2.

Similarly, the arrangement manner of the second touch auxiliary portion 220 may also be the same as the arrangement manner of the second touch auxiliary portion 220 illustrated in the first possible embodiment in Example 2.

In some embodiments, the second touch auxiliary portions 220 are disposed respectively on the side, facing the wiring region Q, of all the second touch electrode blocks 22 in a column of second touch electrode blocks 22 proximate to a group of second touch leads 22'.

In some other embodiments, the second touch auxiliary portions 220 are disposed respectively on the side, facing the wiring region Q, of part of the second touch electrode blocks 22 in the column of second touch electrode blocks 22 proximate to the group of second touch leads 22'.

The second touch auxiliary portion 220 may be of a metal mesh structure or may be a metal line structure.

In a case where the second touch auxiliary portion 220 is of the metal mesh structure, the second touch electrode block 22 is processed to make part of the structure originally belonging to the second touch electrode block 22 used as the second touch auxiliary portion 220. The second touch auxiliary portion 220 and the second touch electrode block 22 may be disposed in the same layer, formed simultaneously, and made of the same material, which may simplify the process steps. In addition, the second touch auxiliary portion 220 is of the metal mesh structure, which may avoid the problem of non-uniform display of the edge region and the middle region of the display apparatus 1000 in the case where the second touch auxiliary portion 220 is of the block structure, and is beneficial to improving the display effect of the display apparatus 1000.

In this case, the second touch auxiliary portion 220 is located in the touch region S. It can be seen from the above description that the touch region S overlaps the display region of the display apparatus 1000, and the wiring region Q is located in the peripheral region of the display apparatus 1000. In this way, it is possible to avoid the relatively wide bezel of the display apparatus 1000 caused by the increase of the peripheral region of the display apparatus 1000 due to the increase of the wiring region Q in a case where the second touch auxiliary portions 220 are disposed in the wiring region Q at the periphery of the touch region S.

Similarly, there is a gap between the second touch auxiliary portion 220 and the second touch electrode block 22. That is, the second touch auxiliary portion 220 and the second touch electrode block 22 are insulated from each other. No signal is transmitted by the second touch auxiliary portion 220, and thus the first touch signal on the second touch lead 22' proximate to the second touch auxiliary portion 220 and the second touch signal on the second touch electrode block 22 proximate to the second touch auxiliary portion 220 are not interfered.

In this way, the arrangement of the second touch auxiliary portion 220 is equivalent to increasing the distance between the second touch lead 22' and the second touch electrode block 22 proximate to the end of the second touch lead 22'. The greater the distance between the second touch lead 22' and the second touch electrode block 22 proximate to the end of the second touch lead 22', the more beneficial it is to reducing the interference and improving the quality of the second touch signal on the second touch electrode block 22.

Therefore, the arrangement of the second touch auxiliary portion 220 may reduce the interference of the first touch signal on the second touch lead 22' with the second touch signal on the second touch electrode block 22, thereby improving the quality of the second touch signal on the second touch electrode block 22, and playing a role of improving the second touch signal, and finally reducing the possibility that the touch position is reported incorrectly or the touch is unable to be felt in the touch screen 100.

In a case where the second touch auxiliary portion 220 is of the metal line structure, the second touch auxiliary portion 220 is located in the wiring region Q.

In some embodiments, no signal is transmitted by the metal trace, and thus the first touch signal on the second touch lead 22' proximate to the second touch auxiliary portion 220 and the second touch signal on the second touch electrode block 22 proximate to the second touch auxiliary portion 220 are not interfered. In this way, the arrangement of the second touch auxiliary portion 220 is equivalent to increasing the distance between the second touch lead 22' and the second touch electrode block 22 proximate to the end of the second touch lead 22'. The increase of the distance is beneficial to reducing the interference of the first touch signal on the second touch lead 22' with the second touch signal on the second touch electrode block 22, thereby improving the second touch signal on the touch sensor layer 2.

In some other embodiments, the second touch auxiliary portion 220 is coupled to the first signal shielding line 23. For example, the second touch auxiliary portion 220 and the first signal shielding line 23 are coupled through a bridge portion in a bridging jumper manner.

In this way, the second touch auxiliary portion 220 is led out directly from the first signal shielding line 23. A shielding signal is transmitted by the second touch auxiliary portion 220, and the shielded signal is the same as the shielding signal on the first signal shielding line 23. The shielding signal may prevent crosstalk between the first touch signal on the second touch lead 22' and the second touch signal on the second touch electrode block 22 proximate to the end of the second touch lead 22', which may improve the quality of the second touch signal on the second touch electrode block 22, and play a role of improving the second touch signal, and finally reduce the possibility that the touch position is reported incorrectly or the touch is unable to be felt in the touch screen 100. In addition, the shielding signal transmitted by the second touch auxiliary portion 220 may directly avoid crosstalk between the first touch signal on the second touch lead 21' and the second touch signal on the second touch electrode block 22, thereby preventing interference of the two signals. This way of improving the second touch signal is equivalent to fundamentally solving the interference of the first touch signal with the second touch signal.

In some embodiments, the first touch auxiliary portion 210 and the second touch auxiliary portion 220 are disposed in the same layer and formed simultaneously. In this way, the process steps for forming the first touch auxiliary portion 210 and the second touch auxiliary portion 220 may be simplified.

Figure 19:
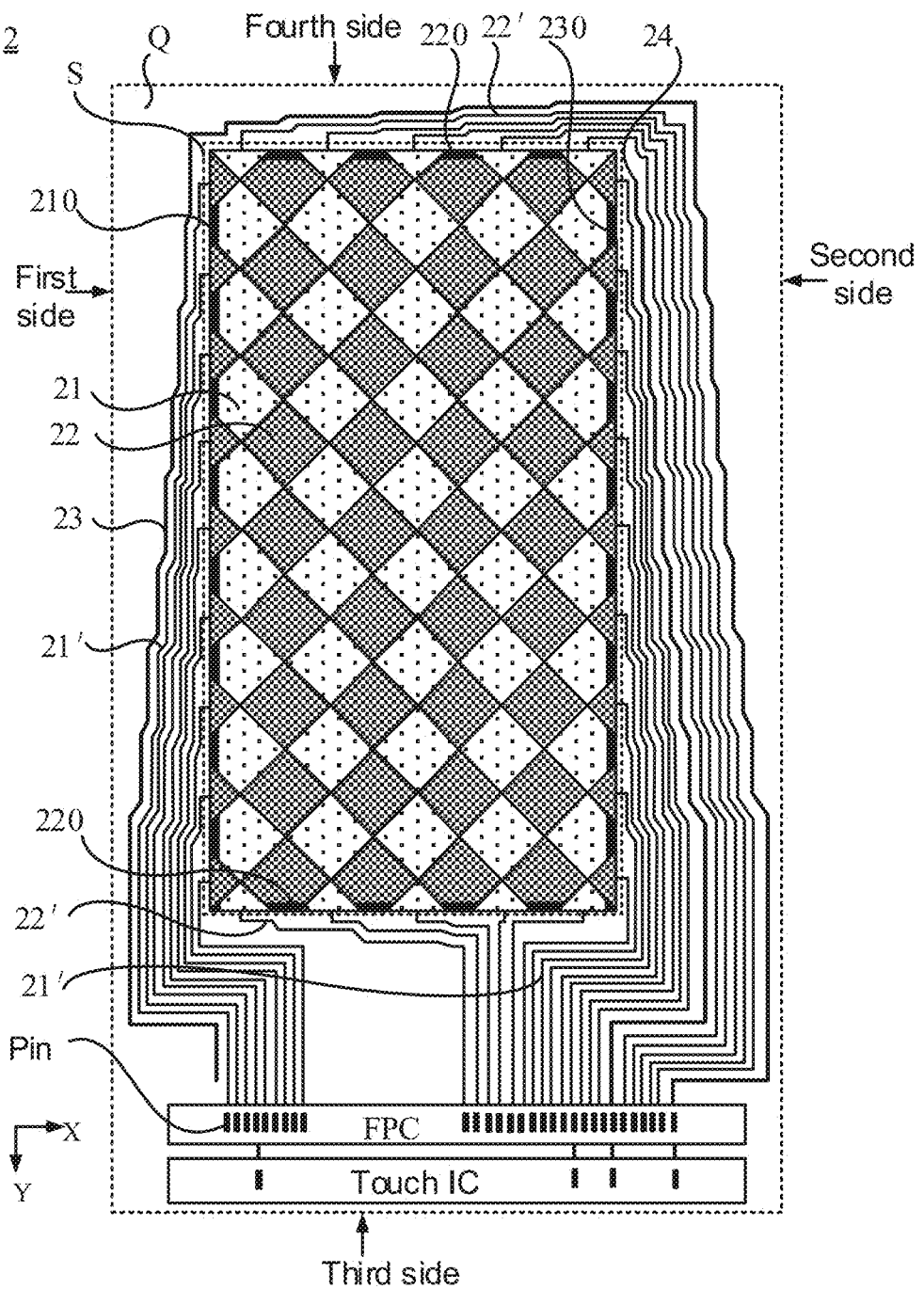
FIG. 19 is a structural diagram of yet another touch sensor layer, in accordance with some embodiments.

In the second possible embodiment provided by the embodiments of the present disclosure, as shown in FIG. 19, the first side and the second side of the touch region S are the sides where the long edges of the touch region S are located, and the third side and the fourth side of the touch region S are the sides where the short edges of the touch region S are located.

Both ends of a row of second touch electrode blocks are respectively coupled to the first touch leads 21' located on the first side and the second side of the touch region S. Both ends of a column of first touch electrode blocks are respectively coupled to the second touch leads located on the third side and the fourth side of the touch region S. That is, it is the wiring manner of 2T2R illustrated in the second possible embodiment in Example 2, reference may be made to the above relevant description, and details will not be repeated here.

Similarly, the arrangement manner of the first touch auxiliary portion 210 may be the same as the arrangement manner of the first touch auxiliary portion 210 illustrated in the first possible embodiment in Example 2.

In some embodiments, as shown in FIG. 19, the touch sensor layer 2 further includes second touch auxiliary portions 220.

Similarly, the arrangement manner of the second touch auxiliary portions 220 may also be the same as the arrangement manner of the second touch auxiliary portions 220 illustrated in the first possible embodiment in Example 2.

In some embodiments, as shown in FIG. 19, the touch sensor layer 2 further includes third touch auxiliary portions 230. The arrangement manner of the third touch auxiliary portions 230 is the same as that of the first touch auxiliary portions 210 located on the right side of the touch region S in the second possible embodiment in Example 2.

The structures of the first touch auxiliary portion 210, the second touch auxiliary portion 220 and the third touch auxiliary portion 230 may be the same as the structure of the first touch auxiliary portion 210 in the first possible embodiment in the current Example, and reference may be made to the above relevant description. That is, the first touch auxiliary portion 210 may be of a metal mesh structure or a metal trace structure.

In a case where the first touch auxiliary portion 210 is of a metal mesh structure, the first touch auxiliary portion 210 is located in the touch region S, and the first touch auxiliary portion 210 and the first touch electrode block 21 are insulated from each other. The arrangement of the first touch auxiliary portion 210 is equivalent to increasing the distance between the first touch lead 21' and the first touch electrode block 21 proximate to the end of the first touch lead 21', so that the interference of the second touch signal on the first touch lead 21' with the first touch signal on the first touch electrode block 21 may be reduced.

In a case where the first touch auxiliary portion 210 is a metal trace, the first touch auxiliary portion 210 is located in the wiring region Q.

In some embodiments, no signal is transmitted by the metal trace, and the arrangement of the first touch auxiliary portion 210 is equivalent to increasing the distance between the first touch lead 21' and the first touch electrode block 21 proximate to the end of the first touch lead 21', so that the interference of the second touch signal on the first touch lead 21' with the first touch signal on the first touch electrode block 21 may be reduced.

In some other embodiments, the first touch auxiliary portion 210 is coupled to the first signal shielding line 23. The first touch auxiliary portion 210 transmits the same shielding signal as the first signal shielding line 23. The shielding signal may prevent crosstalk between the second touch signal on the first touch lead 21' and the first touch signal on the first touch electrode block 21 proximate the end of the first touch lead 21'.

Figure 20:
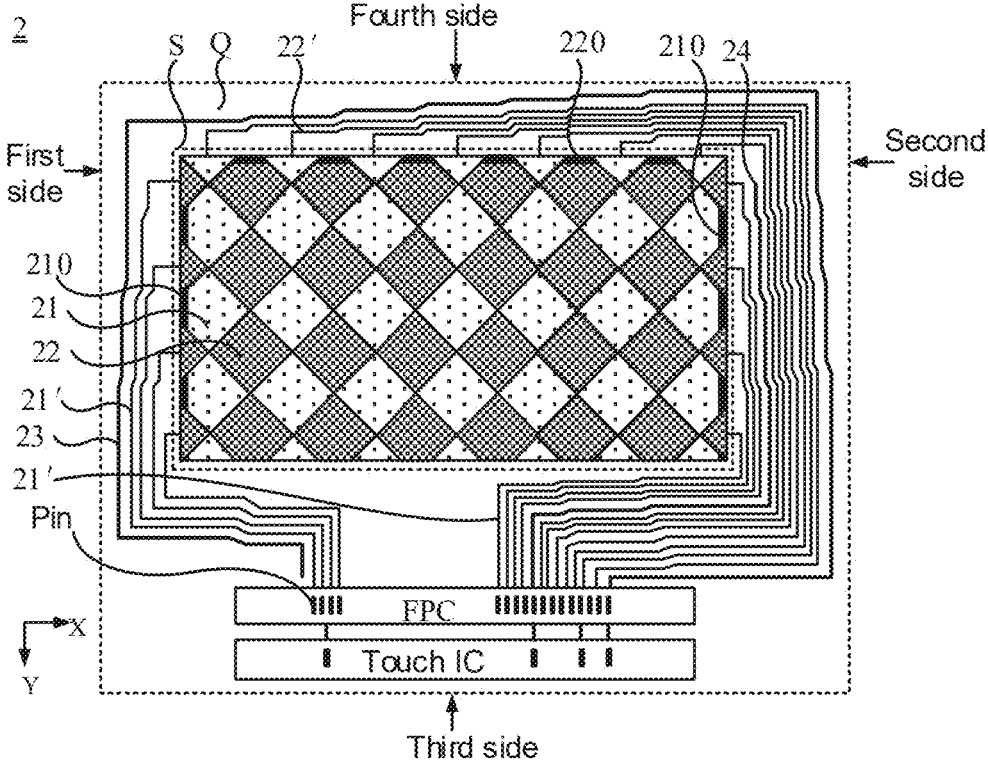
FIG. 20 is a structural diagram of yet another touch sensor layer, in accordance with some embodiments.

In the third possible embodiment provided by the embodiments of the present disclosure, as shown in FIG. 20, the first side and the second side of the touch region S are the sides where the short edges of the touch region S are located, and the third side and the fourth side of the touch region S are the sides where the long edges of the touch region S are located.

Both ends of a row of second touch electrode blocks are respectively coupled to the first touch leads 21' located on the first side and the second side of the touch region S. A column of first touch electrode blocks are coupled to the second touch lead located on the fourth side of the touch region S. That is, it is the wiring manner of 2T1R or 1T2R illustrated in the third possible embodiment in Example 2, reference may be made to the above relevant description, and details will not be repeated here.

Similarly, the arrangement manner of the first touch auxiliary portions 210 may be the same as the arrangement manner of the first touch auxiliary portions 210 illustrated in the first possible embodiment in Example 2.

In some embodiments, as shown in FIG. 20, the touch sensor layer 2 further includes second touch auxiliary portions 220.

Similarly, the arrangement manner of the second touch auxiliary portions 220 may also be the same as the arrangement manner of the second touch auxiliary portions 220 illustrated in the first possible embodiment in Example 2.

The structures of the first touch auxiliary portion 210 and the second touch auxiliary portion 220 may be the same as the structure of the first touch auxiliary portion 210 in the first possible embodiment in the current Example, reference may be made to the above relevant description, and details will not be repeated here.

In some embodiments, the touch region S is of a square shape.

Figure 21:
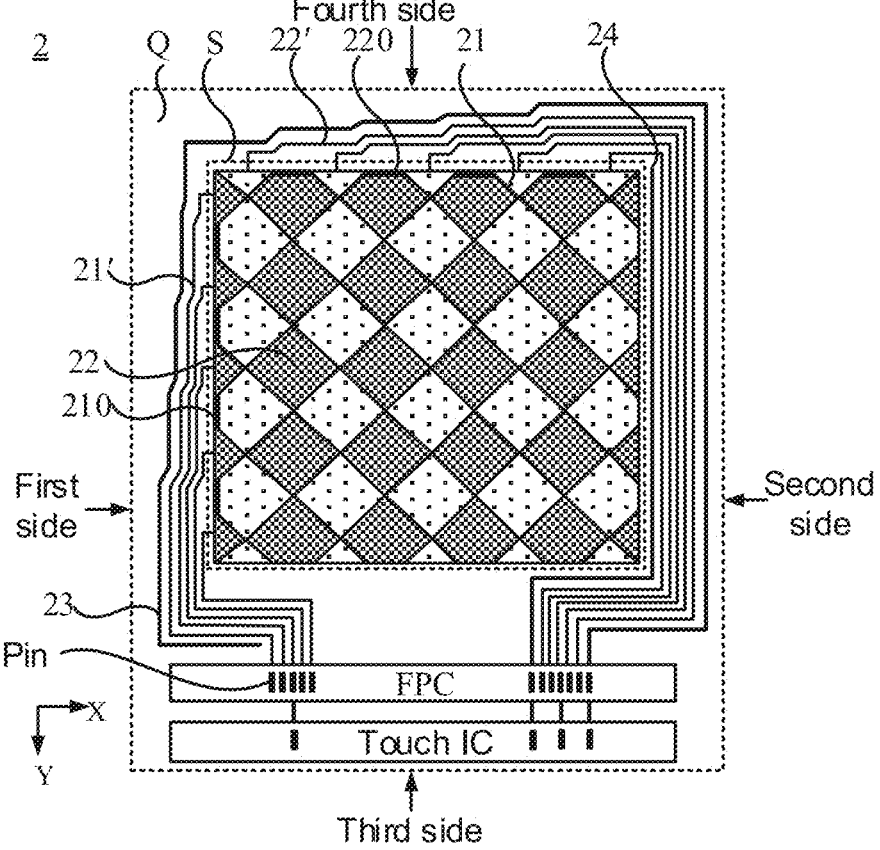
FIG. 21 is a structural diagram of yet another touch sensor layer, in accordance with some embodiments.

In the first possible embodiment provided by the embodiments of the present disclosure, as shown in FIG. 21, the first side and the second side of the touch region S are disposed opposite to each other, and the third and fourth sides of the touch region S are disposed opposite to each other. The FPC and the touch IC are disposed on the third side of the touch region S.

A row of second touch electrode blocks is only coupled to the first touch lead 21' located on the first side of the touch region S. A column of first touch electrode blocks are only coupled to the second touch lead 22' located on the fourth side of the touch region S. That is, it is the wiring manner of 1T1R illustrated in the first possible embodiment in Example 2 in the case where the touch region S is of the square shape, reference may be made to the relevant description above, and details will not be repeated here.

Similarly, the arrangement manner of the first touch auxiliary portions 210 may also be the same as the arrangement manner of the first touch auxiliary portions 210 illustrated in the first possible embodiment in Example 2.

In some embodiments, at least two of the first touch lead 21', the first touch auxiliary portion 210 and the first touch electrode block 21 are disposed in the same layer and made of the same material.

In this way, the process steps of forming the first touch leads 21', the first touch auxiliary portion 210 and the first touch electrode block 21 may be simplified. In addition, the first touch auxiliary portion 210 and the first touch electrode block 21 may be disposed in the same layer and made of the same material, so that the moiré phenomenon (i.e., various fringes appear on the display image of the display apparatus 1000) that easily occurs in a case where the first touch auxiliary portion 210 and the first touch electrode block 21 are located in different layers may be avoided, which is beneficial to improving the display effect of the display apparatus 1000.

The structure of the first touch auxiliary portion 210 is the same as that of the first touch auxiliary portion 210 in the first possible embodiment in the current Example in the case where the touch region S is of the rectangular shape, reference may be made to the above relevant description, and details will not be repeated here.

The arrangement position of the first touch auxiliary portion 210 is the same as that of the first touch auxiliary portion 210 in the first possible embodiment in the current Example in the case where the touch region S is of the rectangular shape.

In some embodiments, as shown in FIG. 21, the touch sensor layer 2 further includes second touch auxiliary portions 220.

Similarly, the arrangement manner of the second touch auxiliary portions 220 may also be the same as the arrangement manner of the second touch auxiliary portions 220 illustrated in the first possible embodiment in Example 2.

The structure and the arrangement position of the second touch auxiliary portion 220 may be the same as the structure and the arrangement position of the first touch auxiliary portion 210 in the first possible embodiment in the current Example in the case where the touch region S is of the rectangular shape, reference may be made to the above relevant description, and details will not be repeated here.

Figure 22:
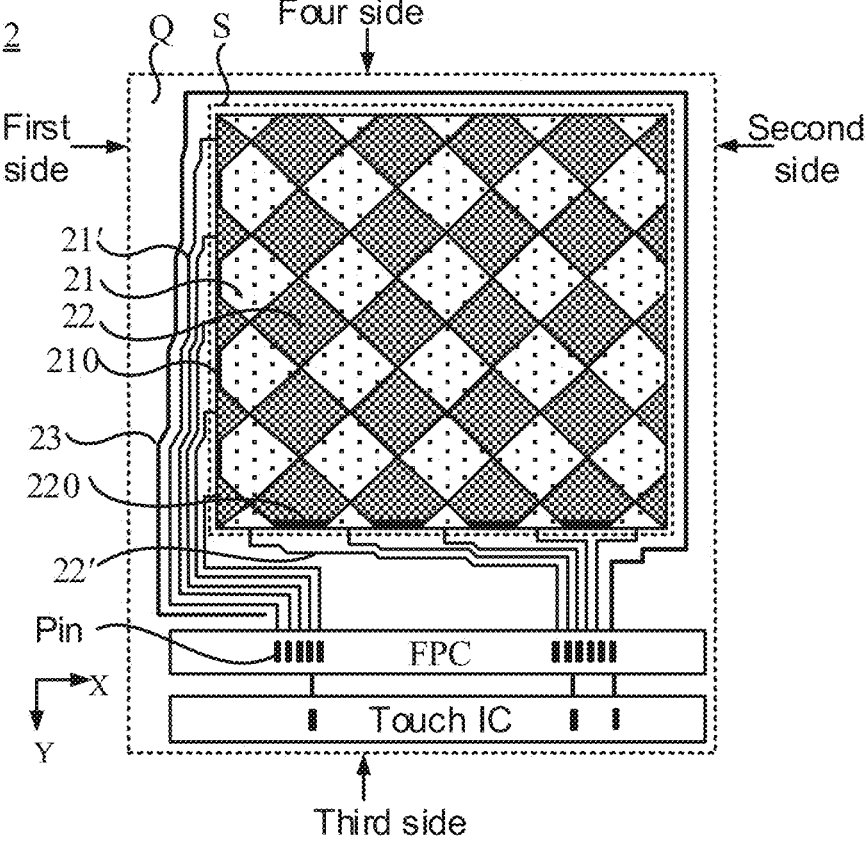
FIG. 22 is a structural diagram of yet another touch sensor layer, in accordance with some embodiments.

In the second possible embodiment provided by the embodiments of the present disclosure, as shown in FIG. 22, the first side and the second side of the touch region S are disposed opposite to each other, and the third side and the fourth side of the touch region S are disposed opposite to each other. The FPC and the touch IC are disposed on the third side of the touch region S.

A row of second touch electrode blocks is only coupled to the first touch lead 21' located on the first side of the touch region S. A column of first touch electrode blocks is only coupled to the second touch lead 22' located on the third side of the touch region S. That is, it is the wiring manner of 1T1R illustrated in the second possible embodiment in Example 2 in the case where the touch region S is of the square shape, reference may be made to the above relevant description, and details will not be repeated here.

Similarly, the arrangement manner of the first touch auxiliary portion 210 may also be the same as the arrangement manner of the first touch auxiliary portion 210 illustrated in the first possible embodiment in Example 2. The arrangement position of the first touch auxiliary portion 210 is the same as the arrangement position of the first touch auxiliary portion 210 in the first possible embodiment in the current Example in the case where the touch region S is of the rectangular shape.

In some embodiments, as shown in FIG. 22, the touch sensor layer 2 further includes second touch auxiliary portions 220.

Similarly, the arrangement manner of the second touch auxiliary portion 220 may also be the same as the arrangement manner of the second touch auxiliary portion 220 illustrated in the first possible embodiment in Example 2.

The structure and the arrangement position of the second touch auxiliary portion 220 may be the same as the structure and the arrangement position of the first touch auxiliary portion 210 in the first possible embodiment in the current Example in the case where the touch region S is of the rectangular shape, reference may be made to the above relevant description, and details will not be repeated here.

Figure 23:
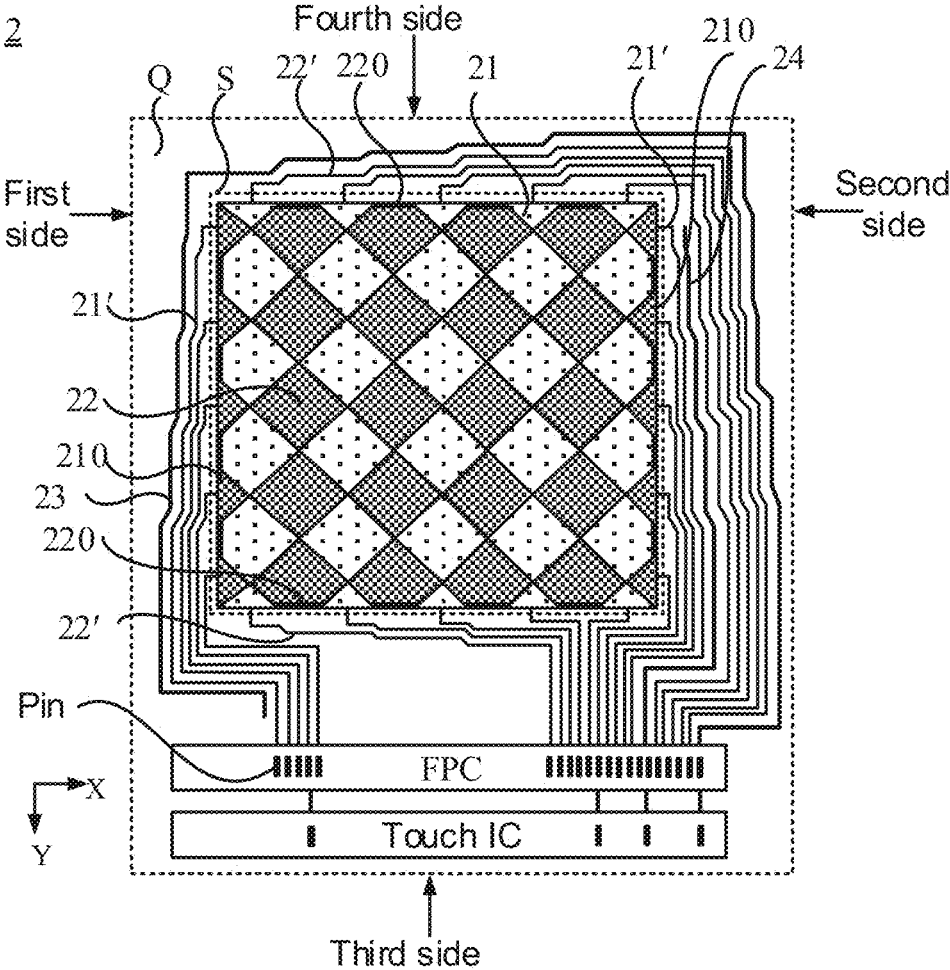
FIG. 23 is a structural diagram of yet another touch sensor layer, in accordance with some embodiments.

In the third possible embodiment provided by the embodiments of the present disclosure, as shown in FIG. 23, the first side and second side of the touch region S are disposed opposite to each other, and the third side and the fourth side of the touch region S are disposed opposite each other. The FPC and the touch IC are disposed on the third side of the touch region S.

Both ends of a row of second touch electrode blocks are coupled to different first touch leads 21'. Both ends of a column of first touch electrode blocks are coupled to different second touch leads 22'. That is, it is the wiring manner of 2T2R illustrated in the third possible embodiment in Example 2 in the case where the touch region S is of the square shape, reference may be made to the above relevant description, and details will not be repeated here.

Similarly, the arrangement manner of the first touch auxiliary portion 210 may also be the same as the arrangement manner of the first touch auxiliary portion 210 illustrated in the first possible embodiment in Example 2.

The arrangement position of the first touch auxiliary portion 210 is the same as the arrangement position of the first touch auxiliary portion 210 in the first possible embodiment in the current Example in the case where the touch region S is of the rectangular shape.

In some embodiments, as shown in FIG. 23, the touch sensor layer 2 further includes second touch auxiliary portions 220.

Similarly, the arrangement manner of the second touch auxiliary portion 220 may also be the same as the arrangement manner of the second touch auxiliary portion 220 illustrated in the first possible embodiment in Example 2.

The structure and the arrangement position of the second touch auxiliary portion 220 may be the same as the structure and the arrangement position of the first touch auxiliary portion 210 in the first possible embodiment in the current Example in the case where the touch region S is of the rectangular shape, reference may be made to the above relevant description, and details will not be repeated here.

In summary, the arrangement of the first touch auxiliary portion 210 is equivalent to increasing the distance between the first touch lead 21' and the first touch electrode block 21 proximate to the end of the first touch lead 21'. The increase of the distance is beneficial to reducing the interference of the second touch signal on the first touch lead 21' with the first touch signal on the first touch electrode block 21. In this way, the arrangement of the first touch auxiliary portion 210 is beneficial to improving the quality of the first touch signal on the first touch electrode block 21, which may improve the first touch signal on the touch sensor layer 2, and finally reduce the possibility that the touch position is reported incorrectly or the touch is unable to be felt in the touch screen 100. The arrangement of the second touch auxiliary portion 220 is equivalent to increasing the distance between the second touch lead 22' and the second touch electrode block 22 proximate to the end of the second touch lead 22'. The increase of the distance is beneficial to reducing the interference of the first touch signal on the second touch lead 22' with the second touch signal on the second touch electrode block 22. In this way, the arrangement of the second touch auxiliary portion 220 is beneficial to improving the quality of the second touch signal on the second touch electrode block 22, which may improve the second touch signal on the touch sensor layer 2, and finally reduce the possibility that the touch position is reported incorrectly or the touch is unable to be felt in the touch screen 100.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch sensor layer having a touch region and a wiring region located at a periphery of the touch region, the touch region having a first side; the touch sensor layer comprising:
    a plurality of first touch electrode blocks located in the touch region;
    a plurality of second touch electrode blocks located in the touch region, wherein the plurality of second touch electrode blocks and the plurality of first touch electrode blocks are disposed in a same layer; second touch electrode blocks and first touch electrode blocks are staggered in a first direction, and other second touch electrode blocks and other first touch electrode blocks are staggered in a second direction, the first direction intersects the second direction;
    at least one first touch auxiliary portion, wherein a first touch auxiliary portion is disposed on a side, facing the wiring region, of at least one first touch electrode block in a group of first touch electrode blocks located at an outermost periphery and proximate to the first side of the touch region, and the first touch auxiliary portion and the first touch electrode block are insulated from each other; and
    a first signal shielding line located in the wiring region, the first touch auxiliary portion being coupled to the first signal shielding line; wherein
    the first touch auxiliary portion and the first touch electrode block have a gap therebetween.

2. The touch sensor layer according to claim 1, wherein the first touch auxiliary portion is a metal trace.

3. The touch sensor layer according to claim 2, wherein a length of the first touch auxiliary portion is smaller than a length of the first signal shielding line.

4. The touch sensor layer according to claim 1, wherein the first touch auxiliary portion and the first touch electrode block are each of a metal mesh structure.

5. The touch sensor layer according to claim 1, further comprising:
    a plurality of first touch leads located in the wiring region, wherein the first signal shielding line is located at a periphery of the plurality of first touch leads, and at least one end of a line of second touch electrode blocks being coupled to a first touch lead.

6. The touch sensor layer according to claim 5, further comprising:

a plurality of second touch leads located in the wiring region, at least one end of a line of first touch electrode blocks being coupled to a second touch lead.

7. The touch sensor layer according to claim 6, wherein both ends of the line of second touch electrode blocks are each coupled to a respective first touch lead; and/or
  both ends of the line of first touch electrode blocks are each coupled to a respective second touch lead.

8. The touch sensor layer according to claim 6, further comprising:
  at least one second touch auxiliary portion, wherein a second touch auxiliary portion is disposed on a side, facing the wiring region, of at least one second touch electrode block in a line of second touch electrode blocks proximate to an end of the second touch lead.

9. The touch sensor layer according to claim 6, further comprising:
  a second signal shielding line located on at least one side of the touch region and disposed between the touch region and a second touch lead closest to the touch region.

10. The touch sensor layer according to claim 9, wherein a length of the second signal shielding line is smaller than a length of the first signal shielding line.

11. The touch sensor layer according to claim 9, wherein the first signal shielding line is located on at least three side of the touch region, and the second signal shielding line is located between the touch region and the first signal shielding line.

12. The touch sensor layer according to claim 5, wherein at least two of the plurality of first touch leads, the at least one first touch auxiliary portion and the plurality of first touch electrode blocks are disposed in a same layer and made of a same material.

13. The touch sensor layer according to claim 1, wherein the touch region further has a second side; the touch sensor layer further comprises:

at least one third touch auxiliary portion, wherein a third touch auxiliary portion is disposed on a side, facing the wiring region, of at least one first touch electrode block in a group of first touch electrode blocks proximate to the second side of the touch region; and the second side of the touch region is opposite to the first side of the touch region.

14. The touch sensor layer according to claim 13, wherein the at least one third touch auxiliary portion and the at least one first touch auxiliary portion are arranged symmetrically.

15. The touch sensor layer according to claim 1, wherein the first touch auxiliary portion is disposed on a side, facing the wiring region, of each first touch electrode block in the group of first touch electrode blocks located at the outermost periphery and proximate to the first side of the touch region.

16. The touch sensor layer according to claim 1, wherein the at least one first touch auxiliary portion is located in the touch region.

17. A touch screen, comprising:
  a display panel; and
  the touch sensor layer according to claim 1, the touch sensor layer being disposed on a light exit surface of the display panel.

18. The touch screen according to claim 17, wherein the display panel is an organic light-emitting diode display panel; and
  the display panel includes an encapsulation layer, and both the plurality of first touch electrode blocks and the plurality of second touch electrode blocks of the touch sensor layer are disposed on a surface of the encapsulation layer.

19. A display apparatus, comprising:
  a housing, and the touch screen according to claim 17, the touch screen being disposed in the housing.

* * * * *